United States Patent
Laperriere et al.

(10) Patent No.: US 12,369,668 B2
(45) Date of Patent: Jul. 29, 2025

(54) HELMETS COMPRISING ADDITIVELY-MANUFACTURED COMPONENTS

(71) Applicant: BAUER HOCKEY LLC, Exeter, NH (US)

(72) Inventors: Jean-Francois Laperriere, Prevost (CA); Thierry Krick, Coteau-du-Lac (CA); Jacques Durocher, Saint-Jerome (CA)

(73) Assignee: BAUER HOCKEY LLC, Exeter, NH (US)

( * ) Notice: Subject to any disclaimer, the term of this patent is extended or adjusted under 35 U.S.C. 154(b) by 63 days.

(21) Appl. No.: 18/196,023

(22) Filed: May 11, 2023

(65) Prior Publication Data

US 2023/0346065 A1    Nov. 2, 2023

Related U.S. Application Data

(63) Continuation of application No. 17/611,262, filed as application No. PCT/CA2020/050683 on May 21, 2020, now Pat. No. 11,684,104.

(60) Provisional application No. 62/969,307, filed on Feb. 3, 2020, provisional application No. 62/851,080, filed on May 21, 2019.

(51) Int. Cl.
    *A42B 3/06*    (2006.01)
    *A42B 3/32*    (2006.01)
    *A42C 2/00*    (2006.01)

(52) U.S. Cl.
    CPC ............... *A42B 3/06* (2013.01); *A42B 3/324* (2013.01); *A42C 2/007* (2013.01)

(58) Field of Classification Search
    CPC ........... A42B 3/06; A42B 3/324; A42B 3/064; A42B 3/063
    USPC .......................................................... 2/414
    See application file for complete search history.

(56) References Cited

U.S. PATENT DOCUMENTS

| | | |
|---|---|---|
| 3,276,784 A | 10/1966 | Anderson |
| 4,042,238 A | 8/1977 | Theriault |
| 4,124,208 A | 11/1978 | Burns |
| 4,134,155 A | 1/1979 | Robertson |
| 5,217,221 A | 6/1993 | Baum |
| 5,524,641 A | 6/1996 | Battaglia |

(Continued)

FOREIGN PATENT DOCUMENTS

| | | |
|---|---|---|
| CA | 2294301 A1 | 1/2000 |
| CA | 2145520 C | 3/2006 |

(Continued)

OTHER PUBLICATIONS

Advisory Action issued on Jun. 14, 2016 in connection with U.S. Appl. No. 14/276,739, 3 pages.

(Continued)

*Primary Examiner* — Timothy K Trieu

(57) ABSTRACT

A helmet comprising one or more additively-manufactured components designed to enhance performance and use of the helmet, such as: impact protection, including for managing different types of impacts; fit and comfort; adjustability; and/or other aspects of the helmet. Methods of additively-manufacturing components for such helmets are also provided, including methods involving expandable materials and the expansion of post-additively manufactured expandable components.

14 Claims, 62 Drawing Sheets

(56) References Cited

U.S. PATENT DOCUMENTS

| | | |
|---|---|---|
| 5,544,367 A | 8/1996 | March, II |
| 5,593,158 A | 1/1997 | Filice |
| 5,613,916 A | 3/1997 | Sommer |
| 5,661,854 A | 9/1997 | March |
| 5,865,696 A | 2/1999 | Calapp et al. |
| 5,946,734 A | 9/1999 | Vogan |
| 6,015,156 A | 1/2000 | Pratt |
| 6,033,328 A | 3/2000 | Bellefleur et al. |
| 6,079,056 A | 6/2000 | Fogelberg |
| 6,129,962 A | 10/2000 | Quigley et al. |
| 6,247,181 B1 | 6/2001 | Hirsch et al. |
| 6,763,611 B1 | 7/2004 | Fusco |
| 6,805,642 B2 | 10/2004 | Meyer |
| 6,918,847 B2 | 7/2005 | Gans |
| 7,008,338 B2 | 3/2006 | Pearson |
| 7,097,577 B2 | 8/2006 | Goldsmith et al. |
| 7,120,941 B2 | 10/2006 | Glaser |
| 7,178,428 B2 | 2/2007 | Schroder |
| 7,207,907 B2 | 4/2007 | Guenther et al. |
| 7,244,196 B2 | 7/2007 | Kennedy et al. |
| 7,382,959 B1 | 6/2008 | Jacobson |
| 7,387,578 B2 | 6/2008 | Palumbo et al. |
| 7,424,967 B2 | 9/2008 | Ervin |
| 7,476,167 B2 | 1/2009 | Garcia |
| 7,510,206 B2 | 3/2009 | Walker |
| 7,614,969 B2 | 11/2009 | Meyer et al. |
| 7,625,625 B2 | 12/2009 | Rios et al. |
| 7,627,938 B2 | 12/2009 | Kim |
| 7,786,243 B2 | 8/2010 | Wu et al. |
| 7,824,591 B2 | 11/2010 | Gans |
| 7,906,191 B2 | 3/2011 | Pratt |
| 7,931,549 B2 | 4/2011 | Pearson et al. |
| 7,941,875 B1 | 5/2011 | Doctor et al. |
| 7,963,868 B2 | 6/2011 | McGrath et al. |
| 7,994,269 B2 | 8/2011 | Ricci et al. |
| 8,007,373 B2 | 8/2011 | Soracco et al. |
| 8,052,551 B2 | 11/2011 | Blotteaux et al. |
| 8,088,461 B2 | 1/2012 | Fujihana et al. |
| 8,287,403 B2 | 10/2012 | Chao et al. |
| 8,323,130 B1 | 12/2012 | LeVault et al. |
| 8,387,286 B2 | 3/2013 | Koyess et al. |
| 8,449,411 B2 | 5/2013 | LeVault et al. |
| 8,602,923 B2 | 12/2013 | Jeanneau |
| 8,608,597 B2 | 12/2013 | Avnery et al. |
| 8,623,490 B2 | 1/2014 | Lin et al. |
| 8,663,027 B2 | 3/2014 | Morales et al. |
| 8,801,550 B2 | 8/2014 | Jeanneau et al. |
| 8,921,702 B1 | 12/2014 | Carter |
| 8,998,754 B2 | 4/2015 | Shocklee et al. |
| 9,044,657 B2 | 6/2015 | Jeanneau |
| 9,056,229 B2 | 6/2015 | Hungerbach et al. |
| 9,086,229 B1 | 7/2015 | Roper |
| 9,116,428 B1 | 8/2015 | Jacobsen |
| 9,119,433 B2 | 9/2015 | Leon |
| 9,199,139 B2 | 12/2015 | Kronenberg et al. |
| 9,201,988 B2 | 12/2015 | Stanhope et al. |
| 9,283,895 B2 | 3/2016 | Sumi et al. |
| 9,320,316 B2 | 4/2016 | Guyan et al. |
| 9,320,317 B2 | 4/2016 | Bernhard et al. |
| 9,375,041 B2 | 6/2016 | Plant |
| 9,409,065 B2 | 8/2016 | Morales et al. |
| 9,415,269 B2 | 8/2016 | Tomita et al. |
| 9,452,323 B2 | 9/2016 | Kronenberg et al. |
| 9,468,823 B2 | 10/2016 | Mitton et al. |
| 9,486,679 B2 | 11/2016 | Goldstein et al. |
| 9,498,014 B2 * | 11/2016 | Princip ............ A42B 3/065 |
| 9,539,487 B2 | 1/2017 | Henry |
| 9,566,758 B2 | 2/2017 | Cheung et al. |
| 9,573,024 B2 | 2/2017 | Bender |
| 9,586,112 B2 | 3/2017 | Sola et al. |
| 9,594,368 B2 | 3/2017 | Kronenberg et al. |
| 9,668,531 B2 | 6/2017 | Nordstrom et al. |
| 9,694,540 B2 | 7/2017 | Trockel |
| 9,737,747 B1 | 8/2017 | Walsh et al. |
| 9,756,894 B2 | 9/2017 | McDowell et al. |
| 9,756,899 B2 | 9/2017 | Waatti |
| 9,788,594 B2 | 10/2017 | Jarvis |
| 9,788,603 B2 | 10/2017 | Jarvis |
| 9,795,181 B2 | 10/2017 | Jarvis |
| 9,839,251 B2 | 12/2017 | Pannikottu et al. |
| 9,841,075 B2 | 12/2017 | Russo |
| 9,878,217 B2 | 1/2018 | Morales et al. |
| 9,889,347 B2 | 2/2018 | Morales et al. |
| 9,892,214 B2 | 2/2018 | Morrow et al. |
| 9,914,274 B2 | 3/2018 | Jones et al. |
| 9,925,440 B2 | 3/2018 | Davis et al. |
| 10,010,133 B2 | 7/2018 | Guyan |
| 10,010,134 B2 | 7/2018 | Guyan |
| 10,016,013 B2 | 7/2018 | Kormann et al. |
| 10,034,519 B2 | 7/2018 | Lussier |
| 10,039,343 B2 | 8/2018 | Guyan |
| 10,052,223 B2 | 8/2018 | Turner |
| 10,085,508 B2 | 10/2018 | Surabhi |
| 10,104,934 B2 | 10/2018 | Guyan |
| 10,143,252 B2 | 12/2018 | Nordstrom et al. |
| 10,143,266 B2 | 12/2018 | Spanks |
| 10,155,855 B2 | 12/2018 | Farris et al. |
| 10,212,983 B2 | 2/2019 | Knight |
| 10,226,098 B2 | 3/2019 | Guyan et al. |
| 10,226,103 B2 | 3/2019 | Mark |
| 10,231,510 B2 | 3/2019 | Wawrousek et al. |
| 10,231,511 B2 | 3/2019 | Guyan et al. |
| 10,241,498 B1 | 3/2019 | Beard et al. |
| 10,244,818 B2 | 4/2019 | Desjardins et al. |
| 10,258,093 B2 | 4/2019 | Smart |
| 10,259,041 B2 | 4/2019 | Gessler et al. |
| 10,264,851 B2 | 4/2019 | Waatti |
| 10,279,235 B2 | 5/2019 | Jean et al. |
| 10,293,565 B1 | 5/2019 | Tran et al. |
| 10,299,722 B1 | 5/2019 | Tran et al. |
| 10,322,320 B2 | 6/2019 | Morales et al. |
| 10,327,700 B2 | 6/2019 | Lee et al. |
| 10,335,646 B2 | 7/2019 | Morales et al. |
| 10,343,031 B1 | 7/2019 | Day et al. |
| 10,362,829 B2 | 7/2019 | Lowe |
| 10,384,106 B2 | 8/2019 | Hunt et al. |
| 10,390,578 B2 | 8/2019 | Kuo et al. |
| 10,394,050 B2 | 8/2019 | Rasschaert et al. |
| 10,398,948 B2 | 9/2019 | Cardani et al. |
| 10,426,213 B2 | 10/2019 | Hyman |
| 10,452,053 B2 | 10/2019 | Lalish et al. |
| 10,455,896 B2 | 10/2019 | Sterman et al. |
| 10,463,525 B2 | 11/2019 | Littlefield et al. |
| 10,470,519 B2 | 11/2019 | Guyan et al. |
| 10,470,520 B2 | 11/2019 | Guyan et al. |
| 10,517,381 B2 | 12/2019 | Frash |
| 10,525,315 B1 | 1/2020 | Wells et al. |
| 10,575,586 B2 | 3/2020 | Guyan et al. |
| 10,575,587 B2 | 3/2020 | Guyan |
| 10,575,588 B2 | 3/2020 | Perrault et al. |
| 10,591,257 B1 | 3/2020 | Barr et al. |
| 10,624,413 B2 | 4/2020 | Kirk et al. |
| 10,631,592 B2 | 4/2020 | Lee-Sang |
| 10,632,010 B2 | 4/2020 | Hart et al. |
| 10,638,805 B2 | 5/2020 | Fella |
| 10,638,810 B1 | 5/2020 | Cheney et al. |
| 10,638,927 B1 | 5/2020 | Beard et al. |
| 10,646,356 B2 | 5/2020 | Deshpande et al. |
| 10,668,334 B2 | 6/2020 | Madson et al. |
| 10,695,642 B1 | 6/2020 | Robinson |
| 10,696,066 B2 | 6/2020 | Miller |
| 10,702,012 B2 | 7/2020 | Guyan |
| 10,702,740 B2 | 7/2020 | Tarkington et al. |
| 10,721,990 B2 | 7/2020 | Campos et al. |
| 10,737,147 B2 | 8/2020 | Morales et al. |
| 10,743,610 B2 | 8/2020 | Guyan et al. |
| 10,750,820 B2 | 8/2020 | Guyan |
| 10,751,590 B1 | 8/2020 | Wells et al. |
| 10,779,614 B2 | 9/2020 | Re et al. |
| 10,791,787 B2 | 10/2020 | Hector et al. |
| 10,792,541 B2 | 10/2020 | Cardani et al. |
| 10,829,640 B2 | 11/2020 | Beyer et al. |
| 10,835,786 B2 | 11/2020 | Morales et al. |
| 10,842,210 B2 | 11/2020 | Nordstrom et al. |

(56) References Cited

U.S. PATENT DOCUMENTS

| | | |
|---|---|---|
| 10,850,165 B2 | 12/2020 | Nürmberg et al. |
| 10,850,169 B1 | 12/2020 | Day et al. |
| 10,864,105 B2 | 12/2020 | Dillingham |
| 10,864,676 B2 | 12/2020 | Constantinou et al. |
| 10,875,239 B2 | 12/2020 | McCluskey |
| 10,881,167 B2 | 1/2021 | Jeng et al. |
| 10,888,754 B2 | 1/2021 | Wells et al. |
| 10,890,970 B2 | 1/2021 | Emokpae |
| 10,893,720 B2 | 1/2021 | Atta |
| 10,899,868 B2 | 1/2021 | Rolland et al. |
| 10,932,500 B2 | 3/2021 | Thomas et al. |
| 10,932,515 B2 | 3/2021 | Busbee |
| 10,932,521 B2 | 3/2021 | Perrault et al. |
| 10,933,609 B2 | 3/2021 | Gupta et al. |
| 10,946,583 B2 | 3/2021 | Constantinou et al. |
| 10,948,898 B1 | 3/2021 | Pietrzak et al. |
| 10,974,447 B2 | 4/2021 | Constantinou et al. |
| 11,026,482 B1 | 6/2021 | Unis |
| 11,033,796 B2 | 6/2021 | Bologna et al. |
| 11,052,597 B2 | 7/2021 | MacCurdy et al. |
| D927,084 S | 8/2021 | Bologna et al. |
| 11,076,656 B2 | 8/2021 | Kormann et al. |
| 11,090,863 B2 | 8/2021 | Constantinou et al. |
| 11,111,359 B2 | 9/2021 | Kunc et al. |
| 11,155,052 B2 | 10/2021 | Jessiman et al. |
| 11,167,198 B2 | 11/2021 | Bologna et al. |
| 11,167,395 B2 | 11/2021 | Merlo et al. |
| 11,167,475 B2 | 11/2021 | Donovan |
| 11,172,719 B2 | 11/2021 | Briggs |
| 11,178,938 B2 | 11/2021 | Kulenko et al. |
| 11,185,123 B2 | 11/2021 | Waatti et al. |
| 11,185,125 B2 | 11/2021 | Blanche et al. |
| 10,918,157 B2 | 12/2021 | Choukeir |
| 11,191,319 B2 | 12/2021 | Weisskopf et al. |
| 11,206,895 B2 | 12/2021 | Hopkins et al. |
| 11,219,270 B2 | 1/2022 | Oleson et al. |
| 11,224,265 B2 | 1/2022 | Jarvis |
| 11,229,259 B2 | 1/2022 | Farris et al. |
| 11,547,912 B2 | 1/2023 | Davis et al. |
| 11,684,104 B2 | 6/2023 | Laperriere et al. |
| 11,774,084 B2 | 10/2023 | Davis et al. |
| 11,779,821 B2 | 10/2023 | Davis et al. |
| 11,844,986 B2 | 12/2023 | Davis et al. |
| 2005/0027025 A1 | 2/2005 | Erb |
| 2005/0245090 A1 | 11/2005 | Mori |
| 2005/0251898 A1 | 11/2005 | Domingos |
| 2007/0000025 A1 | 1/2007 | Picotte |
| 2007/0204378 A1 | 9/2007 | Behar |
| 2007/0270253 A1 | 11/2007 | Davis |
| 2007/0277296 A1 | 12/2007 | Bullock |
| 2009/0191989 A1 | 7/2009 | Lammer et al. |
| 2009/0264230 A1 | 10/2009 | Thouin |
| 2010/0156058 A1 | 6/2010 | Koyess |
| 2010/0160095 A1 | 6/2010 | Chauvin |
| 2010/0251465 A1 | 10/2010 | Milea et al. |
| 2011/0111954 A1 | 5/2011 | Li |
| 2012/0297526 A1 | 11/2012 | Leon |
| 2013/0025031 A1 | 1/2013 | Laperriere et al. |
| 2013/0025032 A1 | 1/2013 | Durocher et al. |
| 2013/0143060 A1 | 6/2013 | Jacobson |
| 2013/0196175 A1 | 8/2013 | Levit |
| 2013/0232674 A1 | 9/2013 | Behrend et al. |
| 2014/0013492 A1 | 1/2014 | Bottland |
| 2014/0013862 A1 | 1/2014 | Lind |
| 2014/0075652 A1 | 3/2014 | Hanson et al. |
| 2014/0090155 A1 | 4/2014 | Johnston et al. |
| 2014/0109440 A1 | 4/2014 | McDowell et al. |
| 2014/0163445 A1 | 6/2014 | Pallari et al. |
| 2014/0182170 A1 | 7/2014 | Wawrousek et al. |
| 2014/0259327 A1 | 9/2014 | Demarest |
| 2014/0272275 A1 | 9/2014 | Yang |
| 2014/0311315 A1 | 10/2014 | Isaac |
| 2015/0018136 A1 | 1/2015 | Goldstein et al. |
| 2015/0121609 A1 | 5/2015 | Cote |
| 2015/0246496 A1 | 9/2015 | Jones et al. |
| 2015/0272258 A1 | 10/2015 | Preisler |
| 2015/0298443 A1 | 10/2015 | Hundley |
| 2015/0307044 A1 | 10/2015 | Hundley |
| 2015/0313305 A1 | 11/2015 | Daetwyler et al. |
| 2015/0328512 A1 | 11/2015 | Davis et al. |
| 2016/0135537 A1 | 5/2016 | Wawrousek et al. |
| 2016/0192741 A1 | 7/2016 | Mark |
| 2016/0206048 A1 | 7/2016 | Weidl et al. |
| 2016/0235158 A1 | 8/2016 | Desjardins |
| 2016/0235560 A1 | 8/2016 | Cespedes et al. |
| 2016/0302494 A1 | 10/2016 | Smart |
| 2016/0302496 A1 | 10/2016 | Ferrara |
| 2016/0327113 A1 | 11/2016 | Shelley |
| 2016/0332036 A1 | 11/2016 | Molinari et al. |
| 2016/0333152 A1 | 11/2016 | Cook et al. |
| 2016/0349738 A1 | 12/2016 | Sisk |
| 2016/0353825 A1 | 12/2016 | Bottlang et al. |
| 2016/0374428 A1 | 12/2016 | Kormann et al. |
| 2016/0374431 A1 | 12/2016 | Tow |
| 2017/0021246 A1 | 1/2017 | Goldstein et al. |
| 2017/0105475 A1 | 4/2017 | Huang |
| 2017/0106622 A1 | 4/2017 | Bonin |
| 2017/0164899 A1 | 6/2017 | Yang et al. |
| 2017/0185070 A1 | 6/2017 | Kronenberg et al. |
| 2017/0239933 A1 | 8/2017 | Shiettecatte et al. |
| 2017/0350555 A1 | 8/2017 | Jertson et al. |
| 2017/0251747 A1 | 9/2017 | Pippin |
| 2017/0273386 A1 | 9/2017 | Kuo et al. |
| 2017/0282030 A1 | 10/2017 | Foortse |
| 2017/0303622 A1 | 10/2017 | Stone et al. |
| 2017/0318900 A1 | 11/2017 | Charlesworth et al. |
| 2017/0332733 A1 | 11/2017 | Cluckers et al. |
| 2017/0360148 A1 | 12/2017 | Hayes et al. |
| 2018/0007996 A1 | 1/2018 | Sedwick et al. |
| 2018/0027914 A1 | 2/2018 | Cook |
| 2018/0027916 A1 | 2/2018 | Smallwood |
| 2018/0028336 A1 | 2/2018 | Pallari et al. |
| 2018/0036944 A1 | 2/2018 | Jarvis |
| 2018/0098589 A1 | 4/2018 | Diamond |
| 2018/0098919 A1 | 4/2018 | Pallari et al. |
| 2018/0103704 A1 | 4/2018 | Smart |
| 2018/0104922 A1 | 4/2018 | Busgen et al. |
| 2018/0116329 A1 | 5/2018 | Champagne et al. |
| 2018/0132556 A1 | 5/2018 | Laperriere et al. |
| 2018/0140898 A1 | 5/2018 | Kasha |
| 2018/0184732 A1 | 7/2018 | Plant |
| 2018/0200591 A1 | 7/2018 | Davis et al. |
| 2018/0231347 A1 | 8/2018 | Tyler et al. |
| 2018/0237600 A1 | 8/2018 | Cox et al. |
| 2018/0253774 A1 | 9/2018 | Soracco et al. |
| 2018/0290044 A1 | 10/2018 | Jin et al. |
| 2018/0339445 A1 | 11/2018 | Loveder |
| 2018/0339478 A1 | 11/2018 | Lee |
| 2018/0341286 A1 | 11/2018 | Markovsky et al. |
| 2018/0345575 A1 | 12/2018 | Constantinou et al. |
| 2018/0361217 A1 | 12/2018 | Yanoff et al. |
| 2019/0029367 A1 | 1/2019 | Yangas |
| 2019/0029369 A1 | 1/2019 | VanWagen et al. |
| 2019/0037961 A1 | 2/2019 | Busbee et al. |
| 2019/0039311 A1 | 2/2019 | Busbee et al. |
| 2019/0045857 A1 | 2/2019 | Fan et al. |
| 2019/0045879 A1 | 2/2019 | Labonté et al. |
| 2019/0075876 A1 | 3/2019 | Burek |
| 2019/0082785 A1 | 3/2019 | Sparks |
| 2019/0090576 A1 | 3/2019 | Guinta |
| 2019/0098960 A1 | 4/2019 | Weisskopf et al. |
| 2019/0104792 A1 | 4/2019 | Diamond |
| 2019/0133235 A1 | 5/2019 | Domanskis et al. |
| 2019/0150549 A1 | 5/2019 | Dunten et al. |
| 2019/0167463 A1 | 6/2019 | Littlefield et al. |
| 2019/0184629 A1 | 6/2019 | Kerrigan |
| 2019/0191794 A1 | 6/2019 | Boria |
| 2019/0200703 A1 | 7/2019 | Mark |
| 2019/0223797 A1 | 7/2019 | Tran et al. |
| 2019/0231018 A1* | 8/2019 | Boutin ............ A42B 3/124 |
| 2019/0232591 A1 | 8/2019 | Sterman et al. |
| 2019/0232592 A1 | 8/2019 | Tran et al. |
| 2019/0240896 A1 | 8/2019 | Achten et al. |
| 2019/0246741 A1 | 8/2019 | Busbee et al. |

(56) References Cited

U.S. PATENT DOCUMENTS

| | | |
|---|---|---|
| 2019/0248067 A1 | 8/2019 | Achten et al. |
| 2019/0248089 A1 | 8/2019 | Busbee et al. |
| 2019/0269194 A1 | 9/2019 | Pietrzak et al. |
| 2019/0289934 A1 | 9/2019 | Lee |
| 2019/0290981 A1 | 9/2019 | Davis et al. |
| 2019/0290982 A1 | 9/2019 | Davis et al. |
| 2019/0290983 A1 | 9/2019 | Davis et al. |
| 2019/0313732 A1 | 10/2019 | Russell et al. |
| 2019/0329491 A1 | 10/2019 | Yu et al. |
| 2019/0335838 A1 | 11/2019 | Hoshizaki |
| 2019/0344150 A1 | 11/2019 | Dreve |
| 2019/0358486 A1 | 11/2019 | Higginbotham |
| 2019/0365045 A1 | 12/2019 | Kiederle et al. |
| 2019/0381389 A1 | 12/2019 | Nysæther |
| 2019/0382089 A1 | 12/2019 | O'brien |
| 2020/0015543 A1 | 1/2020 | Roser |
| 2020/0022444 A1 | 1/2020 | Stone et al. |
| 2020/0029654 A1 | 1/2020 | Yangas |
| 2020/0034016 A1 | 1/2020 | Boissonneault et al. |
| 2020/0046062 A1 | 2/2020 | Perillo et al. |
| 2020/0046075 A1 | 2/2020 | Sterman et al. |
| 2020/0060377 A1 | 2/2020 | Dua et al. |
| 2020/0061412 A1 | 2/2020 | Crosswell |
| 2020/0085606 A1 | 3/2020 | Turner |
| 2020/0094473 A1 | 3/2020 | Constantinou et al. |
| 2020/0100554 A1 | 4/2020 | Bologna et al. |
| 2020/0101252 A1 | 4/2020 | Oddo |
| 2020/0113267 A1 | 4/2020 | Light et al. |
| 2020/0114178 A1 | 4/2020 | Waterford et al. |
| 2020/0121991 A1 | 4/2020 | Emadikotak et al. |
| 2020/0128914 A1 | 4/2020 | Bosmans et al. |
| 2020/0154803 A1 | 5/2020 | Goulet et al. |
| 2020/0154818 A1 | 5/2020 | Fu |
| 2020/0154822 A1 | 5/2020 | Kita et al. |
| 2020/0163408 A1 | 5/2020 | Guyan |
| 2020/0164582 A1 | 5/2020 | Siegl et al. |
| 2020/0170341 A1 | 6/2020 | Guyan et al. |
| 2020/0171742 A1 | 6/2020 | Constantinou et al. |
| 2020/0196706 A1* | 6/2020 | Perrault ................ B33Y 80/00 |
| 2020/0206020 A1 | 7/2020 | Hart et al. |
| 2020/0215415 A1 | 7/2020 | Bologna et al. |
| 2020/0215746 A1 | 7/2020 | Miller |
| 2020/0238604 A1 | 7/2020 | Hart et al. |
| 2020/0255618 A1 | 8/2020 | Krick et al. |
| 2020/0255660 A1 | 8/2020 | Durand et al. |
| 2020/0268077 A1 | 8/2020 | Schmidt et al. |
| 2020/0268080 A1 | 8/2020 | Schmidt et al. |
| 2020/0276770 A1 | 9/2020 | Zheng |
| 2020/0281310 A1 | 9/2020 | Guyan |
| 2020/0283683 A1 | 9/2020 | Yakacki |
| 2020/0297051 A1 | 9/2020 | Quadling et al. |
| 2020/0299452 A1 | 9/2020 | Vontorcik et al. |
| 2020/0305534 A1 | 10/2020 | Chilson |
| 2020/0305552 A1 | 10/2020 | Cheney et al. |
| 2020/0324464 A1 | 10/2020 | Reese et al. |
| 2020/0329811 A1 | 10/2020 | Davis |
| 2020/0329814 A1 | 10/2020 | Wang et al. |
| 2020/0329815 A1 | 10/2020 | Schmid |
| 2020/0359728 A1 | 11/2020 | Plant |
| 2020/0367607 A1 | 11/2020 | Cheney et al. |
| 2020/0368588 A1 | 11/2020 | Morales et al. |
| 2020/0375270 A1 | 12/2020 | Holschuh et al. |
| 2020/0390169 A1 | 12/2020 | Waterloo |
| 2020/0391085 A1 | 12/2020 | Shassian |
| 2020/0406537 A1 | 12/2020 | Cross et al. |
| 2021/0001157 A1 | 1/2021 | Rashaud et al. |
| 2021/0001560 A1 | 1/2021 | Cook et al. |
| 2021/0016139 A1 | 1/2021 | Cardani et al. |
| 2021/0022429 A1 | 1/2021 | Ostergard |
| 2021/0023775 A1 | 1/2021 | Poelma |
| 2021/0024775 A1 | 1/2021 | Rolland et al. |
| 2021/0030107 A1 | 2/2021 | Pratt et al. |
| 2021/0030113 A1 | 2/2021 | Schuster |
| 2021/0037908 A1 | 2/2021 | Busbee |
| 2021/0038947 A1 | 2/2021 | Nürnberg et al. |
| 2021/0052955 A1 | 2/2021 | Demille et al. |
| 2021/0068475 A1 | 3/2021 | Coccia et al. |
| 2021/0068495 A1 | 3/2021 | Telatin et al. |
| 2021/0069556 A1 | 3/2021 | Morales et al. |
| 2021/0076771 A1 | 3/2021 | Guyan et al. |
| 2021/0077865 A1 | 3/2021 | Morales et al. |
| 2021/0079970 A1 | 3/2021 | Betteridge et al. |
| 2021/0085012 A1 | 3/2021 | Alvaro |
| 2021/0101331 A1 | 4/2021 | Su |
| 2021/0112906 A1 | 4/2021 | Bologna et al. |
| 2021/0117589 A1 | 4/2021 | Banadyha et al. |
| 2021/0145116 A1 | 5/2021 | Kvamme |
| 2021/0145125 A1 | 5/2021 | Miller et al. |
| 2021/0146227 A1 | 5/2021 | Bhagwat |
| 2021/0169179 A1 | 6/2021 | Louko |
| 2021/0177090 A1 | 6/2021 | Vandecruys et al. |
| 2021/0177093 A1* | 6/2021 | Perrault ................ A61B 5/1121 |
| 2021/0186151 A1 | 6/2021 | Gross |
| 2021/0186152 A1 | 6/2021 | Kumar et al. |
| 2021/0186154 A1 | 6/2021 | Yuasa |
| 2021/0187897 A1 | 6/2021 | Reinhall et al. |
| 2021/0195982 A1 | 7/2021 | Pietrzak et al. |
| 2021/0195989 A1 | 7/2021 | Iwasa et al. |
| 2021/0195995 A1 | 7/2021 | Sakamoto et al. |
| 2021/0206054 A1 | 7/2021 | Constantinou et al. |
| 2021/0246959 A1 | 8/2021 | Kabaria et al. |
| 2021/0283855 A1 | 9/2021 | Bologna et al. |
| 2021/0299543 A1 | 9/2021 | Bologna et al. |
| 2021/0321713 A1 | 10/2021 | Busbee |
| 2021/0321716 A1 | 10/2021 | Kormann et al. |
| 2021/0341031 A1 | 11/2021 | Kabaria et al. |
| 2021/0347112 A1 | 11/2021 | Su et al. |
| 2021/0347114 A1 | 11/2021 | Boettcher et al. |
| 2021/0354413 A1 | 11/2021 | Jones et al. |
| 2021/0358097 A1 | 11/2021 | Harig |
| 2021/0368910 A1 | 12/2021 | Moller et al. |
| 2021/0368912 A1 | 12/2021 | Russell et al. |
| 2021/0370400 A1 | 12/2021 | Benichou et al. |
| 2021/0401109 A1 | 12/2021 | Labonté et al. |
| 2022/0000212 A1 | 1/2022 | Busbee |
| 2022/0000216 A1 | 1/2022 | Carlucci et al. |
| 2022/0007785 A1 | 1/2022 | Mitchell et al. |
| 2022/0016861 A1 | 1/2022 | Carlucci et al. |
| 2022/0022594 A1 | 1/2022 | Dippel et al. |
| 2022/0079280 A1 | 3/2022 | Laperriere et al. |
| 2022/0142284 A1 | 5/2022 | Laperriere et al. |
| 2022/0296975 A1 | 9/2022 | Krick et al. |
| 2023/0337781 A1 | 10/2023 | Corbeil et al. |
| 2024/0123305 A1 | 4/2024 | Davis et al. |

FOREIGN PATENT DOCUMENTS

| | | |
|---|---|---|
| CA | 2949062 | 2/2020 |
| CA | 3054525 | 2/2022 |
| CA | 3054536 | 3/2022 |
| CA | 3054547 | 3/2022 |
| CA | 3054530 | 5/2022 |
| CA | 3140503 | 6/2022 |
| CA | 3140505 | 2/2024 |
| CN | 105218939 | 1/2016 |
| EP | 3142753 | 8/2019 |
| EP | 3253243 B1 | 4/2020 |
| WO | 2013025800 A2 | 2/2013 |
| WO | 2013151157 A1 | 10/2013 |
| WO | 2014100462 A1 | 6/2014 |
| WO | 2015175541 A1 | 11/2015 |
| WO | 2016209872 A1 | 12/2016 |
| WO | 2017062945 A1 | 4/2017 |
| WO | 2017136890 A1 | 8/2017 |
| WO | 2017136941 A1 | 8/2017 |
| WO | 2017182930 A2 | 10/2017 |
| WO | 2017208256 A1 | 12/2017 |
| WO | 2018072017 A1 | 4/2018 |
| WO | 2018072034 A1 | 4/2018 |
| WO | 2018157148 A1 | 8/2018 |
| WO | 2018161112 A1 | 9/2018 |
| WO | 2018234876 A1 | 12/2018 |
| WO | 2019073261 A1 | 4/2019 |
| WO | 2019086546 A1 | 5/2019 |

(56) References Cited

FOREIGN PATENT DOCUMENTS

| WO | 2019211822 A1 | 11/2019 |
| --- | --- | --- |
| WO | 2020028232 A1 | 2/2020 |
| WO | 2020074910 A1 | 4/2020 |
| WO | 2020104505 A1 | 5/2020 |
| WO | 2020104506 A1 | 5/2020 |
| WO | 2020104511 A1 | 5/2020 |
| WO | 2020115708 A1 | 6/2020 |
| WO | 2020118260 A1 | 6/2020 |
| WO | 2020201666 A1 | 10/2020 |
| WO | 2020232550 A1 | 11/2020 |
| WO | 2020232552 A1 | 11/2020 |
| WO | 2020232555 A1 | 11/2020 |
| WO | 2020236930 A1 | 11/2020 |
| WO | 2020245609 A1 | 12/2020 |
| WO | 2021026406 A1 | 2/2021 |
| WO | 2021046376 A1 | 3/2021 |
| WO | 2021062079 A1 | 4/2021 |
| WO | 2021062519 A1 | 4/2021 |
| WO | 2021080974 A1 | 4/2021 |
| WO | 2021101967 A1 | 5/2021 |
| WO | 2021101970 A1 | 5/2021 |
| WO | 2021114534 A1 | 6/2021 |
| WO | 2021228162 A1 | 11/2021 |
| WO | 2021238856 A1 | 12/2021 |

OTHER PUBLICATIONS

Advisory Action issued on Mar. 17, 2021 in connection with U.S. Appl. No. 15/922,526, 3 pages.
Advisory Action issued on Mar. 21, 2017 in connection with U.S. Appl. No. 14/276,739, 3 pages.
Applicant-Initiated Interview Summary issued on Aug. 15, 2017 in connection with U.S. Appl. No. 14/276,739, 3 pages.
Applicant-Initiated Interview Summary issued on Jun. 13, 2016 in connection with U.S. Appl. No. 14/276,739, 2 pages.
European Search Report issued on Jan. 22, 2018 in connection with European Patent Application 15793488.6, 8 bages.
Examiner Report issued on Apr. 27, 2021 in connection with Canadian Patent Application No. 3,054,525, 3 pages.
Examiner Report issued on Apr. 27, 2021 in connection with Canadian Patent Application No. 3,054,530, 4 pages.
Examiner Report issued on Apr. 27, 2021 in connection with Canadian Patent Application No. 3,054,536, 5 pages.
Examiner Report issued on Apr. 27, 2021 in connection with Canadian Patent Application No. 3,054,547, 5 pages.
Examiner Report issued on Aug. 2, 2021 in connection with Canadian Patent Application No. 3,054,530, 3 pages.
Examiner Report issued on Mar. 3, 2023 in connection with Canadian Patent Application No. 3,140,505, 3 pages.
Examiner Report issued on Nov. 24, 2020, in connection with Canadian Patent Application No. 3,054,525, 5 pages.
Examiner Report issued on Nov. 25, 2020 in connection with Canadian Patent Application No. 3,054,530, 7 pages.
Examiner Report issued on Nov. 25, 2020 in connection with Canadian Patent Application No. 3,054,536, 5 pages.
Examiner Report issued on Nov. 25, 2020 in connection with Canadian Patent Application No. 3,054,547, 5 pages.
Examiner's Report issued on Jul. 29, 2019 in connection with Canadian Patent Application 2,949,062, 3 pages.
Examiner's Report issued on Sep. 20, 2017 in connection with Canadian Patent Application 2,949,062, 3 pages.
Extended European Search Report issued on Jan. 5, 2023 in connection with European Patent Application No. 20810281.4, 10 pages.
Final Office Action issued on Dec. 9, 2016 in connection with U.S. Appl. No. 14/276,739, 5 pages.
Final Office Action issued on Feb. 9, 2021 in connection with U.S. Appl. No. 16/440,655, 39 pages.
Final Office Action issued on Feb. 9, 2021 in connection with U.S. Appl. No. 16/440,691, 41 pages.
Final Office Action issued on Feb. 9, 2021 in connection with U.S. Appl. No. 16/440,717, 35 pages.
Final Office Action issued on Jan. 10, 2023 in connection with U.S. Appl. No. 16/440,655, 38 pages.
Final Office Action issued on Jan. 10, 2023 in connection with U.S. Appl. No. 16/440,691, 33 pages.
Final Office Action issued on Mar. 7, 2016 in connection with U.S. Appl. No. 14/276,739, 6 pages.
Final Office Action issued on Nov. 23, 2020 in connection with U.S. Appl. No. 15/922,526, 17 pages.
Final Office Action issued on Sep. 8, 2022 in connection with U.S. Appl. No. 17/611,262, 17 pages.
International Preliminary Report on Patentability issued on Oct. 1, 2021 in connection with International Patent Application PCT/CA2020/050689, 31 pages.
International Preliminary Report on Patentability issued on Sep. 14, 2021 in connection with International Patent Application PCT/CA2020/050683, 17 pages.
International Preliminary Report on Patentability issued on Sep. 3, 2021 in connection with International Patent Application PCT/CA2020/050686, 54 pages.
International Search Report and Written Opinion issued on Aug. 19, 2020 in connection with International Patent Application PCT/CA2020/050689, 11 pages.
International Search Report and Written Opinion issued on Jul. 31, 2015 in connection with International Patent Application PCT/US2015/030383, 8 pages.
International Search Report issued on Aug. 20, 2020 in connection with International PCT application No. PCT/CA2020/050683, 5 pages.
International Search Report issued on Aug. 21, 2020 in connection with International PCT application No. PCT/CA2020/050686, 4 pages.
International Search report issued on Aug. 25, 2020 in connection with International PCT application No. PCT/CA2020/050684, 7 pages.
Non-Final Office Action issued Mar. 14, 2022 in connection with U.S. Appl. No. 17/611,262, 36 pages.
Non-Final Office Action issued on Aug. 24, 2015 in connection with U.S. Appl. No. 14/276,739, 5 pages.
Non-Final Office Action issued on Jan. 10, 2023 in connection with U.S. Appl. No. 15/922,526, 22 pages.
Non-Final Office Action issued on Jul. 20, 2016 in connection with U.S. Appl. No. 14/276,739, 5 pages.
Non-Final Office Action issued on Jun. 19, 2019 in connection with U.S. Appl. No. 15/922,526, 15 pages.
Non-Final Office Action issued on Jun. 5, 2020 in connection with U.S. Appl. No. 15/922,526, 16 pages.
Non-Final Office Action issued on May 1, 2017 in connection with U.S. Appl. No. 14/276,739, 7 pages.
Non-Final Office Action issued on Oct. 15, 2020 in connection with U.S. Appl. No. 16/440,655, 41 pages.
Non-Final Office Action issued on Oct. 15, 2020 in connection with U.S. Appl. No. 16/440,691, 33 pages.
Non-Final Office Action issued on Oct. 15, 2020 in connection with U.S. Appl. No. 16/440,717, 37 pages.
Non-Final Office Action issued on Sep. 7, 2021 in connection with U.S. Appl. No. 16/440,655, 35 pages.
Non-Final Office Action issued on Sep. 7, 2021 in connection with U.S. Appl. No. 16/440,691, 33 pages.
Non-Final Office Action issued on Sep. 7, 2021 in connection with U.S. Appl. No. 16/440,717, 31 pages.
Non-Final Office Action issued on Sep. 9, 2022 in connection with U.S. Appl. No. 16/440,655, 39 pages.
Notice of Allowance issued on Aug. 11, 2023 in connection with U.S. Appl. No. 15/922,526, 11 pages.
Restriction Requirement issued on Nov. 17, 2023 in connection with U.S. Appl. No. 17/526,489, 6 pages.
Final Office Action issued on Apr. 4, 2022 in connection with U.S. Appl. No. 15/922,526, 24 pages.
Final Office Action issued on Apr. 4, 2022 in connection with U.S. Appl. No. 16/440,655, 39 pages.

(56) References Cited

OTHER PUBLICATIONS

Final Office Action issued on Apr. 4, 2022 in connection with U.S. Appl. No. 16/440,691, 31 pages.
Final Office Action issued on Apr. 4, 2022 in connection with U.S. Appl. No. 16/440,717, 20 pages.
International Preliminary Report on Patentability issued on Feb. 8, 2022 in connection with International Patent Application PCT/CA2020/050684, 11 pages.
Written Opinion issued on Dec. 14, 2021 in connection with International PCT application No. PCT/CA2020/050684, 7 pages.
Non-Final Office Action issued on Sep. 9, 2022 in connection with U.S. Appl. No. 16/440,691, 32 pages.
Non-Final Office Action issued Sep. 7, 2021 in connection with U.S. Appl. No. 15/922,526, 22 pages.
Notice of Allowability issued on Nov. 16, 2017 in connection with U.S. Appl. No. 14/276,739, 3 pages.
Notice of Allowance issued on Feb. 16, 2023 in connection with U.S. Appl. No. 17/611,262, 9 pages.
Notice of Allowance issued on Nov. 9, 2017 in connection with U.S. Appl. No. 14/276,739, 7 pages.
Notice of Allowance issued on Sep. 9, 2022 in connection with U.S. Appl. No. 16/440,717, 18 pages.
Restriction Requirement issued on Jul. 17, 2020 in connection with U.S. Appl. No. 16/440,655, 9 bages.
Restriction Requirement issued on Jul. 20, 2020 in connection with U.S. Appl. No. 16/440,691, 6 pages.
Restriction Requirement issued on Jun. 9, 2015 in connection with U.S. Appl. No. 14/276,739, 5 pages.
Restriction Requirement issued on Mar. 5, 2019 in connection with U.S. Appl. No. 15/922,526, 6 pages.
Supplemental Notice of Allowability issued on Feb. 14, 2018 in connection with U.S. Appl. No. 14/276,739, 2 pages.
Written Opinion issued on Aug. 20, 2020 in connection with International PCT application No. PCT/CA2020/050683, 8 pages.
Written Opinion issued on Aug. 21, 2020 in connection with International PCT application No. PCT/CA2020/050686, 5 pages.
Written Opinion issued on Aug. 25, 2020 in connection with International PCT application No. PCT/CA2020/050684, 6 pages.
Jacobsen et al., "Interconnected self-propagating photopolymer waveguides: An alternative to stereolithography for rapid formation of lattice-based open-cellular materials", Twenty-First Annual International Solid Freeform Fabrication Symposium, TX, Aug. 9, 2010, 846-856.
Wang, X. et al., 3D printing of polymer matrix composites: A review and prospective, Composites Part B, 2017, vol. 110, pp. 442-458.
Wirth, D. M. et al. Highly expandable foam for litographic 3D printing, ACS Appl. Mater. Interfaces, 2020, 11 pp. 19033-19043.
Notice of Allowance issued on Jun. 14, 2023 in connection with U.S. Appl. No. 16/440,691, 15 pages.
Notice of Allowance issued on Jun. 7, 2023 in connection with U.S. Appl. No. 16/440,691, 17 pages.
Notice of Allowance issued on Jun. 16, 2023 in connection with U.S. Appl. No. 16/440,655, 11 pages.
Corrected Notice of Allowability issued on Jul. 19, 2023 in connection with U.S. Appl. No. 16/440,655, 9 pages.
Communication pursuant to Article 94(3) EPC issued on Jul. 3, 2024 in connection with European Patent Application No. 20810281.4, 8 pages.
Examiner Report issued on Dec. 5, 2023 in connection with Canadian Patent Application No. 3,158,266, 3 pages.
Examiner Report issued on Apr. 18, 2024 in connection with Canadian Patent Application No. 3,157,206, 4 pages.
Examiner's Report issued on Nov. 29, 2023 in connection with Canadian Patent Application No. 3,157,206, 3 pages.
Final Office Action issued on May 1, 2024 in connection with U.S. Appl. No. 17/526,489, 8 pages.
Notice of Allowance issued on Feb. 14, 2018 in connection with U.S. Appl. No. 14/276,739, 2 pages.
Notice of Allowance issued on Nov. 16, 2017 in connection with U.S. Appl. No. 14/276,739, 3 pages.
Examiner's Report issued on Jan. 2, 2024 in connection with CA patent application No. 3,141,358, 4 pages.
Non-Final Office Action issued on Dec. 21, 2023 in connection with U.S. Appl. No. 17/526,489, 11 pages.
Examiner Report issued on Dec. 4, 2024 in connection with Canadian Patent Application No. 3,158,266, 3 pages.
Non-Final Office Action issued on Dec. 4, 2024 in connection with U.S. Appl. No. 17/766,384, 9 pages.

\* cited by examiner

Octa. (shell)  Dodeca. (shell)  Trunc. Octa. (shell)
Cubic Center  Cubic Face  Gyroid (shell)

Schwarz D
(Diamond)

Scherk's
Surface 1

Neovius

Scherk's
Tower

Scherk's
Surface 2

Schoen's
IWP

Schwarz P
(Primitive)

Schoen's
Gyroid

Schoen's PA
Batwing

Schoen's PA Batwing Surface

Schoen's Gyroid Surface

Schwarz P Surface

THIS FIGURE IS ON SCALE

HELMETS COMPRISING ADDITIVELY-MANUFACTURED COMPONENTS

CROSS-REFERENCE TO RELATED APPLICATIONS

This application is a continuation of U.S. patent application Ser. No. 17/611,262 filed Nov. 15, 2021, which was a National Stage Entry of International Application No. PCT/CA2020/050683 filed May 21, 2020, which claimed the benefit of U.S. Provisional Patent Application No. 62/851,080 filed May 21, 2019 and United States Provisional Patent Application No. 62/969,307 filed Feb. 3, 2020, the entire contents of which are incorporated by reference herein.

FIELD

This disclosure relates generally to helmets (e.g., for playing hockey, lacrosse or other sports, etc.) and, more particularly, to helmets including components made by additive manufacturing.

BACKGROUND

Helmets are worn in sports and other activities (e.g., motorcycling, industrial work, military activities, etc.) to protect their wearers against head injuries. To that end, helmets typically comprise a rigid outer shell and inner padding to absorb energy when impacted.

For example, in hockey, a player wears a helmet to protect against head injuries from impacts that occur during a game.

Hockey helmets are often desired to be lightweight and have various properties, such as strength, impact resistance, linear and rotational impact protection, breathability, compactness, comfort, etc., which can sometimes be conflicting, require tradeoffs, or not be readily feasible, for cost, material limitations, manufacturability, and/or other reasons. Similar issues often arise in other sports, such as lacrosse.

For these and other reasons, there is a need to improve manufacturability, performance and use of helmets in aspects such as impact protection, fit and comfort and adjustability.

SUMMARY

According to various aspects, this disclosure relates to a helmet comprising one or more additively-manufactured components designed to enhance performance and use of the helmet, such as: impact protection, including for managing different types of impacts; fit and comfort; adjustability; and/or other aspects of the helmet.

For example, according to one aspect, this disclosure relates to a helmet comprising: a shell comprising shell members movable relative to one another; a liner disposed within the shell; and an adjustment system operable to adjust a fit of the helmet on a user's head by moving the shell members relative to one another, wherein: the helmet comprises an additively-manufactured component; and at least part of the additively-manufactured component moves when the adjustment system is operated to adjust the fit of the helmet.

According to another aspect, this disclosure relates to a helmet comprising: a shell; and a liner disposed within the shell, wherein: the helmet comprises an additively-manufactured component; at least part of the additively-manufactured component is disposed in a lateral side portion of the helmet; and a thickness of the additively-manufactured component at the lateral side portion of the helmet is no more than 22 mm.

According to another aspect, this disclosure relates to a helmet comprising: a shell; and a liner disposed within the shell, wherein: the helmet comprises an additively-manufactured component comprising a plurality of distinct zones structurally different from one another.

According to another aspect, this disclosure relates to a helmet comprising: a shell; and a liner disposed within the shell, wherein: the helmet comprises an additively-manufactured component; a first portion of the additively-manufactured component is configured to protect more against linear impact components than rotational impact components; and a second part of the additively-manufactured component is configured to protect more against rotational impact components than linear impact components.

According to another aspect, this disclosure relates to a helmet comprising: a shell; and a liner disposed within the shell, wherein: the helmet comprises an additively-manufactured component; a first portion of the additively-manufactured component is configured to protect more against higher-energy impacts than lower-energy impacts; and a second part of the additively-manufactured component is configured to protect more against lower-energy impacts than higher-energy impacts.

According to another aspect, this disclosure relates to a helmet comprising: a shell; and a liner disposed within the shell, wherein the helmet comprises a plurality of additively-manufactured components with different functions additively-manufactured integrally with one another.

According to another aspect, this disclosure relates to a helmet comprising: a shell; and a liner disposed within the shell, wherein the helmet comprises an additively-manufactured component and a non-additively-manufactured component received by the additively-manufactured component.

According to another aspect, this disclosure relates to a helmet comprising: a shell; and a liner disposed within the shell, wherein the helmet comprises an additively-manufactured component and a sensor associated with the additively-manufactured component.

According to another aspect, this disclosure relates to a method of making a helmet, the helmet comprising: a shell including shell members movable relative to one another; a liner disposed within the shell; and an adjustment system operable to adjust a fit of the helmet on a user's head by moving the shell members relative to one another, the method comprising: providing feedstock; and additively manufacturing a component of the helmet using the feedstock.

According to another aspect, this disclosure relates to a method of making a helmet, the helmet comprising a shell and a liner disposed within the shell, the method comprising: providing feedstock; and additively manufacturing a component of the helmet using the feedstock, wherein at least part of the additively-manufactured component is disposed in a lateral side portion of the helmet; and a thickness of the additively-manufactured component at the lateral side portion of the helmet is no more than 22 mm.

According to another aspect, this disclosure relates to a method of making a helmet, the helmet comprising a shell and a liner disposed within the shell, the method comprising: providing feedstock; and additively manufacturing a component of the helmet using the feedstock, wherein the additively-manufactured component comprises a plurality of distinct zones structurally different from one another.

According to another aspect, this disclosure relates to a method of making a helmet, the helmet comprising a shell and a liner disposed within the shell, the method comprising: providing feedstock; and additively manufacturing a component of the helmet using the feedstock, wherein: a first part of the additively-manufactured component is configured to protect more against linear impact components than rotational impact components; and a second part of the additively-manufactured component is configured to protect more against rotational impact components than linear impact components.

According to another aspect, this disclosure relates to a method of making a helmet, the helmet comprising a shell and a liner disposed within the shell, the method comprising: providing feedstock; and additively manufacturing a component of the helmet using the feedstock, wherein: a first part of the additively-manufactured component is configured to protect more against higher-energy impacts than lower-energy impacts; and a second part of the additively-manufactured component is configured to protect more against lower-energy impacts than higher-energy impacts.

According to another aspect, this disclosure relates to a method of making a helmet, the helmet comprising a shell and a liner disposed within the shell, the method comprising: providing feedstock; and additively manufacturing a plurality of components of the helmet that have different functions integrally with one another, using the feedstock.

According to another aspect, this disclosure relates to a helmet comprising: a shell; and a liner disposed within the shell, wherein the liner comprises an additively-manufactured component and a non-additively-manufactured component.

According to another aspect, this disclosure relates to a helmet comprising: a shell; and a liner disposed within the shell, wherein the liner comprises an additively-manufactured component having formed therein an air channel.

According to another aspect, this disclosure relates to a helmet comprising: a shell; and a liner disposed within the shell, wherein the liner comprises an additively-manufactured component and a liquid crystal elastomer component.

According to another aspect, this disclosure relates to a component for a helmet, the component comprising a 3D-printed portion, the component including expandable material expanded to define the component.

According to another aspect, this disclosure relates to a helmet comprising a component according to the above aspect.

According to another aspect, this disclosure relates to a component for a helmet, the component comprising a 3D-printed portion, the component including expandable material expanded from an initial shape to an expanded shape that is a scaled-up version of the initial shape.

According to another aspect, this disclosure relates to a method of making a component of a helmet, the method comprising: providing expandable material; 3D printing a 3D-printed portion of the component; and expanding the expandable material to define the component.

According to another aspect, this disclosure relates to a helmet comprising a component made by the method according to the above aspect.

According to another aspect, this disclosure relates to a component for a helmet, the component comprising 3D-printed expandable material expanded after being 3D printed.

According to another aspect, this disclosure relates to a helmet comprising a component according to the above aspect.

According to another aspect, this disclosure relates to a method of making a component of a helmet, the method comprising: providing expandable material; 3D printing the expandable material to create 3D-printed expandable material; and expanding the 3D-printed expandable material to define the component.

According to another aspect, this disclosure relates to a helmet comprising a component made by the method according to the above aspect.

BRIEF DESCRIPTION OF DRAWINGS

A detailed description of embodiments is provided below, by way of example only, with reference to drawings accompanying this description, in which.

Figure 1:
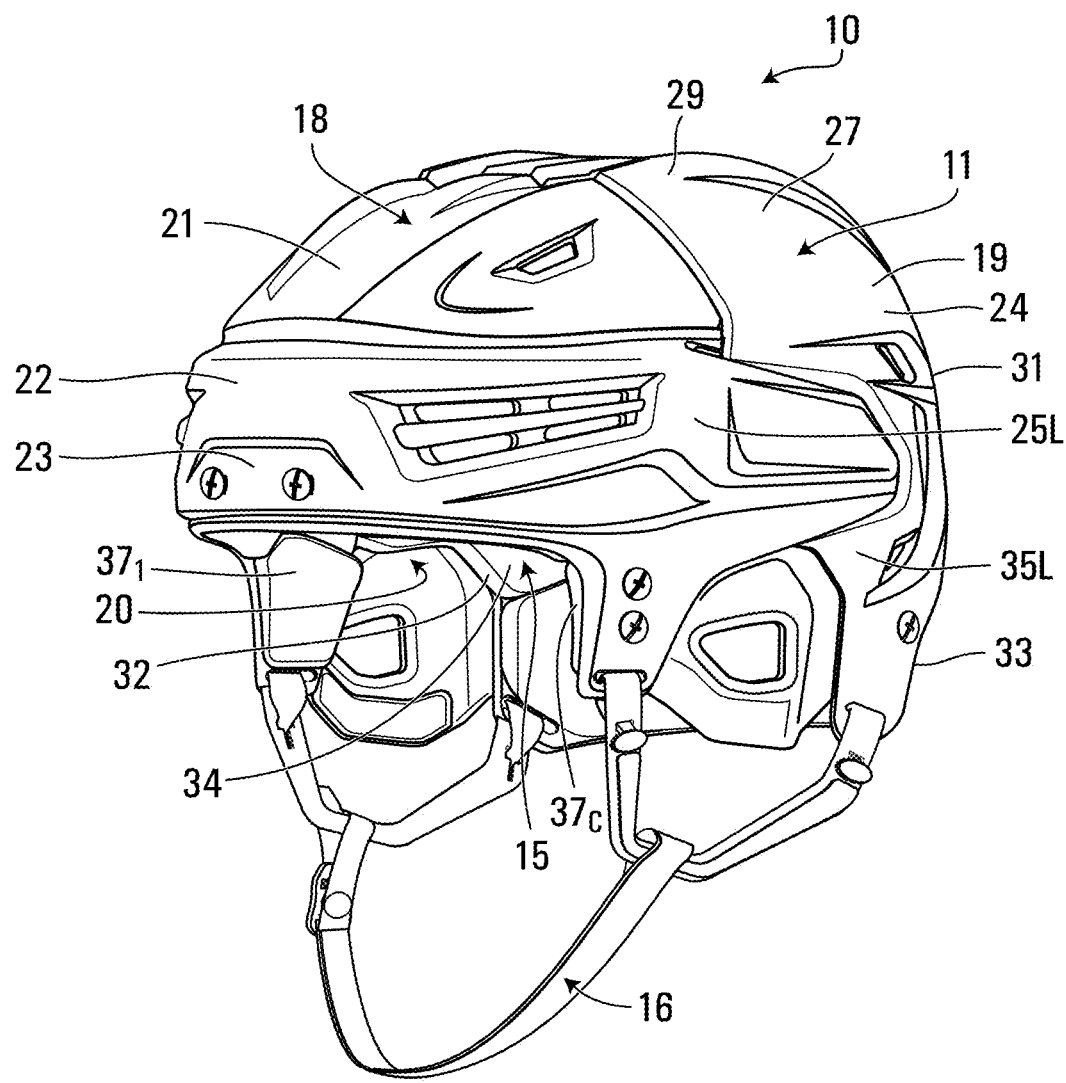
FIG. 1 shows an embodiment of a helmet for protecting a user's head and comprising additively-manufactured components.
Figure 2:
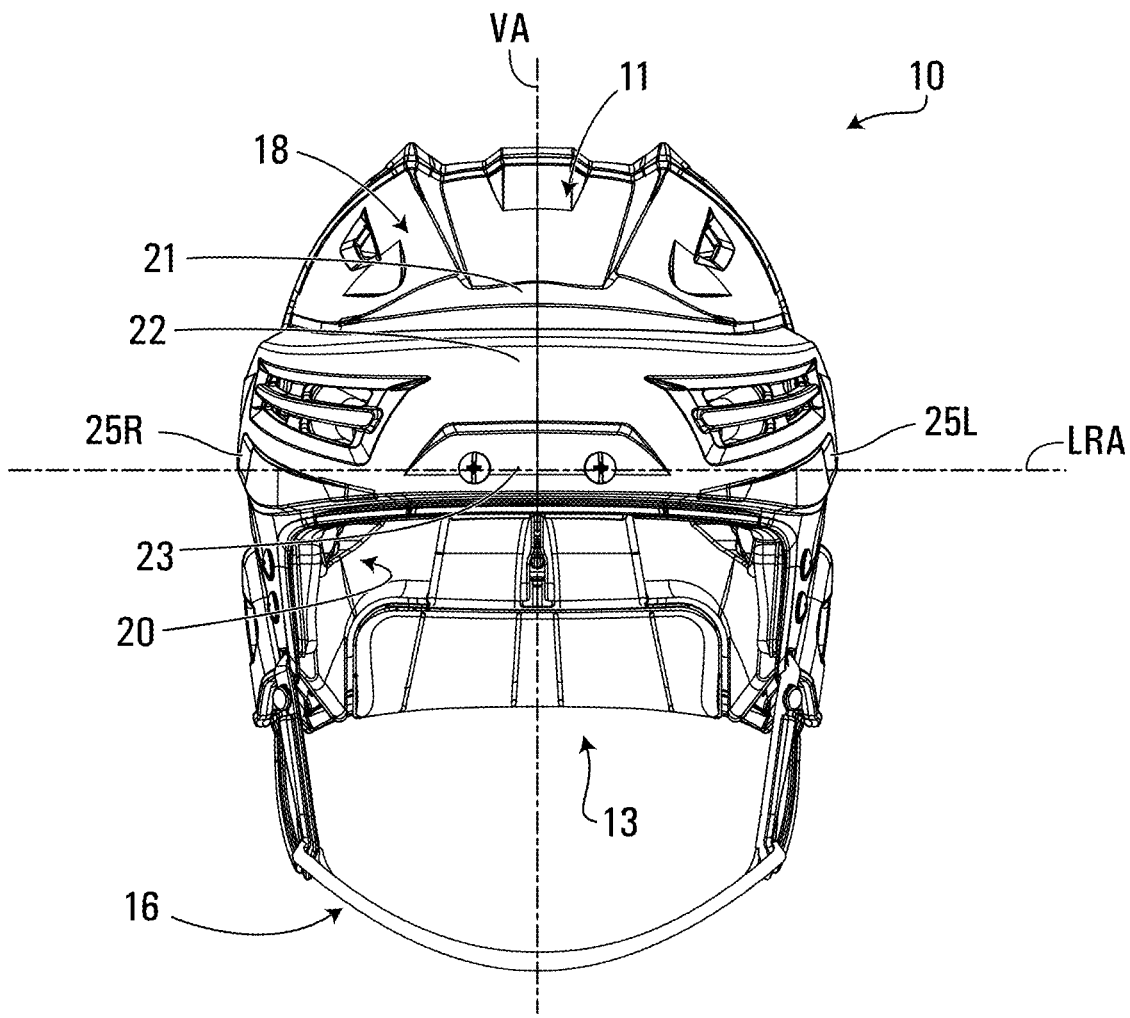
FIG. 2 shows a front view of the helmet.
Figure 3:
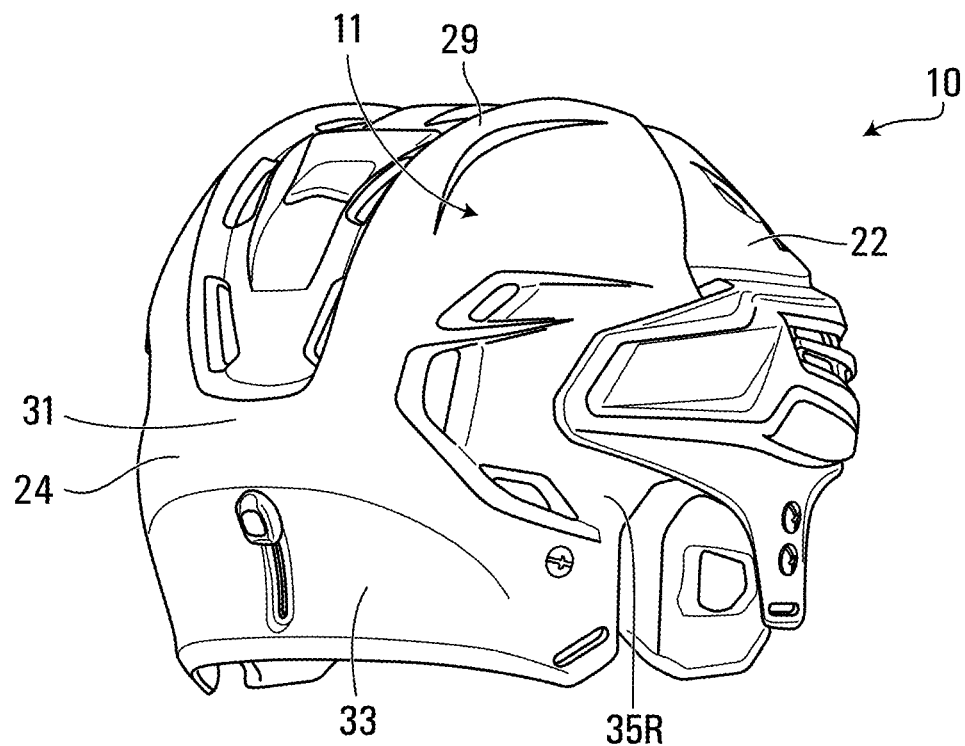
FIGS. 3 and 4 show rear perspective views of the helmet.
Figure 4:
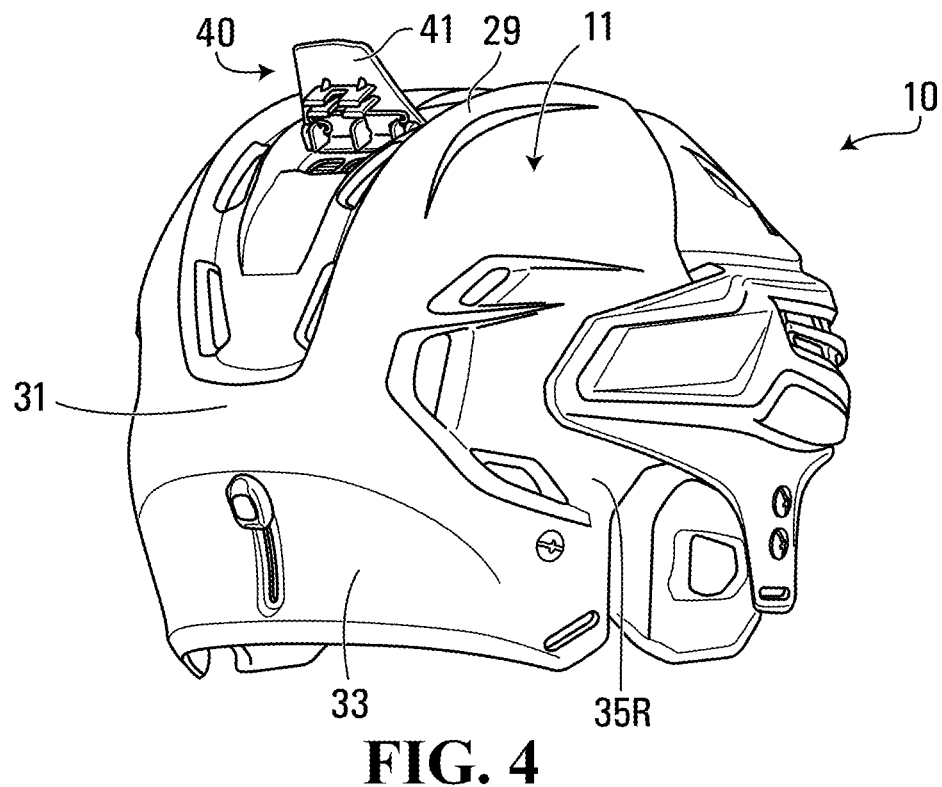

It is to be expressly understood that the description and drawings are only for purposes of illustrating certain embodiments and are an aid for understanding. They are not intended to be and should not be limiting.

DETAILED DESCRIPTION OF EMBODIMENTS

FIGS. 1 to 4 show an embodiment of a helmet 10 for protecting a user's head and comprising additively-manufactured components $12_1$-$12_4$ in accordance with an embodiment of the invention.

Each of the additively-manufactured components $12_1$-$12_4$ of the helmet 10 is a part of the helmet 10 that is additively manufactured, i.e., made by additive manufacturing, also known as 3D printing, in which material 50 thereof initially provided as feedstock (e.g., powder, liquid, filaments, fibers, and/or other suitable feedstock), which can be referred to as 3D-printed material 50, is added by a machine (i.e., a 3D printer) that is computer-controlled (e.g., using a digital 3D model such as a computer-aided design (CAD) model that may have been generated by a 3D scan of the intended wearer's head) to create it in its three-dimensional form (e.g., layer by layer, or by continuous liquid interface production from a pool of liquid, or by applying continuous fibers, or in any other way, normally moldlessly, i.e., without any mold). This is in contrast to subtractive manufacturing (e.g., machining) where material is removed and molding where material is introduced into a mold's cavity.

Any 3D-printing technology may be used to make the additively-manufactured components $12_1$-$12_4$ of the helmet 10. For instance, in some embodiments, one or more of the following additive manufacturing technologies may be used individually or in combination: material extrusion technologies, such as fused deposition modeling (FDM); vat photopolymerization technologies, such as stereolithography (SLA), digital light processing (DLP), continuous digital light processing (CDLP) or continuous liquid interface production (CLIP) with digital light synthesis (DLS); powder bed fusion technologies, such as multi-jet fusion (MJF), selective laser sintering (SLS), direct metal laser sintering/selective laser melting (DMLS/SLM), or electron beam melting (EBM); material jetting technologies, such as material jetting (MJ), nanoparticle jetting (NPJ) or drop on demand (DOD); binder jetting (BJ) technologies; sheet lamination technologies, such as laminated object manufacturing (LOM); material extrusion technologies, such as continuous-fiber 3D printing or fused deposition modeling (FDM), and/or any other suitable 3D-printing technology. Non-limiting examples of suitable 3D-printing technologies may include those available from Carbon (www.carbon3d.com), EOS (https://www.eos.info/en), HP (https://www8.hp.com/ca/en/printers/3d-printers.html), Arevo (https://arevo.com), and Continuous Composites (https://www.continuouscomposites.com/).

As further discussed later, in this embodiment, the additively-manufactured components $12_1$-$12_4$ of the helmet 10, which may be referred to as "AM" components, are designed to enhance performance and use of the helmet 10, such as: impact protection, including for managing different types of impacts; fit and comfort; adjustability; and/or other aspects of the helmet 10.

In this embodiment, the helmet 10 is an athletic helmet for protecting the head of the user who is engaging in a sport or other athletic activity against impacts. More particularly, in this embodiment, the helmet 10 is a hockey helmet for protecting the head of the user, who is a hockey player, against impacts (e.g., from a puck or ball, a hockey stick, a board, ice or another playing surface, etc., with another player, etc.).

Figure 5:
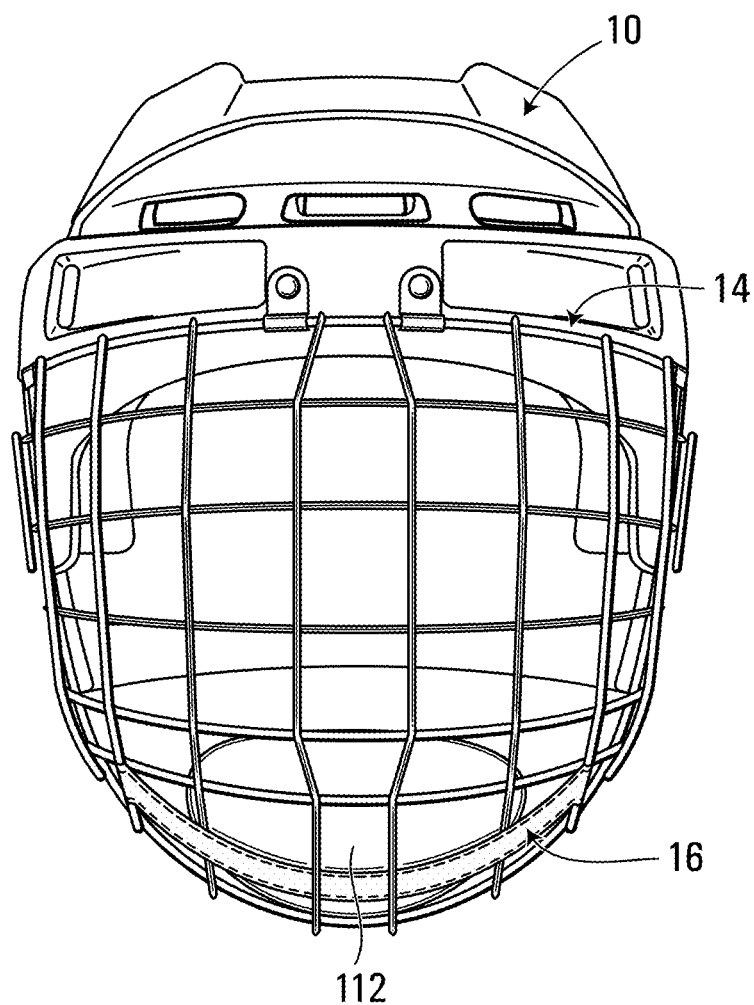
FIGS. 5 and 6 show examples of a faceguard that may be provided on the helmet.
Figure 6:
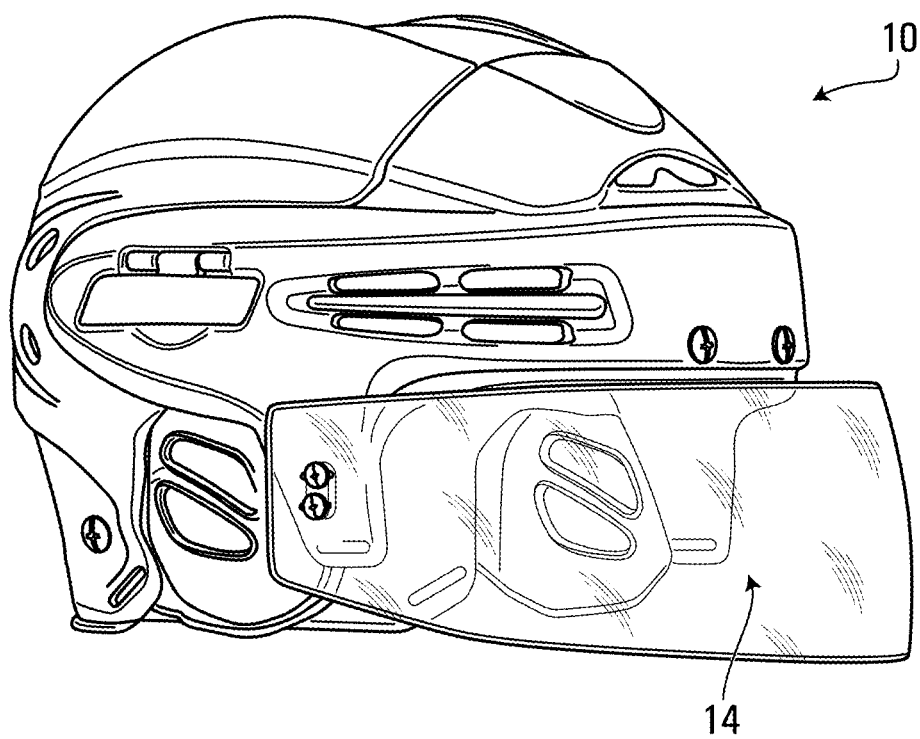

The helmet 10 comprises an outer shell 11 and a liner 15 to protect the player's head. In this example, the helmet 10 also comprises a chinstrap 16 for securing the helmet 10 to the player's head. The helmet 10 may also comprise a faceguard 14 (as shown in FIGS. 5 and 6) to protect at least part of the player's face (e.g., a grid (sometimes referred to as a "cage") and a chin cup 112 as shown in FIG. 5 or a visor (sometimes referred to as a "shield") as shown in FIG. 6).

Figure 7:
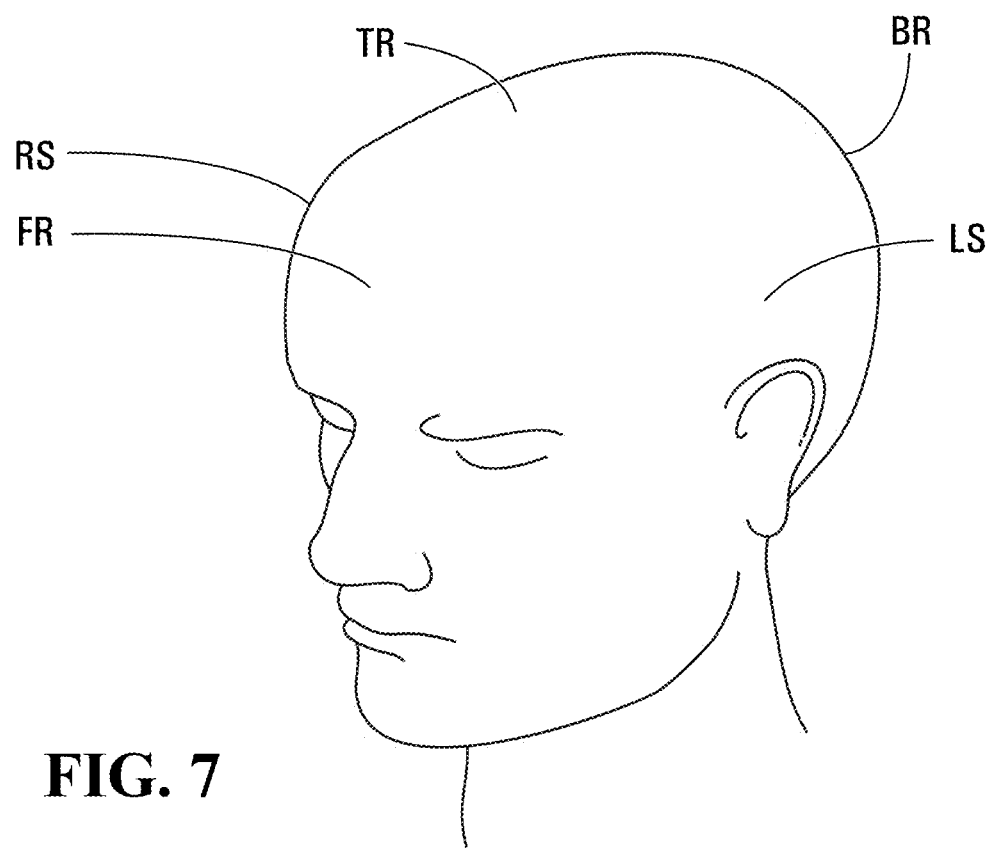
FIGS. 7 and 8 show the head of a user.
Figure 8:
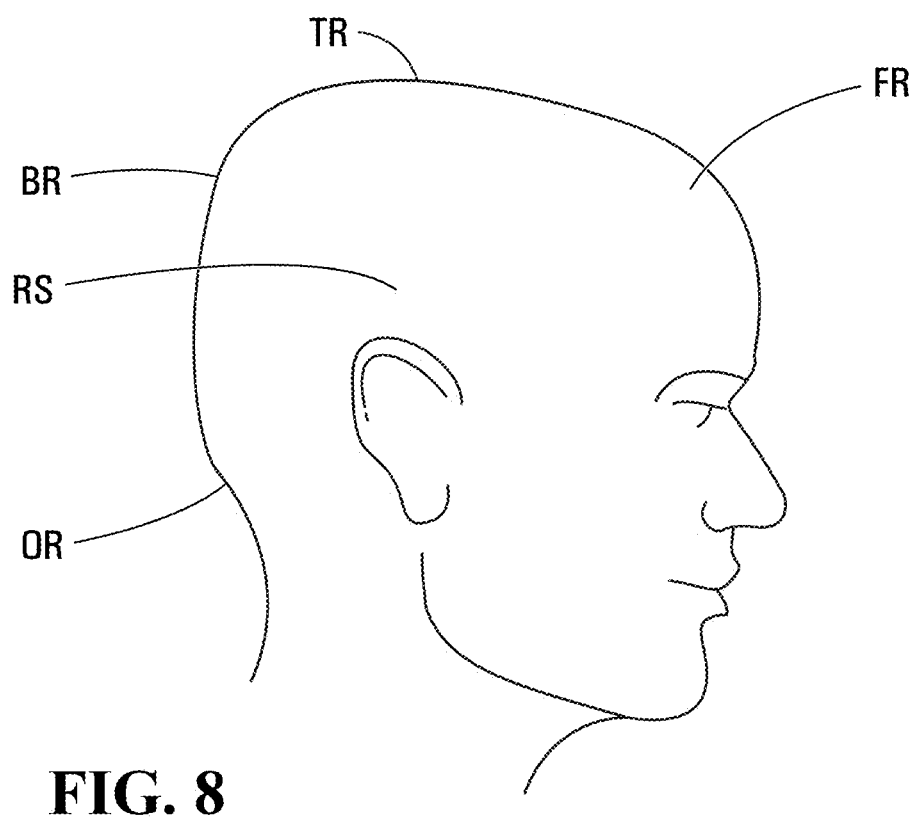

The helmet 10 defines a cavity 13 for receiving the player's head. In response to an impact, the helmet 10 absorbs energy from the impact to protect the player's head. The helmet 10 protects various regions of the player's head. As shown in FIGS. 7 and 8, the player's head comprises a front region FR, a top region TR, left and right side regions LS, RS, a back region BR, and an occipital region OR. The front region FR includes a forehead and a front top part of the player's head and generally corresponds to a frontal bone region of the player's head. The left and right side regions LS, RS are approximately located above the player's ears. The back region BR is opposite the front region FR and includes a rear upper part of the player's head. The occipital region OR substantially corresponds to a region around and under the head's occipital protuberance.

The helmet 10 comprises an external surface 18 and an internal surface 20 that contacts the player's head when the helmet 10 is worn. The helmet 10 has a front-back axis FBA, a left-right axis LRA, and a vertical axis VA which are respectively generally parallel to a dorsoventral axis, a dextrosinistral axis, and a cephalocaudal axis of the player when the helmet 10 is worn and which respectively define a front-back direction, a lateral direction, and a vertical direction of the helmet 10. Since they are generally oriented longitudinally and transversally of the helmet 10, the front-back axis FBA and the left-right axis LRA can also be referred to as a longitudinal axis and a transversal axis, respectively, while the front-back direction and the lateral direction can also be referred to a longitudinal direction and a transversal direction, respectfully.

The outer shell 11 provides strength and rigidity to the helmet 10. To that end, the outer shell 11 typically comprises a rigid material 27. For example, in various embodiments, the rigid material 27 of the outer shell 11 may be a thermoplastic material such as polyethylene (PE), polyamide (nylon), or polycarbonate, a thermosetting resin, or any other suitable material. The outer shell 11 includes an inner surface 17 facing the inner liner 15 and an outer surface 19 opposite the inner surface 17. The outer surface 19 of the outer shell 11 constitutes at least part of the external surface 18 of the helmet 10. In some embodiments, the outer shell 11 or at least portions thereof may be manufactured via additive manufacturing and portions thereof may have differing properties. For example, portions of the outer shell 11 may be additively manufactured such that they differ in terms of rigidity (e.g., to save on weight in areas of the helmet in which rigidity is less crucial and/or to intentionally provide flexibility in certain areas of the shell in order to provide impact cushioning via the shell).

In this embodiment, the outer shell 11 comprises shell members 22, 24 that are connected to one another. In this example, the shell member 22 comprises a top portion 21 for facing at least part of the top region TR of the player's head, a front portion 23 for facing at least part of the front region FR of the player's head, and left and right lateral side portions 25L, 25R extending rearwardly from the front portion 23 for facing at least part of the left and right side regions LS, RS of the player's head, respectively. The shell member 24 comprises a top portion 29 for facing at least part of the top region TR of the player's head, a back portion 31 for facing at least part of the back region BR of the player's head, an occipital portion 33 for facing at least part of the occipital region OR of the player's head, and left and right lateral side portions 35L, 35R extending forwardly from the back portion 31 for facing at least part of the left and right side regions LS, RS of the player's head, respectively.

Figure 9:
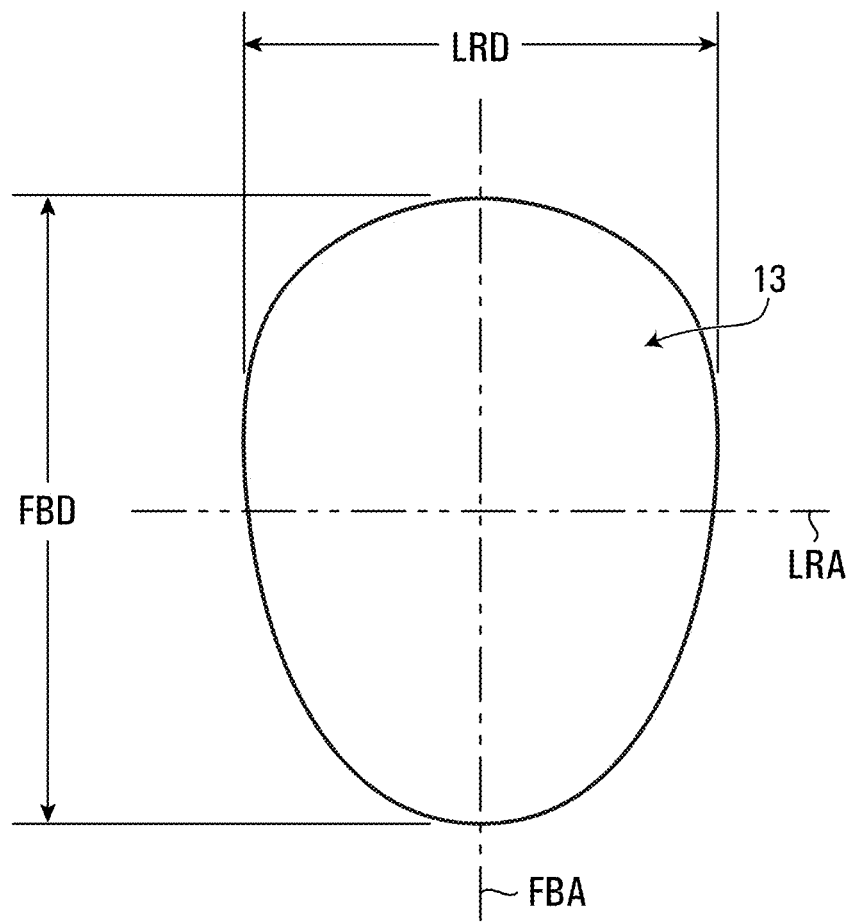
FIG. 9 shows internal dimensions of a head-receiving cavity of the helmet.

In this embodiment, the helmet 10 is adjustable to adjust how it fits on the player's head. To that end, the helmet 10 comprises an adjustment mechanism 40 for adjusting a fit of the helmet 10 on the player's head. The adjustment mechanism 40 may allow the fit of the helmet 10 to be adjusted by adjusting one or more internal dimensions of the cavity 13 of the helmet 10, such as a front-back internal dimension FBD of the cavity 13 in the front-back direction of the helmet 10 and/or a left-right internal dimension LRD of the cavity 13 in the left-right direction of the helmet 10, as shown in FIG. 9.

Figure 10:
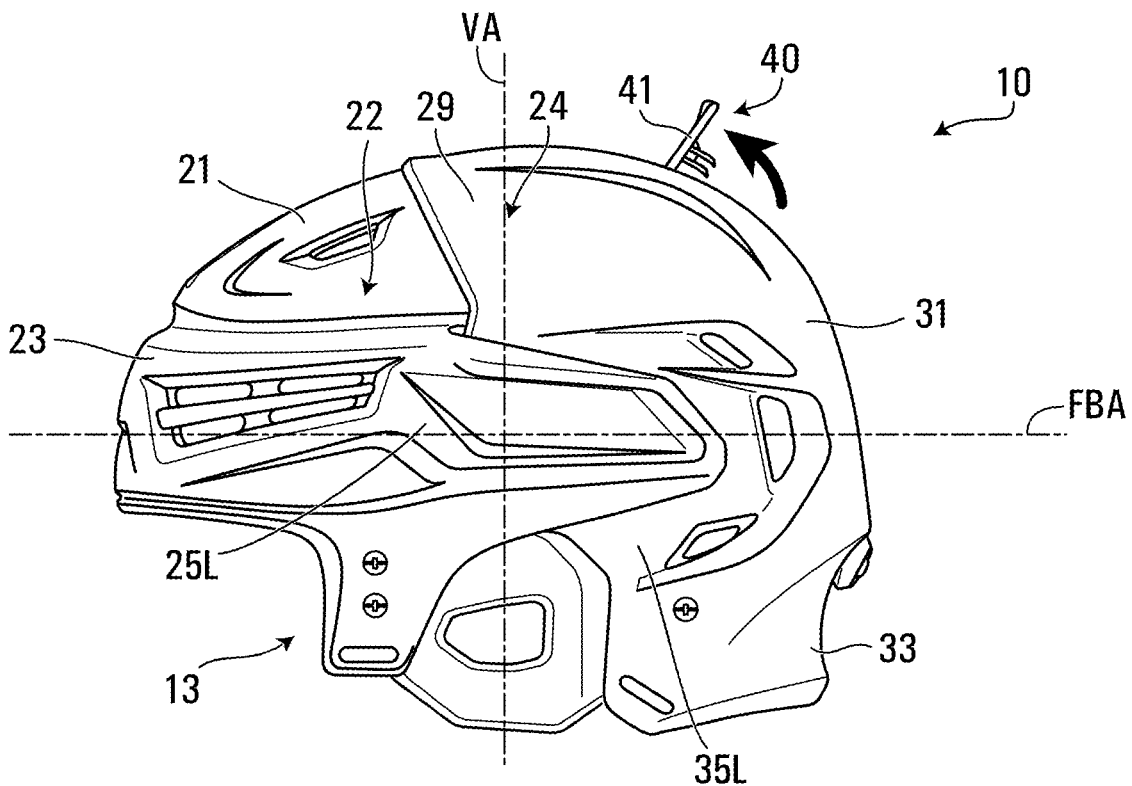
FIGS. 10 to 13 show operation of an example of an adjustment mechanism of the helmet.
Figure 11:
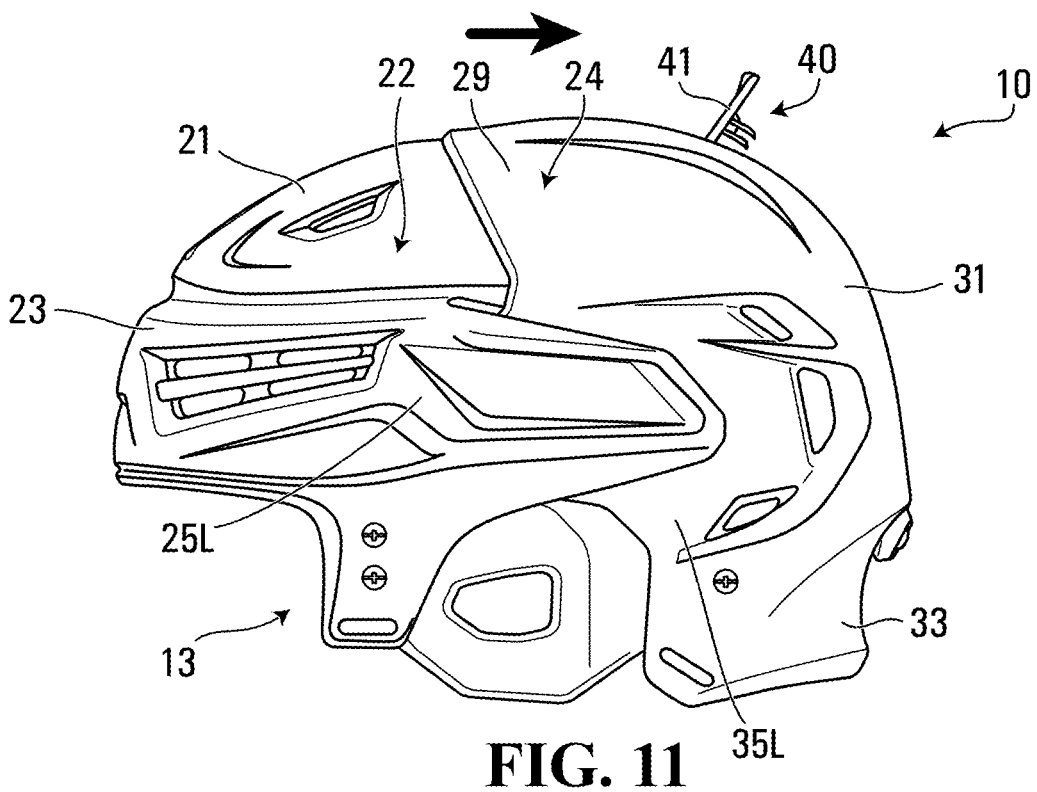
Figure 12:
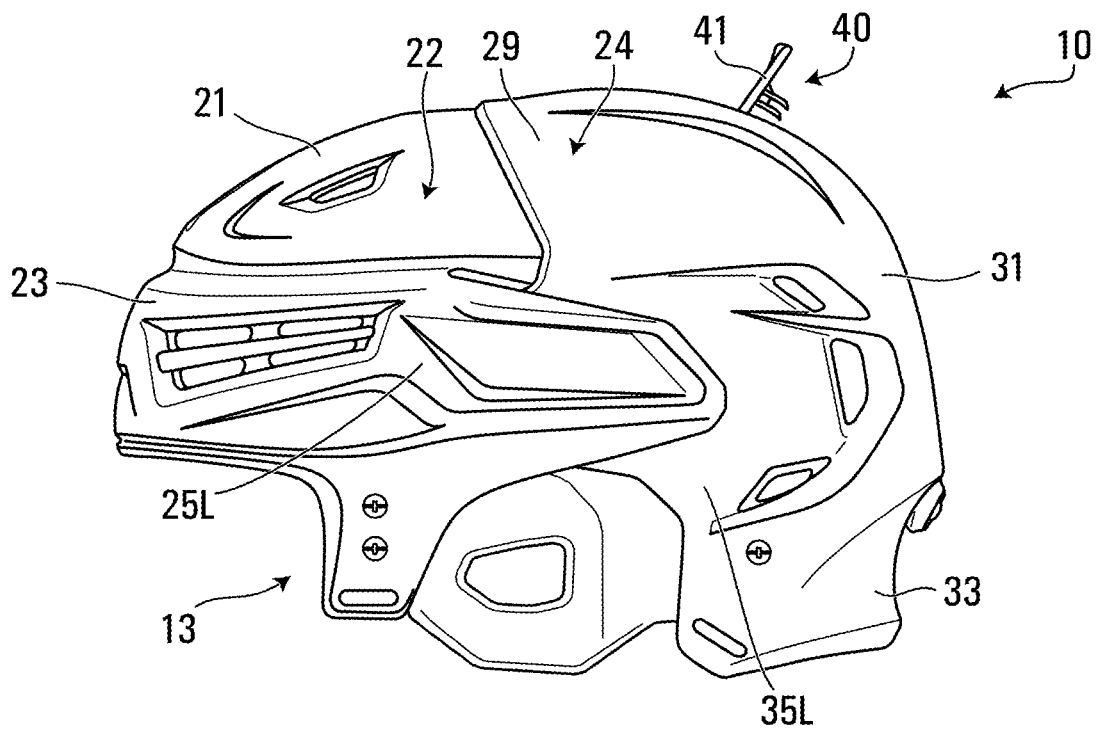
Figure 13:
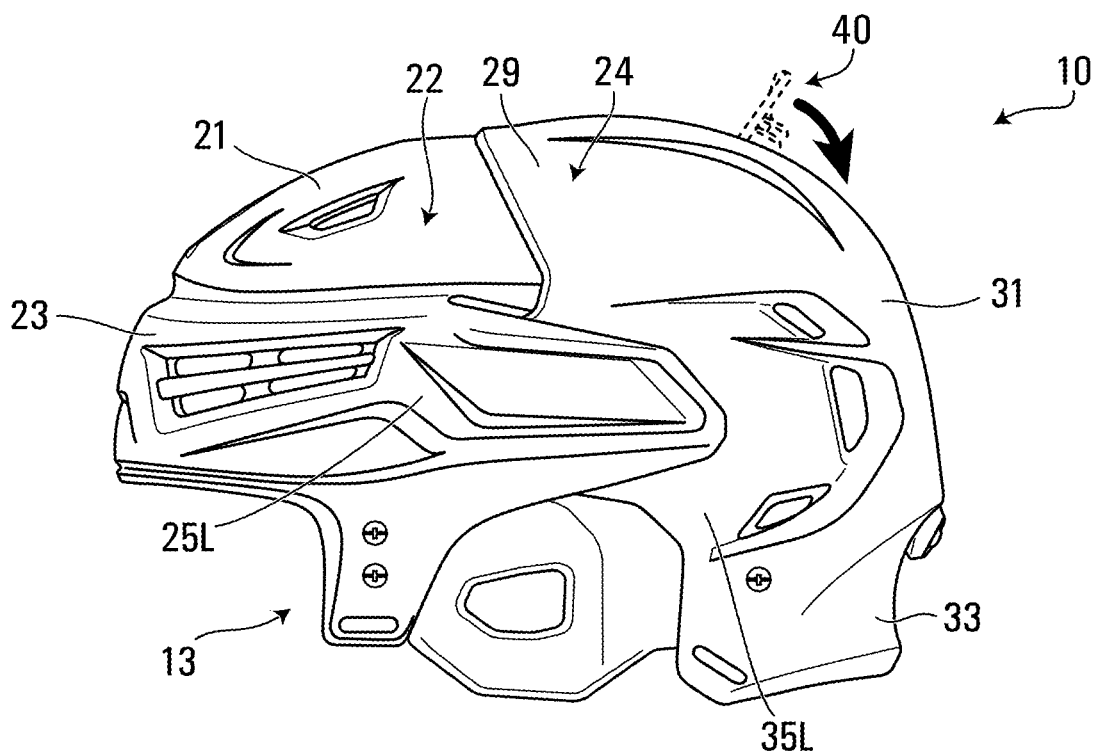

More particularly, in this embodiment, the adjustment mechanism 40 is configured such that the outer shell 11 and the inner liner 15 are adjustable to adjust the fit of the helmet on the player's head. To that end, in this embodiment, the shell members 22, 24 are movable relative to one another to adjust the fit of the helmet 10 on the player's head. In this example, relative movement of the shell members 22, 24 for adjustment purposes is in the front-back direction of the helmet 10 such that the front-back internal dimension FBD of the cavity 13 of the helmet 10 is adjusted. This is shown in FIGS. 10 to 13 in which the shell member 24 is moved relative to the shell member 22 from a first position, which is shown in FIG. 10 and which corresponds to a minimum size of the helmet 10, to a second position, which is shown in FIG. 11 and which corresponds to an intermediate size of the helmet 10, and to a third position, which is shown in FIGS. 12 and 13 and which corresponds to a maximum size of the helmet 10.

Figure 14:
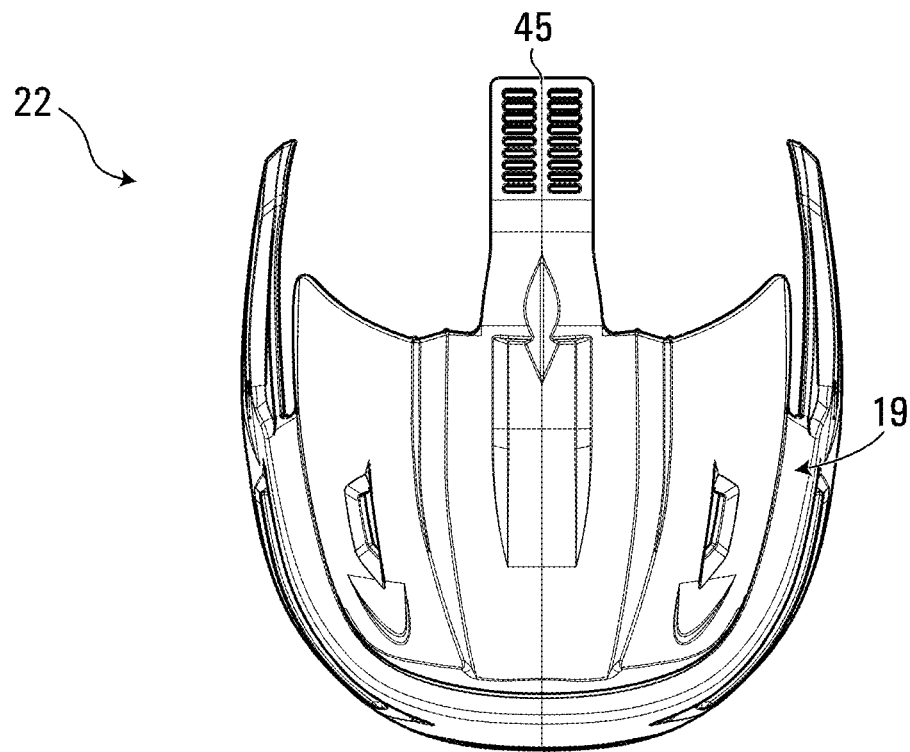
FIGS. 14 and 15 show an example of shell members of an outer shell of the helmet.
Figure 15:
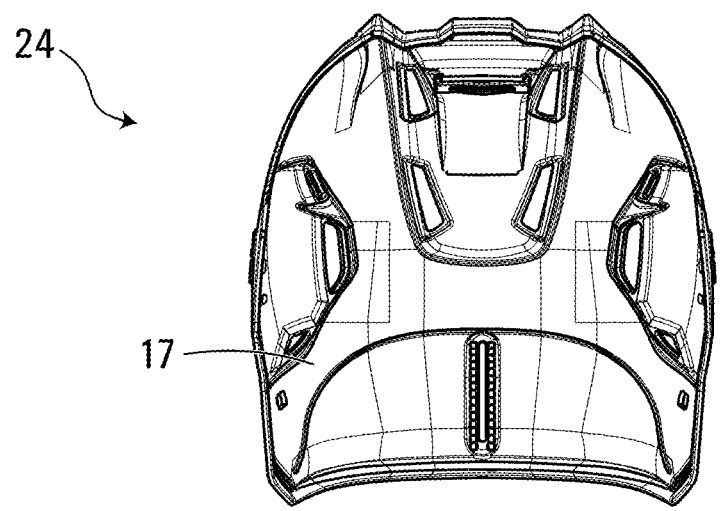
Figure 16:
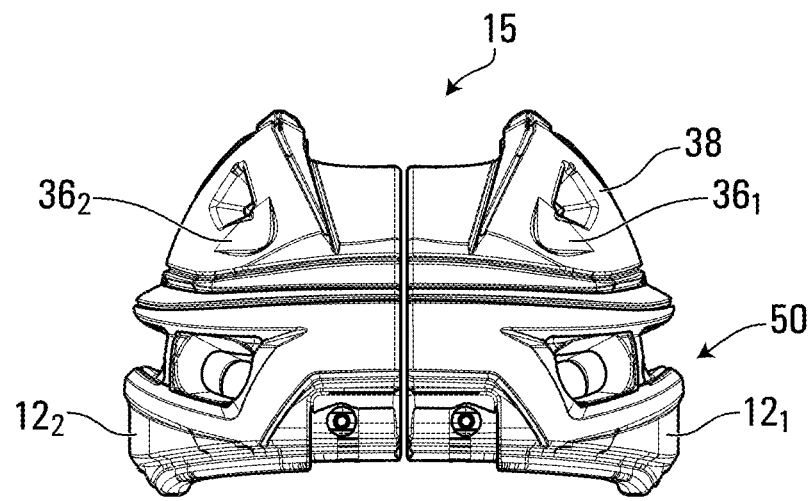
FIGS. 16 to 20 show an example of a plurality of additively-manufactured components constituting a plurality of pads of an inner liner of the helmet.
Figure 17:
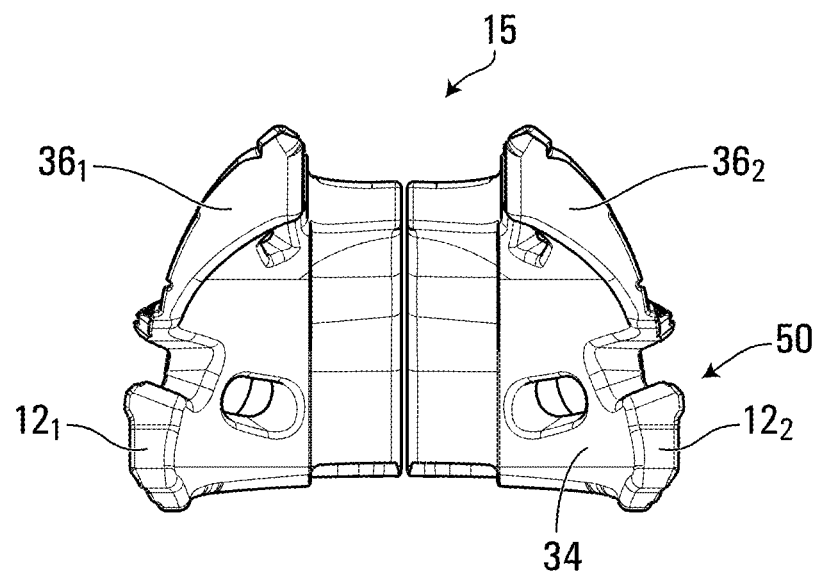
Figure 18:
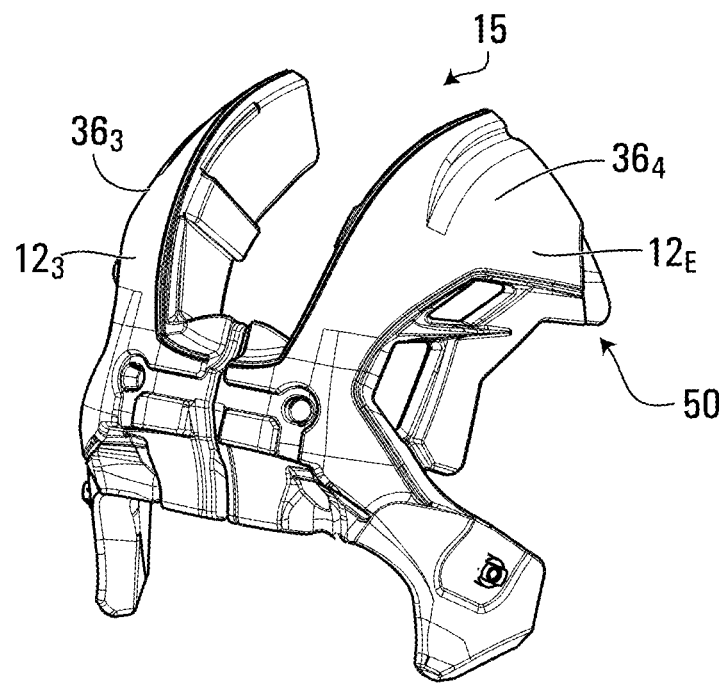
Figure 19:
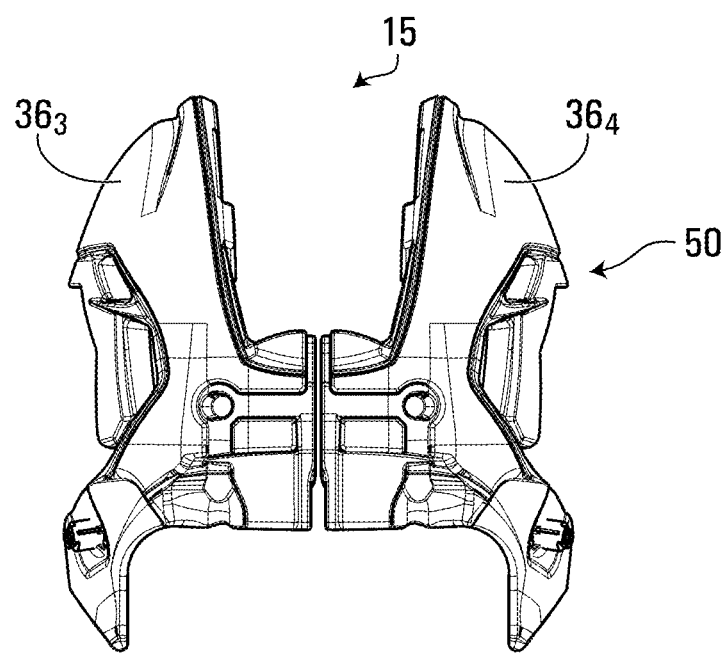
Figure 20:
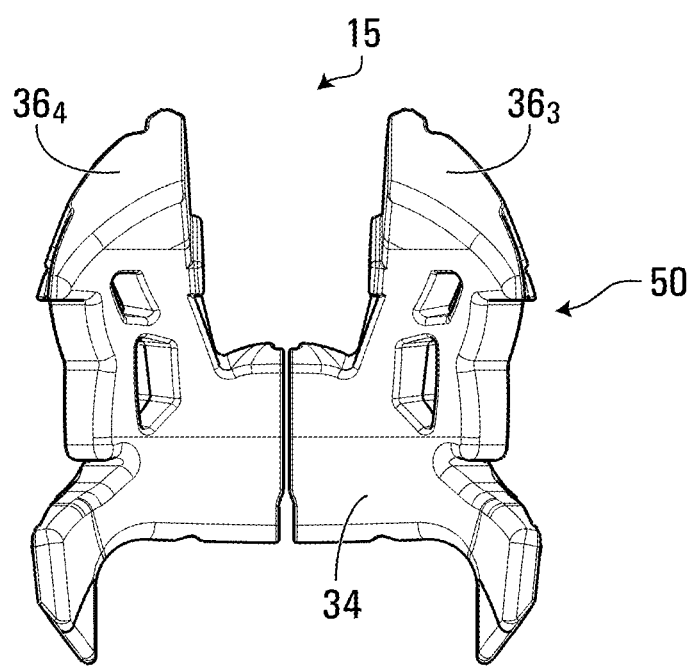

In this example of implementation, the adjustment mechanism 40 comprises an actuator 41 that can be moved (in this case pivoted) by the player between a locked position, in which the actuator 41 engages a locking part 45 (as best shown in FIGS. 14 and 15) of the shell member 22 and thereby locks the shell members 22, 24 relative to one another, and a release position, in which the actuator 41 is disengaged from the locking part 45 of the shell member 22 and thereby permits the shell members 22, 24 to move relative to one another so as to adjust the size of the helmet 10. The adjustment mechanism 40 may be implemented in any other suitably way in other embodiments.

For instance, in some cases, the shock-absorbing material may include a polymeric foam (e.g., expanded polypropylene (EPP) foam, expanded polyethylene (EPE) foam, expanded polymeric microspheres (e.g., Expancel™ microspheres commercialized by Akzo Nobel), or any other suitable polymeric foam material) and/or a polymeric structure comprising one or more polymeric materials. Any other material with suitable impact energy absorption may be used in other embodiments. For example, in some embodiments, the shock-absorbing material may include liquid crystal elastomer (LCE) components, as discussed in further detail later on with reference to FIGS. 46 to 48. Additionally or alternatively, in some embodiments, the inner liner 15 may comprise an array of shock absorbers that are configured to deform when the helmet 10 is impacted. For instance, in some cases, the array of shock absorbers may include an array of compressible cells that can compress when the helmet 10 is impacted. Examples of this are described in U.S. Pat. No. 7,677,538 and U.S. Patent Application Publication 2010/0258988, which are incorporated by reference herein.

The liner 15 may be connected to the outer shell 11 in any suitable way. For example, in some embodiments, the inner liner 15 may be fastened to the outer shell 11 by one or more fasteners such as mechanical fasteners (e.g., tacks, staples, rivets, screws, stitches, etc.), an adhesive, or any other suitable fastener. In some embodiments, the liner 15 and/or the outer shell 11 may be manufactured via additive manufacturing such that they incorporate corresponding mating elements that are configured to securely engage one another, potentially without the need for other fastening means to fasten the liner 15 to the outer shell 11. In other embodiments, at least a portion of the liner 15 and at least a portion of the outer shell 11 may be additively manufactured as a unitary structure. For example, a rear portion of the liner 15 may be additively-manufactured together with the rear shell member 24 and/or a front portion of the liner 15 may be additively-manufactured together with the front portion 23 of the front shell member 22.

In this embodiment, the liner 15 comprises a plurality of pads $36_1$-$36_4$, $37_1$-$37_C$ disposed between the outer shell 11 and the player's head when the helmet 10 is worn. In this example, respective ones of the pads $36_1$-$36_4$, $37_1$-$37_C$ are movable relative to one another and with the shell members 22, 24 to allow adjustment of the fit of the helmet 10 using the adjustment mechanism 40.

In this example, the pads $36_1$-$36_4$ are responsible for absorbing at least a bulk of the impact energy transmitted to the inner liner 15 when the helmet 10 is impacted and can therefore be referred to as "absorption" pads. In this embodiment, the pad $36_1$ is for facing at least part of the front region FR and left side region LS of the player's head, the pad $36_2$ is for facing at least part of the front region FR and right side region RS of the player's head, the pad $36_3$ is for facing at least part of the back region BR and left side region LS of the player's head, the pad $36_4$ is for facing at least part of the back region BR and right side region RS of the player's head. Another pad, (not shown in FIGS. 16 to 20) is for facing at least part of the top region TR and back region BR of the player's head. The shell member 22 overlays the pads $36_1$, $36_2$ while the shell member 24 overlays the pads $36_3$, $36_4$.

In this embodiment, the pads $37_1$-$37_C$ are responsible to provide comfort to the player's head and can therefore be referred to as "comfort" pads. The comfort pads $37_1$-$37_C$ may comprise any suitable soft material providing comfort to the player. For example, in some embodiments, the comfort pads $37_1$-$37_C$ may comprise polymeric foam such as polyvinyl chloride (PVC) foam, polyurethane foam (e.g., PORON XRD foam commercialized by Rogers Corporation), vinyl nitrile foam or any other suitable polymeric foam material and/or a polymeric structure comprising one or more polymeric materials. In some embodiments, given ones of the comfort pads $37_1$-$37_C$ may be secured (e.g., adhered, fastened, etc.) to respective ones of the absorption pads $36_1$-$36_4$. In other embodiments, given ones of the comfort pads $37_1$-$37_C$ may be mounted such that they are movable relative to the absorption pads $36_1$-$36_4$. For example, in some embodiments, one or more of the comfort pads $37_1$-$37_C$ may be part of a floating liner as described in U.S. Patent Application Publication 2013/0025032, which, for instance, may be implemented as the SUSPEND-TECH™ liner member found in the BAUER™ RE-AKT™ and RE-AKT 100™ helmets made available by Bauer Hockey, Inc. The comfort pads $37_1$-$37_C$ may assist in absorption of energy from impacts, in particular, low-energy impacts.

In this embodiment, the liner 15 comprises respective ones of the AM components $12_1$-$12_4$ of the helmet 10. More particularly, in this embodiment, respective ones of the pads $36_1$-$36_4$ comprise respective ones of the AM components $12_1$-$12_4$ of the helmet 10. In some embodiments, one or more other components of the helmet 10, such as the outer shell 11, comfort pads $37_1$-$37_C$, face guard 14 and/or chin cup 112 may also or instead be AM components.

A pad $36_X$ comprising an AM component $12_X$ of the helmet 10 may be configured to enhance performance and use of the helmet 10, such as: impact protection, including for managing different types of impacts; fit and comfort; adjustability; and/or other aspects of the helmet 10.

For example, in some embodiments, the AM component $12_X$ comprised by the pad $36_X$ may be configured to provide multi-impact protection for repeated and different types of impacts, including linear and rotational impacts, which may be at different energy levels, such as high-energy, mid-energy, and low-energy impacts, as experienced during hockey.

The AM component $12_X$ comprised by the pad $36_X$ may provide such multi-impact protection while remaining relatively thin, i.e., a thickness $T_c$ of the AM component $12_X$ comprised by the pad $36_X$ is relatively small, so that a thickness $T_h$ of the helmet 10 at the AM component $12_X$, which can be referred to as an "offset" of the helmet 10 at that location, is relatively small.

As an example, in some embodiments, at least part of the AM component $12_X$ comprised by the pad $36_X$ may be disposed in a given one of the lateral side portions 25L, 25R of the helmet 10 and the thickness $T_c$ of the AM component $12_X$ comprised by the pad $36_X$ at that given one of the lateral side portions 25L, 25R of the helmet 10 may be no more than 22 mm, in some cases no more than 20 mm, in some cases no more than 18 mm, and in some cases no more than 16 mm (e.g., 15 mm or less). This may allow the offset of the helmet 10 at the lateral side portions 25L, 25R of the helmet 10 to be small, which may be highly desirable.

In other examples, in some embodiments, at least part of the AM component $12_X$ comprised by the pad $36_X$ may be disposed in a given one of the front portion 23 and the back portion 31 of the helmet 10 and the thickness $T_c$ of the AM component $12_X$ comprised by the pad $36_X$ at that given one of the front portion 23 and the back portion 31 of the helmet 10 may be no more than 22 mm, in some cases no more than 20 mm, in some cases no more than 18 mm, and in some cases no more than 16 mm (e.g., 15 mm or less). In some cases, the thickness $T_c$ of the AM component $12_X$ comprised by the pad $36_X$ at that given one of the front portion 23 and the back portion 31 of the helmet 10 may be thicker than the thickness $T_c$ of the AM component $12_X$ or another one of the AM components $12_1$-$12_4$ at a given one of the lateral side portions 44L, 44R of the helmet 10.

Figure 21A:
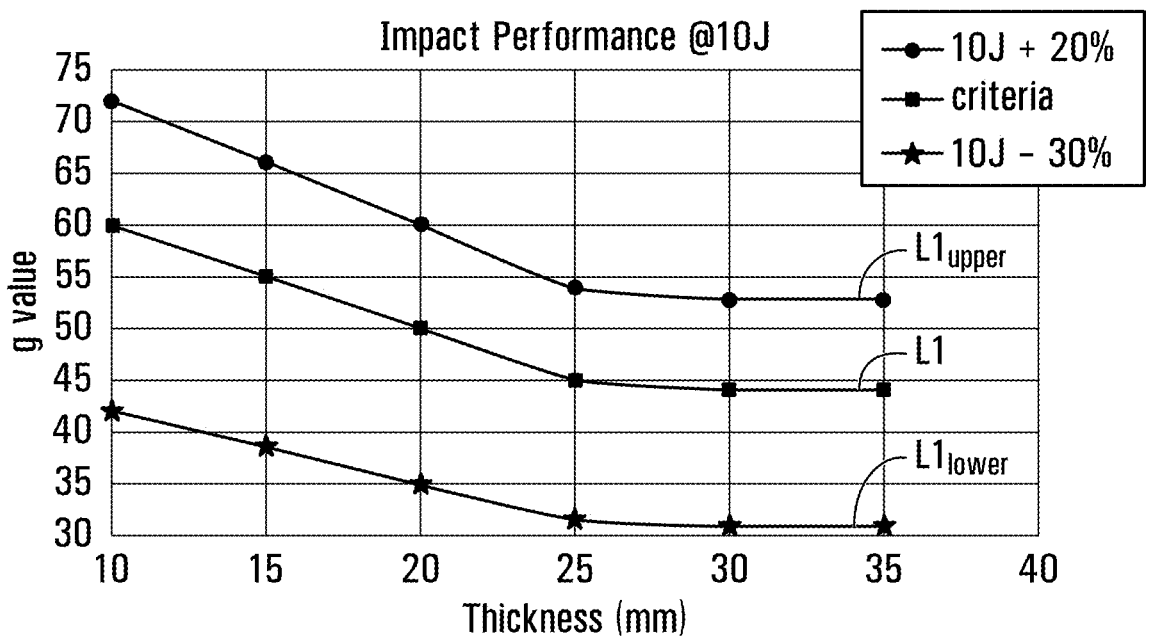
FIGS. 21A to 21C show examples of linear acceleration at a center of gravity of a headform caused by a linear impact on a helmet at three energy levels according to hockey STAR methodology.
Figure 21B:
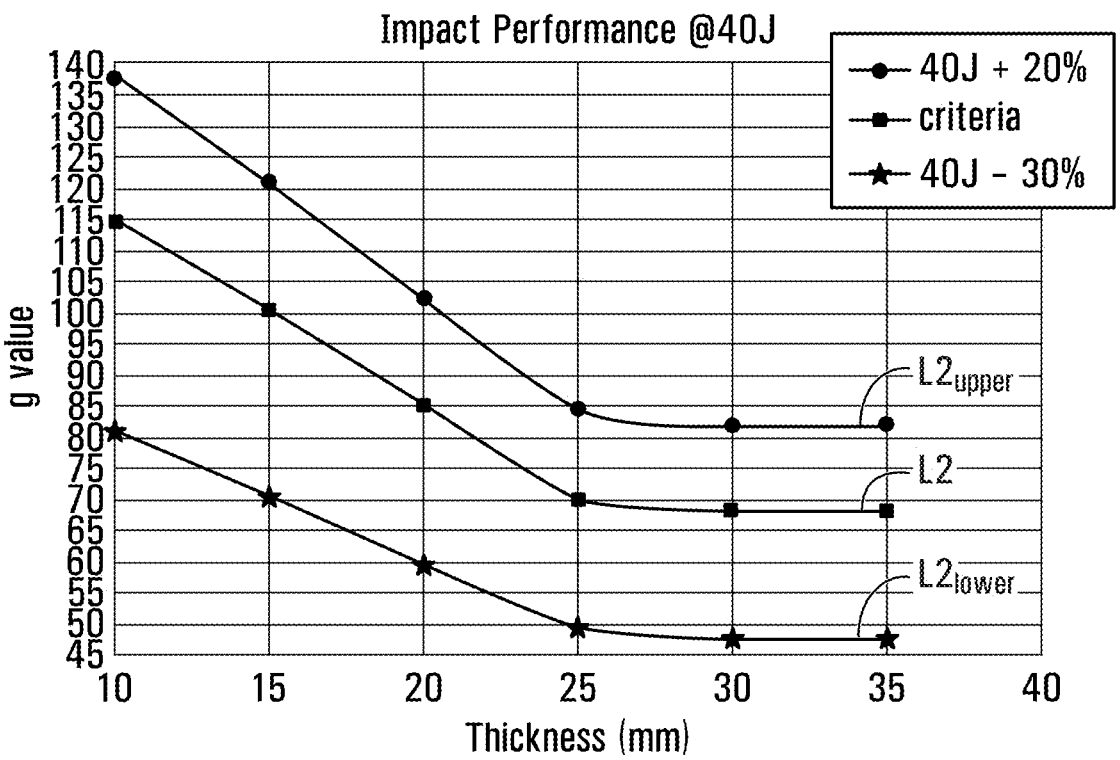
Figure 21C:
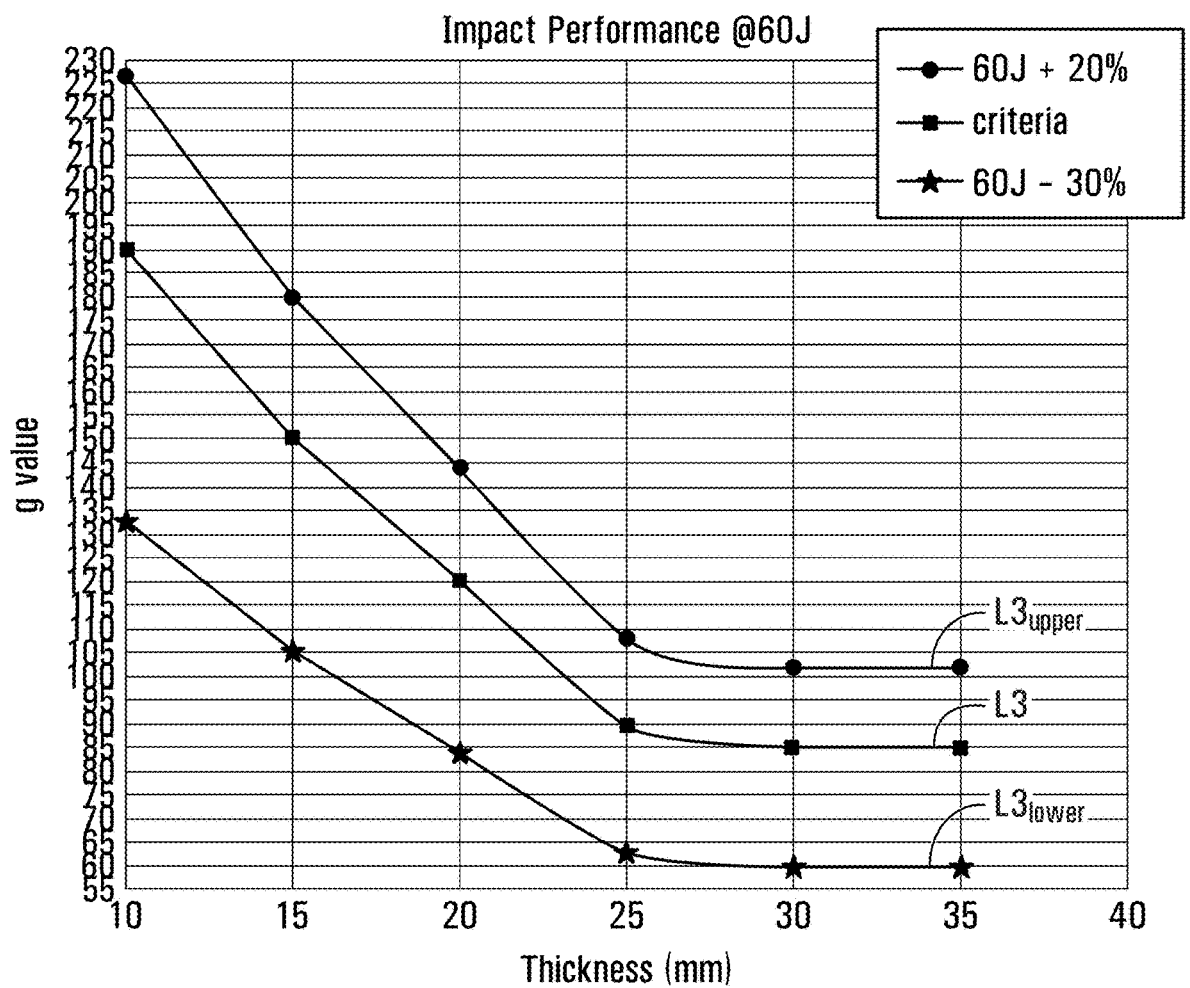

For instance, in some embodiments, the AM component $12_X$ comprised by the pad $36_X$ may be configured such that, when the helmet 10 is impacted where the AM component $12_X$ is located in accordance with hockey STAR methodology, linear acceleration at a center of gravity of a headform on which the helmet 10 is worn is no more than a value indicated by curves L1-L3 shown in FIGS. 21A-21C for impacts at three energy levels (10 Joules, 40 Joules and 60 Joules, respectively) according to hockey STAR methodology for the thickness $T_c$ of the AM component $12_X$ where impacted.

In some embodiments, the AM component $12_X$ comprised by the pad $36_X$ may be configured such that, when the helmet 10 is impacted where the AM component $12_X$ is located in accordance with hockey STAR methodology, the linear acceleration at the center of gravity of the headform on which the helmet 10 is worn may be no more than 120%, in some cases no more than 110%, and in some cases no more than 105% of the value indicated by the curves L1-L3 for impacts at three energy levels according to hockey STAR methodology for the thickness $T_c$ of the AM component $12_X$ where impacted. For example, the values indicated by the upper bound curves $L1_{upper}$-$L3_{upper}$ shown in FIGS. 21A-21C are 20% higher than those of the curves L1-L3.

In some embodiments, the AM component $12_X$ comprised by the pad $36_X$ may be configured such that, when the helmet 10 is impacted where the AM component $12_X$ is located in accordance with hockey STAR methodology, the linear acceleration at the center of gravity of the headform on which the helmet 10 is worn may be no more than 90%, in some cases no more than 80%, and in some cases no more than 70% of the value indicated by the curves L1-L3 for impacts at three energy levels according to hockey STAR methodology for the thickness $T_c$ of the AM component $12_X$ where impacted. For example, the values indicated by the lower bound curves $L1_{lower}$-$L3_{lower}$ shown in FIGS. 21A-21C are 30% lower than those of the curves L1-L3.

The hockey STAR methodology is a testing protocol described in a paper entitled "Hockey STAR: A Methodology for Assessing the Biomechanical Performance of Hockey Helmets", by B. Rowson et al., Department of Biomedical Engineering and Mechanics, Virginia Tech, 313 Kelly Hall, 325 Stanger Street, Blacksburg, VA 24061, USA, published online on Mar. 30, 2015 and incorporated by reference herein.

The AM component $12_X$ comprised by the pad $36_X$ may be designed to have properties of interest in this regard.

For example, in some embodiments, the AM component $12_X$ comprised by the pad $36_X$ may be configured in order to provide a desired stiffness. The stiffness of the AM component $12_X$ may be measured by applying a compressive load to the AM component $12_X$, measuring a deflection of the AM component $12_X$ where the compressive load is applied, and dividing the compressive load by the deflection.

As another example, in some embodiments, the AM component $12_X$ comprised by the pad $36_X$ may be configured in order to provide a desired resilience according to ASTM D2632-01 which measures resilience by vertical rebound.

Figure 22A:
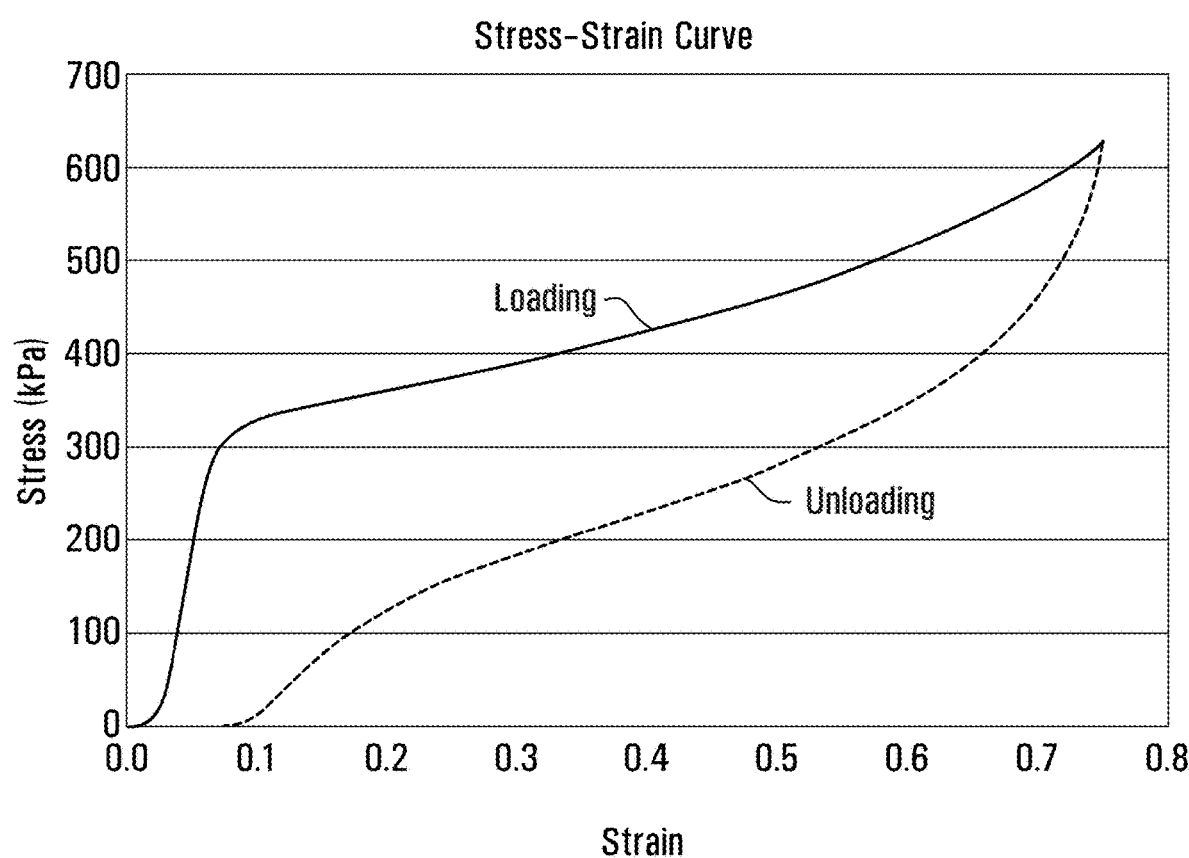
FIGS. 22A and 22B show examples of stress-strain curves for additively manufactured components comprising a pad of an inner liner of a helmet.
Figure 22B:
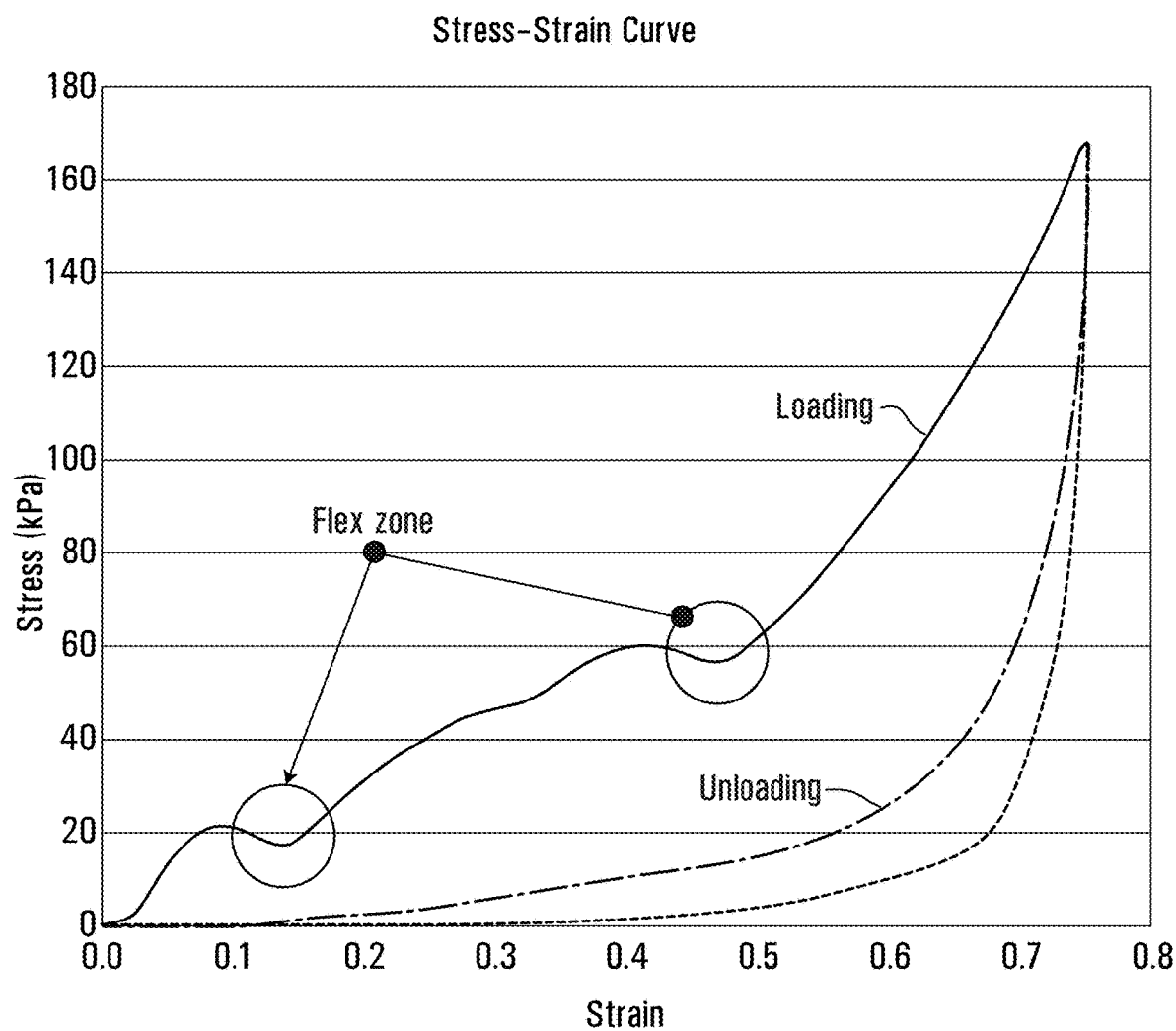

As another example, in some embodiments, the AM component $12_X$ comprised by the pad $36_X$ may be configured such that, when the AM component $12_X$ is loaded and unloaded, e.g., as a result of a stress temporarily applied to the pad $36_X$ from an impact on the helmet 10, the strain of the AM component $12_X$ is no more than a value indicated by the unloading curve shown in FIG. 22A for the unloading of the applied stress. In addition, or instead, in some embodiments, the AM component $12_X$ comprised by the pad $36_X$ may be configured such that when the AM component $12_X$ is loaded and unloaded the stress required to realize a given strain on the loading curve may be higher or lower than that of the loading curve shown in FIG. 22A, but the difference in stress between the loading and unloading curves at a given level of strain is at least as large as the difference between the loading and unloading curves shown in FIG. 22A at the given level of strain. In general, the greater the area between the loading and unloading curves for an impact absorbing component, the greater the impact energy that is absorbed by that component. For example, an impact absorbing component having the same loading curve as shown in FIG. 22B, but a lower unloading curve, as illustrated by a second dashed unloading curve in FIG. 22B, would dissipate a greater amount of impact energy.

Figure 23:
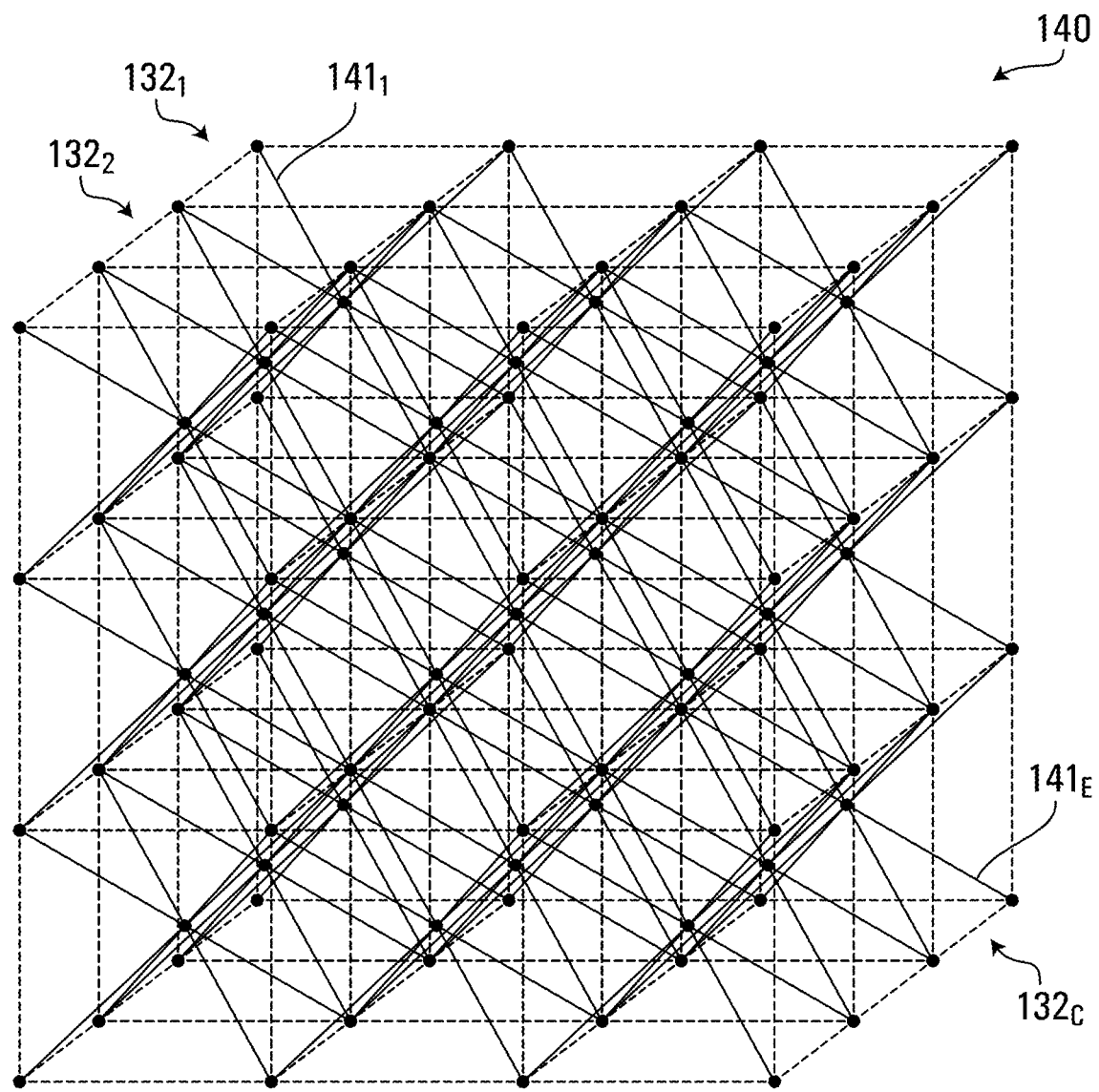
FIG. 23 shows an example of an additively-manufactured lattice structure that may be used in an additively-manufactured component.

In this embodiment, the AM component $12_X$ comprised by the pad $36_X$ includes a lattice 140, an example of which is shown in FIG. 23, which is additively-manufactured such that AM component $12_X$ has an open structure. The lattice 140 can be designed and 3D-printed to impart properties and functions of the AM component $12_X$, such as those discussed above, while helping to minimize its weight.

Figure 24A:
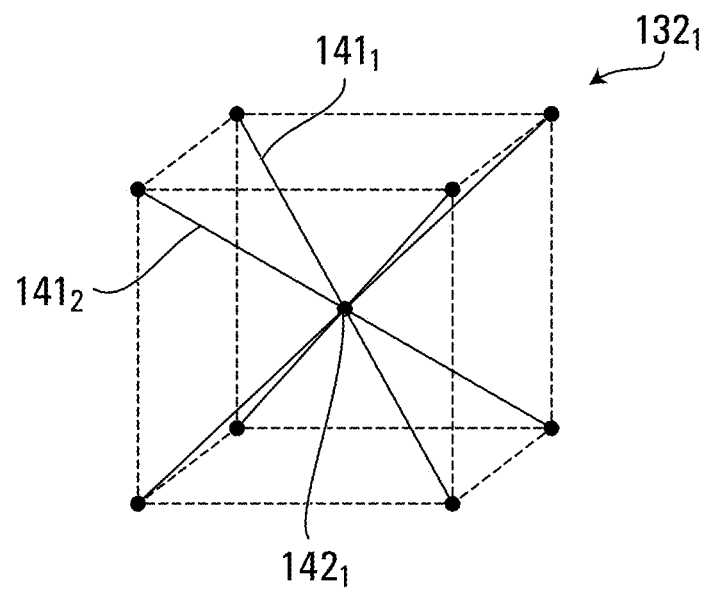
FIG. 24A shows an example of a unit cell occupying a voxel that may be used to form a an additively-manufactured component.

The lattice 140 comprises a framework of structural members $141_1$-$141_E$ (best shown in FIG. 24A) that intersect one another. In some embodiments, the structural members $141_1$-$141_E$ may be arranged in a regular arrangement repeating over the lattice 140. In some cases, the lattice 140 may be viewed as made up of unit cells $132_1$-$132_C$ each including a subset of the structural members $141_1$-$141_E$ that forms the regular arrangement repeating over the lattice 140. Each of these unit cells $132_1$-$132_C$ can be viewed as having a voxel (shown in dashed lines in FIGS. 23 and 24A), which refers to a notional three-dimensional space that it occupies. In other embodiments, the structural members $141_1$-$141_E$ may be arranged in different arrangements over the lattice 140 (e.g., which do not necessarily repeat over the lattice 140, do not necessarily define unit cells, etc.).

The lattice 140, including its structural members $141_1$-$141_E$, may be configured in any suitable way.

In this embodiment, the structural members $141_1$-$141_E$ are elongate members that intersect one another at nodes $142_1$-$142_N$. The elongate members $141_1$-$141_E$ may sometimes be referred to as "beams" or "struts". Each of the elongate members $141_1$-$141_E$ may be straight, curved, or partly straight and partly curved.

The 3D-printed material 50 constitutes the lattice 140. Specifically, the elongate members $141_1$-$141_E$ and the nodes $142_1$-$142_N$ of the lattice 140 include respective parts of the 3D-printed material created by the 3D-printer.

In this example of implementation, the 3D-printed material 50 includes polymeric material. For instance, in this embodiment, the 3D-printed material 50 may include polyamide (PA) 11, thermoplastic polyurethane (TPU) 30A to 95A (fused), polyurethane (PU) 30A to 95A (light cured, chemical cured), polyether ether ketone (PEEK), polyetherketoneketone (PEKK), polypropylene (PP), silicone, rubber, gel and/or any other polymer.

In some embodiments, the AM components $12_1$-$12_A$ may comprise a plurality of materials different from one another. For example, a first one of the materials is a first polymeric material and a second one of the materials is a second polymeric material. In other embodiments, a first one of the materials may be a polymeric material and a second one of the materials may be a non-polymeric material.

Figure 24B:
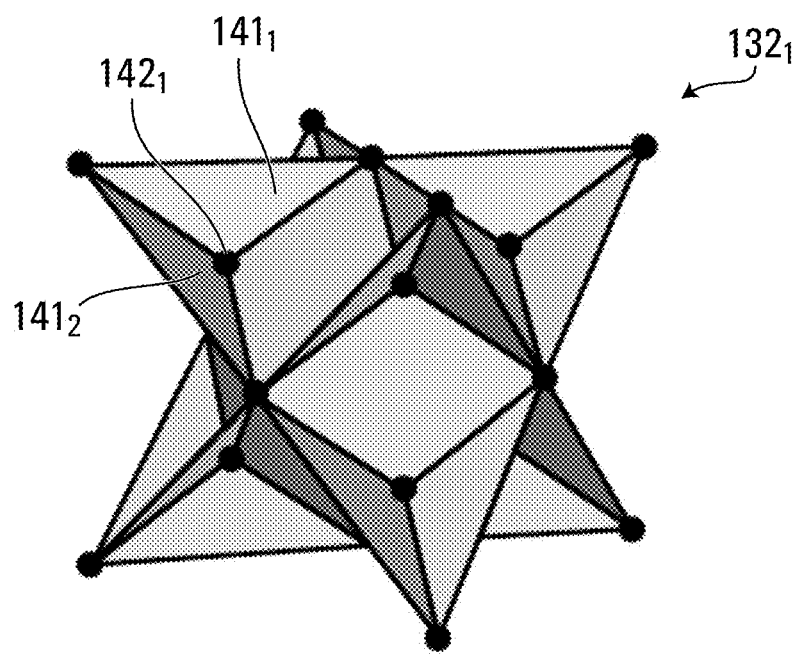
FIG. 24B shows another example of a mesh or shell style unit cell that may be used to form an additively-manufactured component.
Figure 24C:
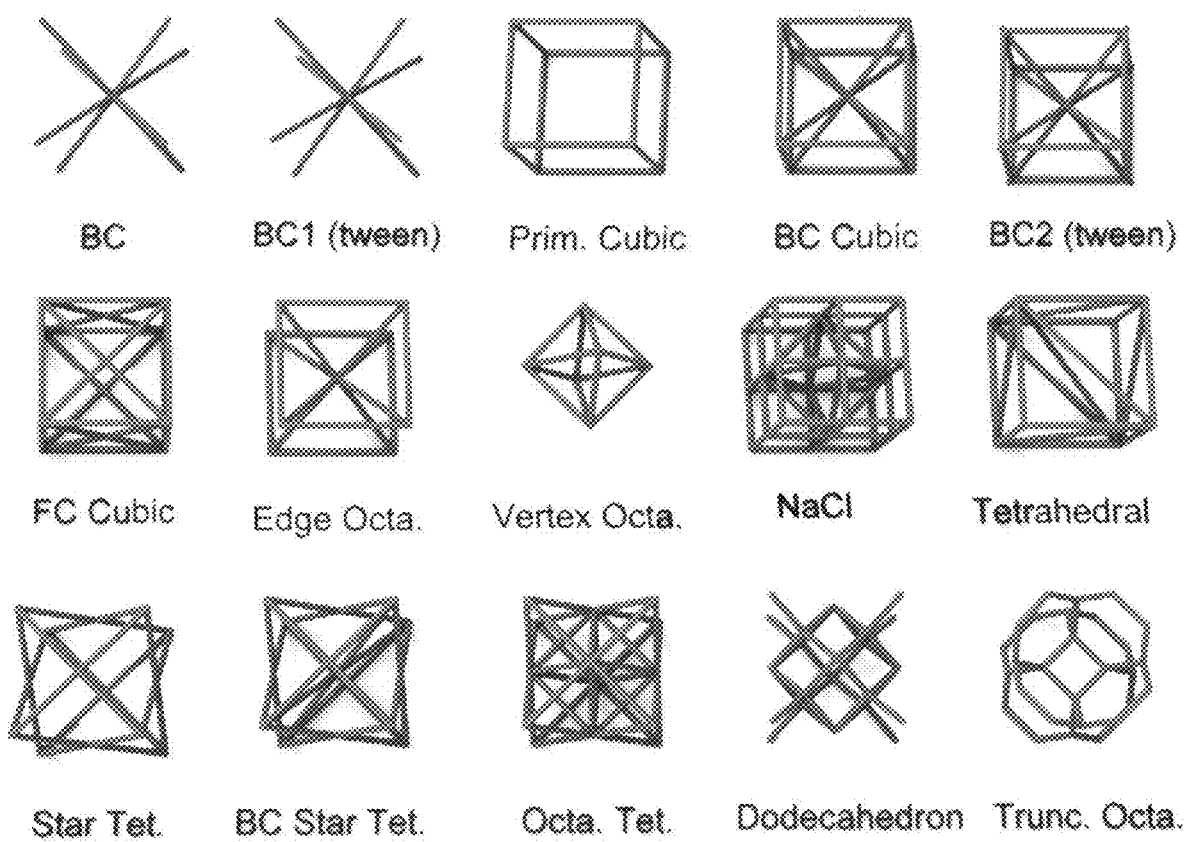
FIGS. 24C, 24D, 24E and 24F shows further examples of unit cells that may be used to form an additively-manufactured component.
Figure 24D:
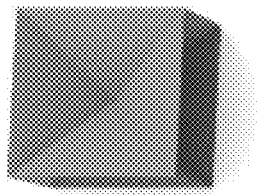
Figure 24D:
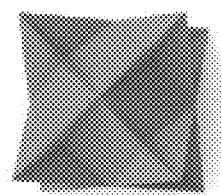
Figure 24D:
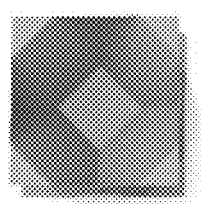
Figure 24D:
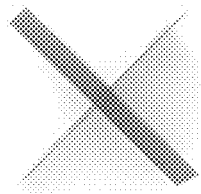
Figure 24D:
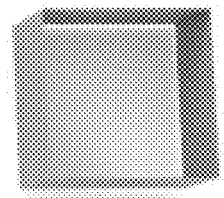
Figure 24D:
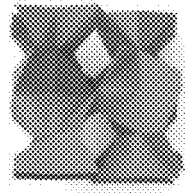
Figure 24E:
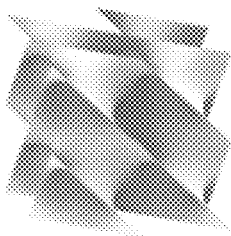
Figure 24E:
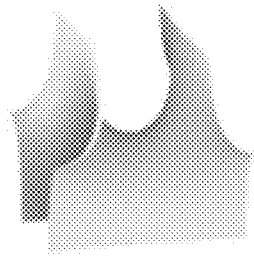
Figure 24E:
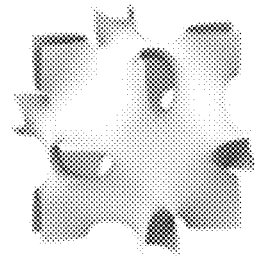
Figure 24E:
Figure 24E:
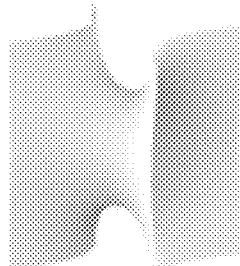
Figure 24E:
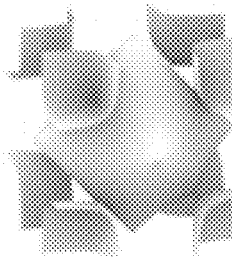
Figure 24E:
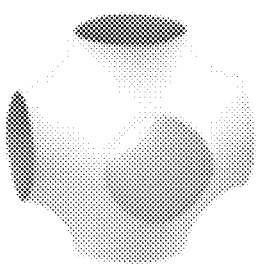
Figure 24E:
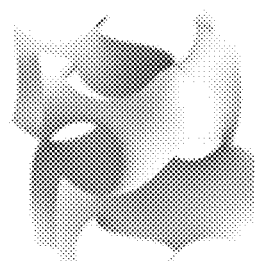
Figure 24E:
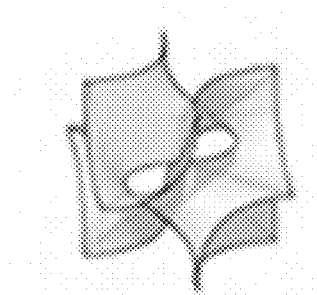

In some embodiments, the structural members $141_1$-$141_E$ of the lattice 140 may be implemented in various other ways. For example, in some embodiments, the structural members $141_1$-$141_E$ may be planar members that intersect one another at vertices. For example, such an embodiment of the lattice 140 may be realized using a different "mesh" or "shell" style unit cell, such as the unit cell $132_1$ shown in FIG. 24B, which includes planar members $141_1$-$141_E$ that intersect at vertices $142_1$-$142_V$. The surfaces of the planar members $141_1$-$141_E$ may sometimes be referred to as "faces". Each of the planar members $141_1$-$141_E$ may be straight, curved, or partly straight and partly curved. In some embodiments, the structural members $141_1$-$141_E$ of the lattice 140 may have a hybrid construction that includes both elongate members and planar members. For example, such embodiments may include a mix of elongate member style unit cells, such as the unit cell $132_1$ shown in FIG. 24A, and mesh or shell style unit cells, such as the unit cell $132_1$ shown in FIG. 24B. In some embodiments, the structural elements of a unit cell may include a combination of elongate member and surface/planar members. FIGS. 24C, 24D and 24E show further non-limiting examples of elongate member style unit cells and mesh or shell style unit cells that may be used individually and/or in combination to form additively-manufactured components as disclosed herein. The example unit cells shown in FIG. 24E are examples of cubic unit cells that are based on triply periodic minimal surfaces. A minimal surface is the surface of minimal area between any given boundaries. Minimal surfaces have a constant mean curvature of zero, which means that the sum of the principal curvatures at each point is zero. Triply periodic minimal surfaces have a crystalline structure, in that they repeat themselves in three dimensions, and thus are said to be triply periodic.

Figure 24F:
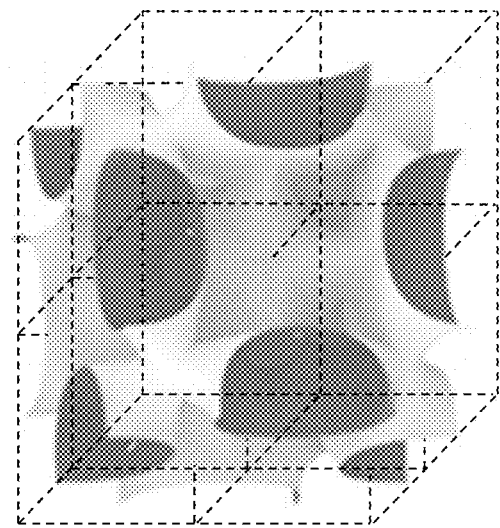
Figure 24F:
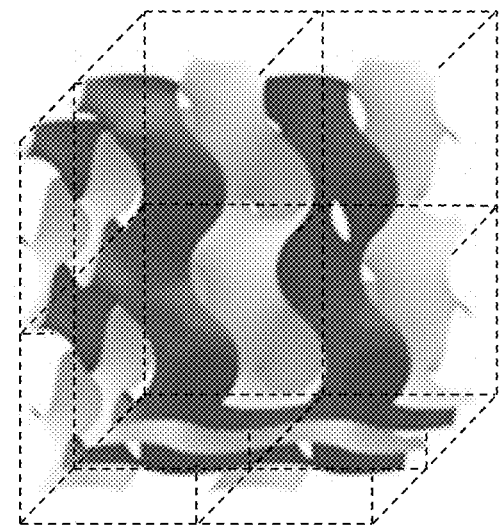
Figure 24F:
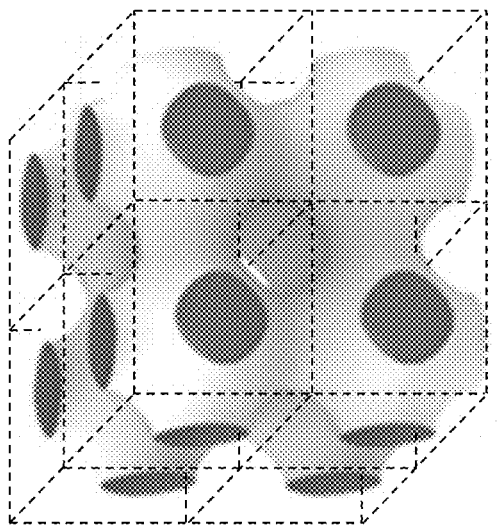

A volume of material can be constructed by "voxelizing" the volume (dividing the volume into voxels of the same or different sizes), and populating the voxels with unit cell structures, such as those shown in FIGS. 24A-24E. For example, FIG. 24F shows three examples of volumes containing triply periodic surfaces implemented by 2×2×2 lattices of equal sized voxels populated with different unit cells from the examples shown in FIG. 24D. The behavior or performance of an AM component that includes a voxelized volume of unit cells can be adapted by changing the structure, size or combination of unit cells that make up the AM component. Unit cells having different structures (e.g., the body centered (BC) unit cell shown in FIG. 24A vs. the Schwarz P unit cell shown in FIG. 24E) may have different behaviors. Similarly, unit cells having the same structure but different sizes may behave differently. Furthermore, implementing unit cells using the same structure but using different materials may result in different behaviors. Likewise, implementing an AM component using multiple different types of unit cells that differ in terms of structure, size and/or materials may result in different behavior/performance. As such, it may be possible to achieve a desired performance of an AM component by adapting the structure, size, material and/or mix of the unit cells that are used within a given volume of the AM component. This concept is discussed in further detail below with reference to FIGS. 25A-25G.

Figure 25A:
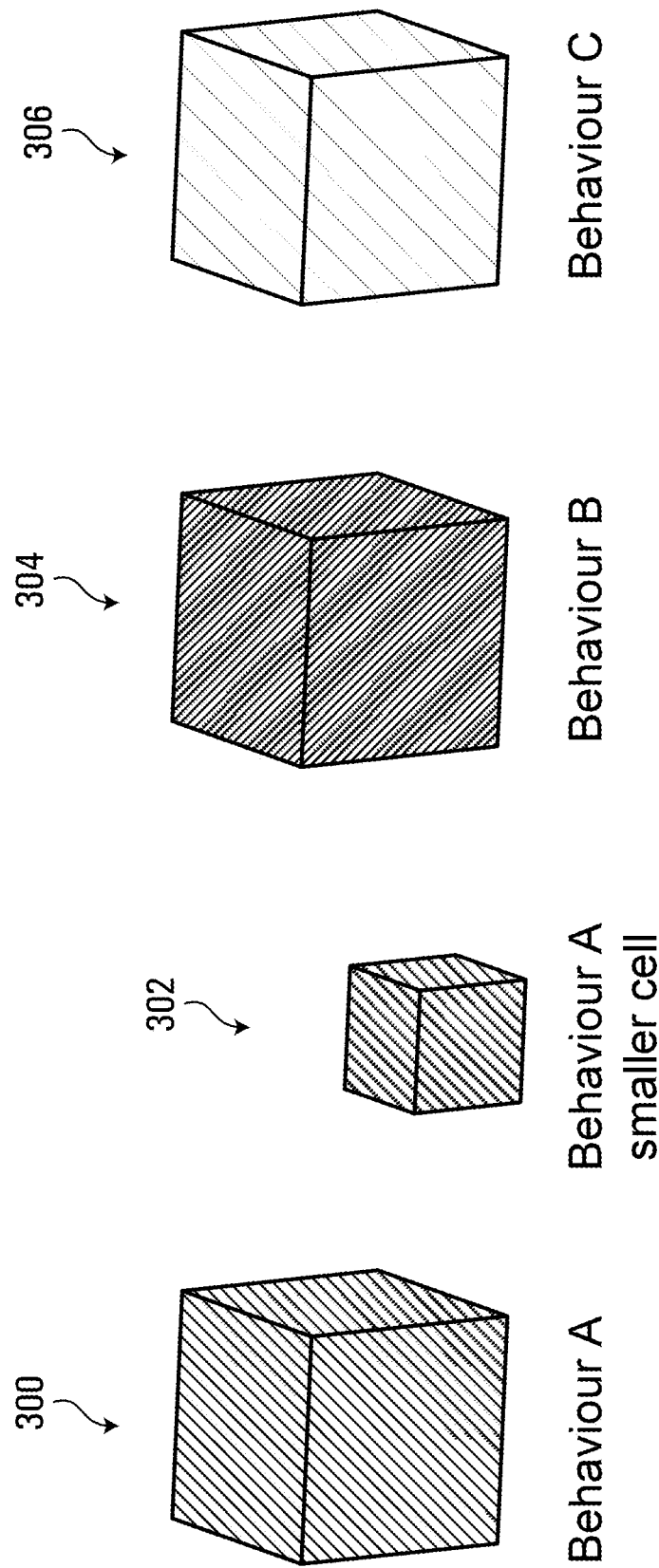
FIGS. 25A, 25B, 25C, 25D, 25E, 25F and 25G show examples how a volume occupied by an additively-manufactured component may be populated with different combinations of unit cells.
Figure 25B:
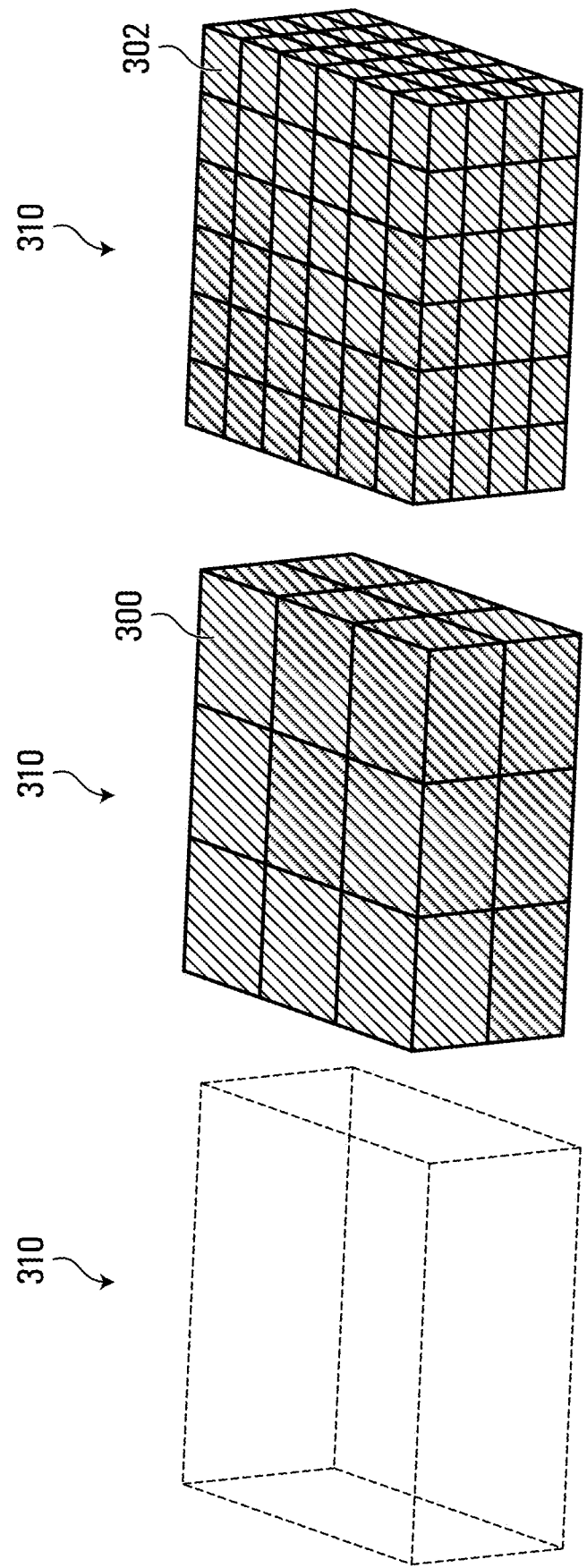

FIG. 25A shows four different cubic unit cells 300, 302, 304 and 306. Unit cells 300, 304 and 306 are of the same size, but exhibit different behaviors which are identified generically as Behavior A, Behavior B and Behavior C, respectively. For example, unit cells 300, 302 and 306 may differ in terms of structure and/or materials, and thereby provide different impact absorbency properties, such as resiliency, stiffness, modulus of elasticity, etc.

Unit cells 300 and 302 are characterized by the same behavior, Behavior A, but unit cell 302 is smaller than the other three unit cells 300, 304 and 306. In particular, in this example unit cell 302 is one eighth the volume of the other three unit cells 300, 304 and 306, such that a 2×2×2 lattice of unit cells 302 would have the same volume of each of the other three unit cells 300, 304 and 306. This is shown by way of example in FIG. 25B, which shows that an AM component occupying a volume 310 may be implemented by either a 3×3×2 lattice of unit cells 300 or a 6×6×4 lattice of unit cells 302.

Figure 25C:
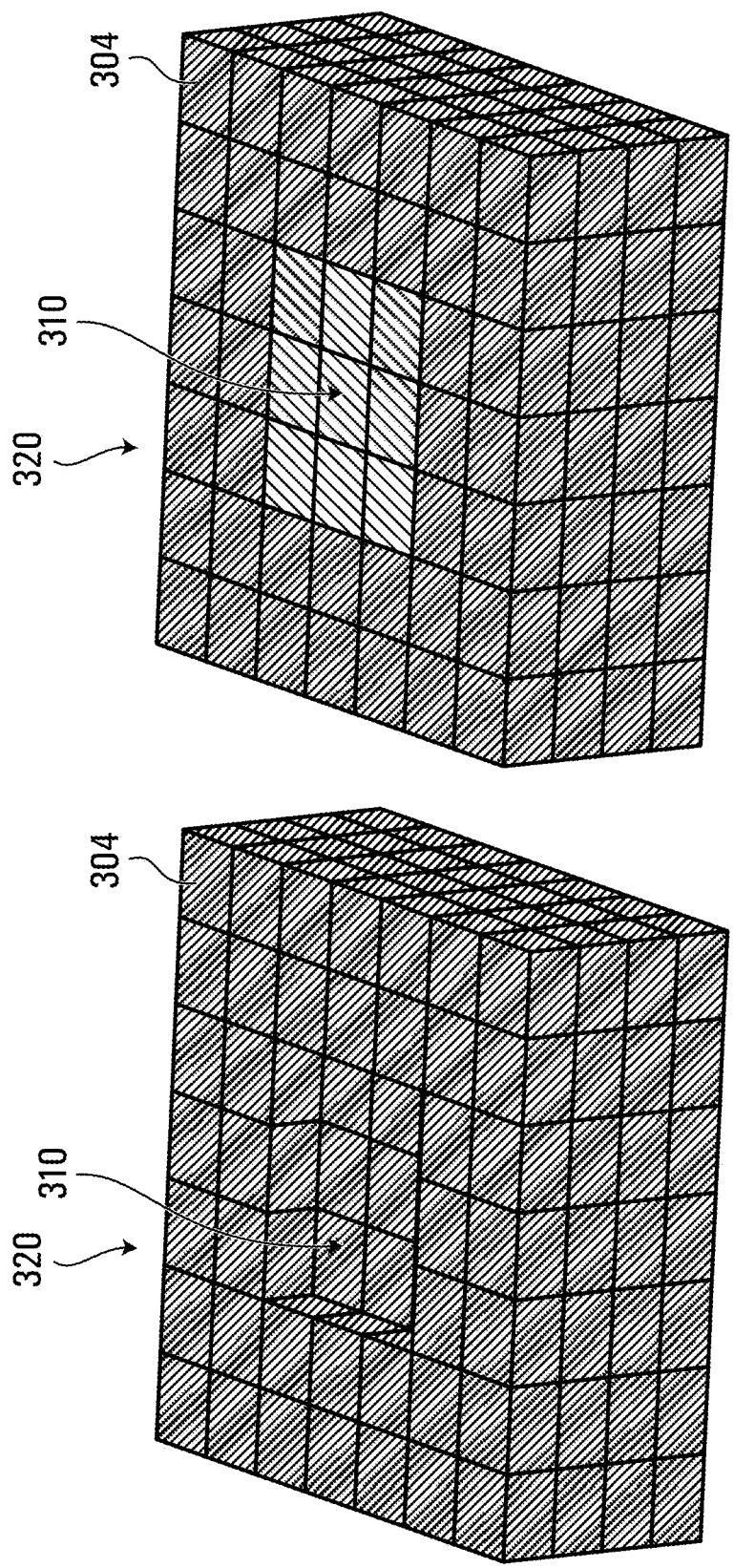
Figure 25D:
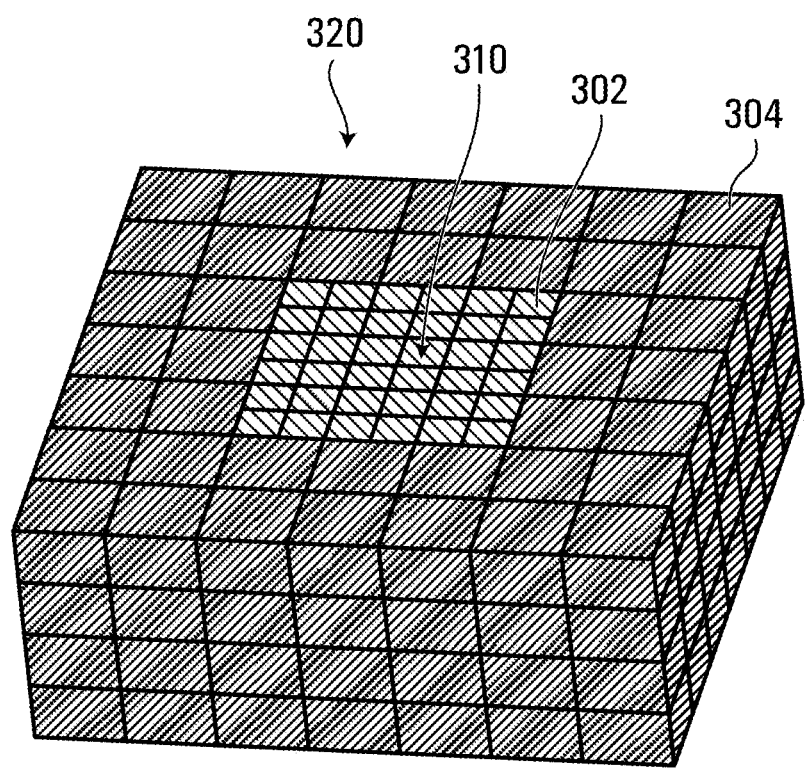
Figure 25E:
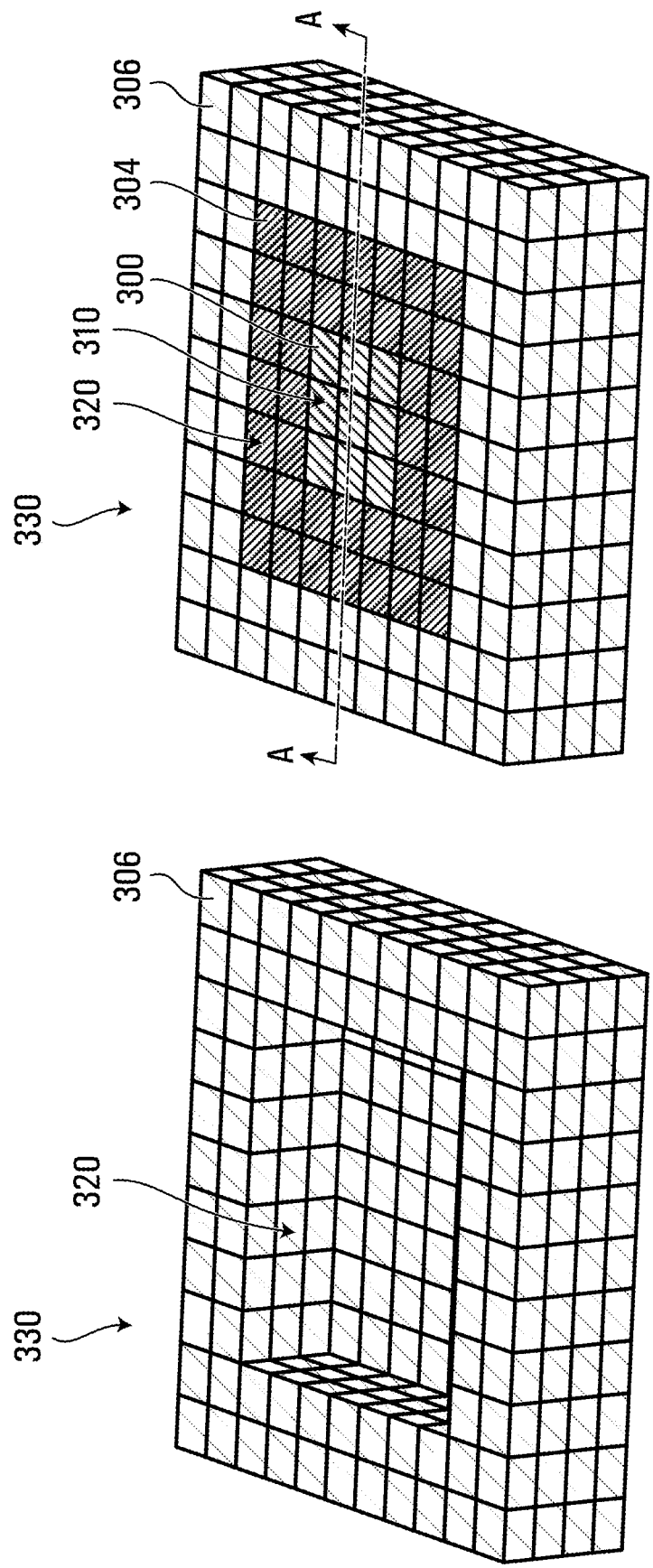
Figure 25F:
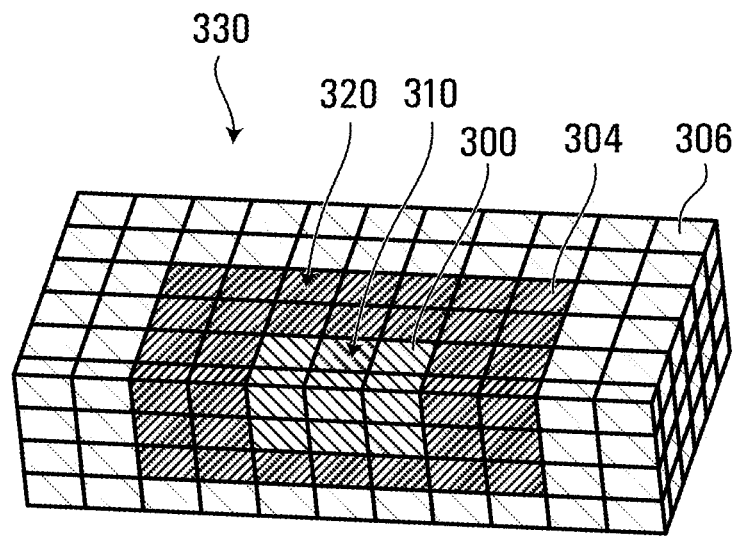
Figure 25G:
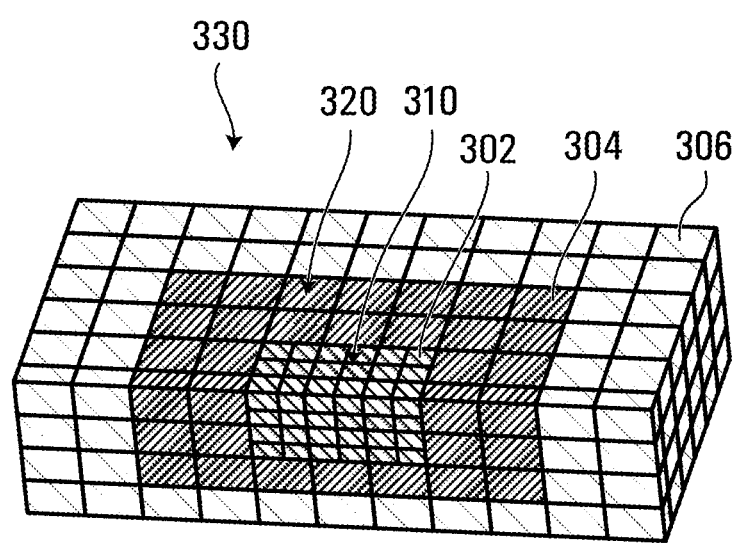

As noted above, the behavior of an AM component constituting a voxelized volume of unit cells may be changed by incorporating different unit cells within the volume. This is shown by way of example in FIGS. 25C-25G. FIG. 25C shows that a smaller volume 310 within a larger volume 320 of an AM component may be implemented with a 3×3×2 lattice of unit cells 300 characterized by Behavior A, while the remainder of volume 320 is implemented with unit cells 304 characterized by Behavior B. Such a combination of unit cells 300 and 304 may result in an overall behavior for the AM component that is different than either Behavior A or Behavior B alone. FIG. 25D shows an alternative example in which the smaller volume 310 is implemented with a 6×6×4 lattice of unit cells 302. FIG. 25E shows another example of this concept, in which the voxelized volume 320 of unit cells shown in FIG. 25C, which includes a mix of unit cells 300 and 304, is located within an even larger voxelized volume 330 of an AM component. In this example, the remainder of the volume 330 of the AM component is implemented with unit cells 306 characterized by Behavior C. FIG. 25F shows a profile of the cross-section of the AM component of FIG. 25E along the line A-A. FIG. 25G shows a profile of the cross-section of an alternative example in which the smaller volume 310 within the volume 320 is implemented with a 6×6×4 lattice of unit cells 302 rather than a 3×3×2 lattice of unit cells 300.

Referring again to FIGS. 16 to 20, in some embodiments, an AM component $12_X$ may include a non-lattice member connected to the lattice 140. For example, the non-lattice member may be configured to be positioned between the lattice 140 and a user's head when the helmet is worn. In other embodiments, the non-lattice member may be positioned between the lattice 140 and the shell 11. In some embodiments, such a non-lattice member may be thinner than the lattice 140. In other embodiments, the non-lattice member may be bulkier than the lattice 140.

In the example of implementation shown in FIG. 23, the lattice 140 of the AM component $12_X$ comprised by the pad $36_X$ may include outer surfaces or "skins" that provide interfaces to other components of the helmet and/or the user's head. The outer surfaces of the lattice 140 may be implemented with an open lattice skin 150 and/or solid non-lattice skin 152.

Figure 26:
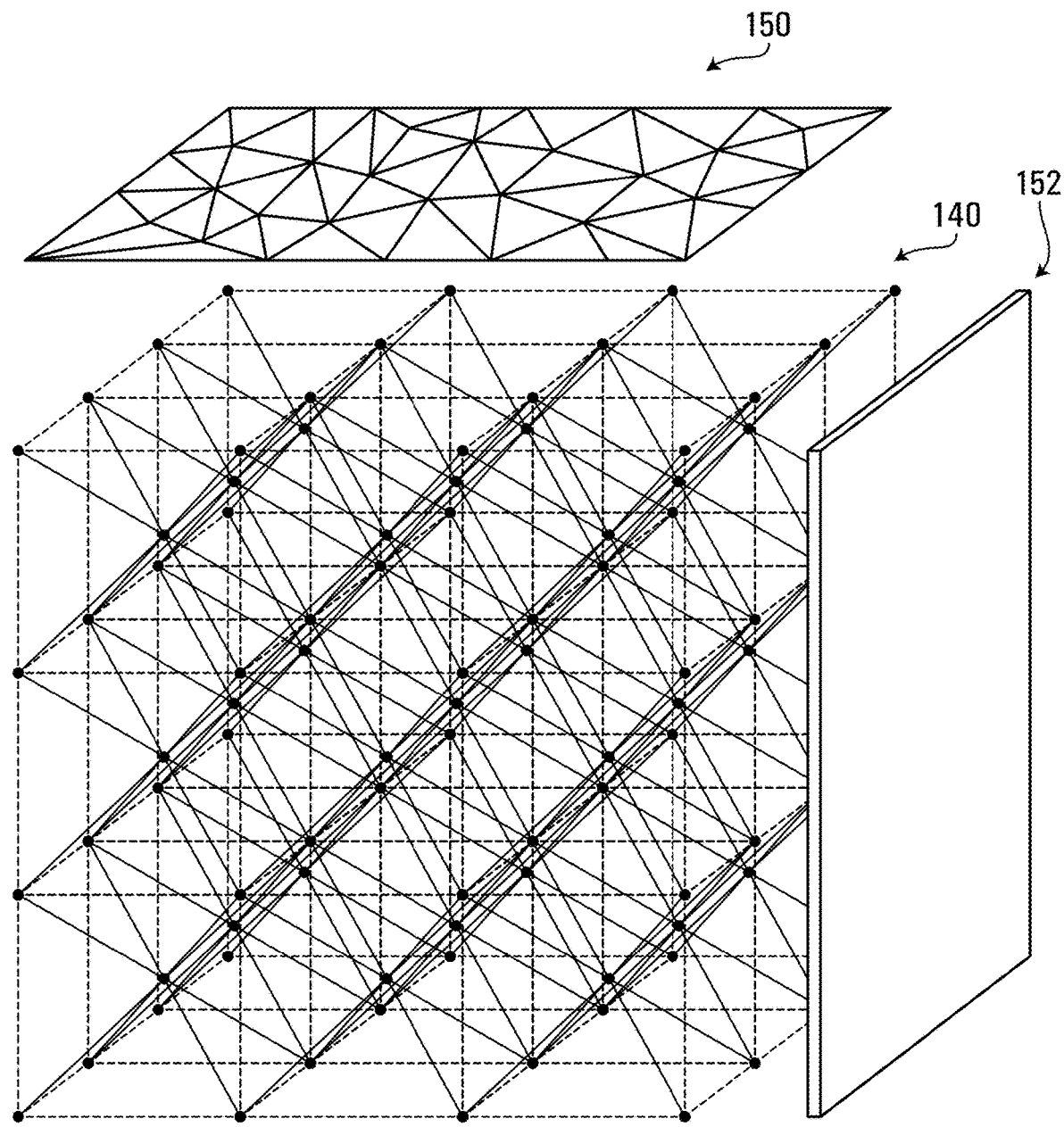
FIG. 26 shows examples of lattice and non-lattice "skins" that may be formed on a lattice structure in order to provide an outer surface for the lattice structure.

FIG. 26 shows examples of a lattice skin 150 and a solid non-lattice skin 152 that may be formed on the lattice 140 of FIG. 23 in order to provide outer surfaces for the lattice 140. For example, the solid skin 152 may be used to provide an outer surface of the AM component $12_X$ comprised by the pad $36_X$ to interface the pad $36_X$ to the inner surface 17 of the outer shell 11 of the helmet 10.

Figure 27:
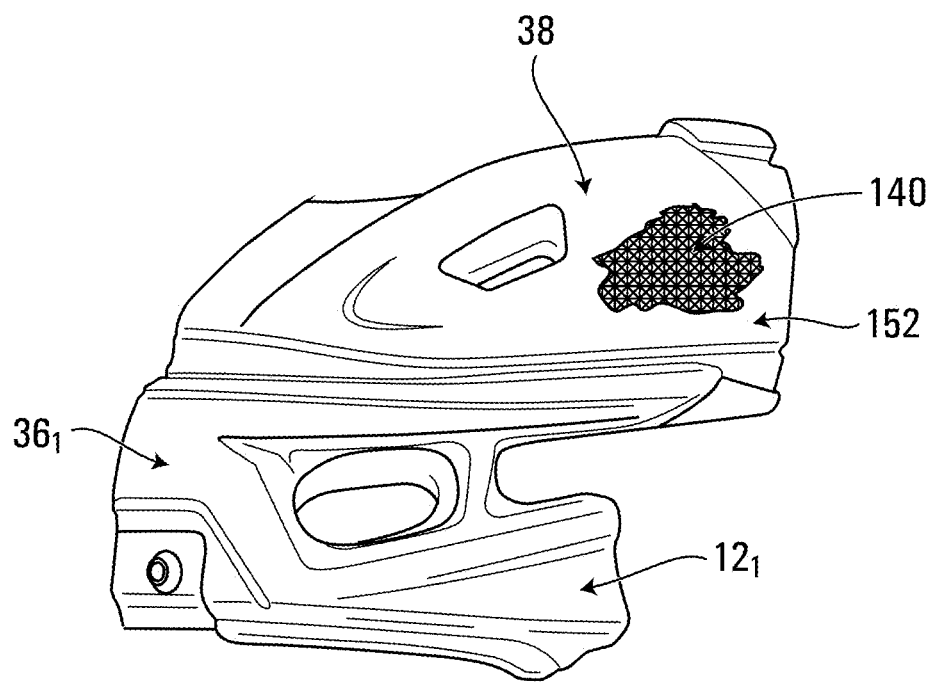
FIG. 27 shows a side view of an example of an additively-manufactured component constituting a front pad member of the inner lining of the helmet.
Figure 28A:
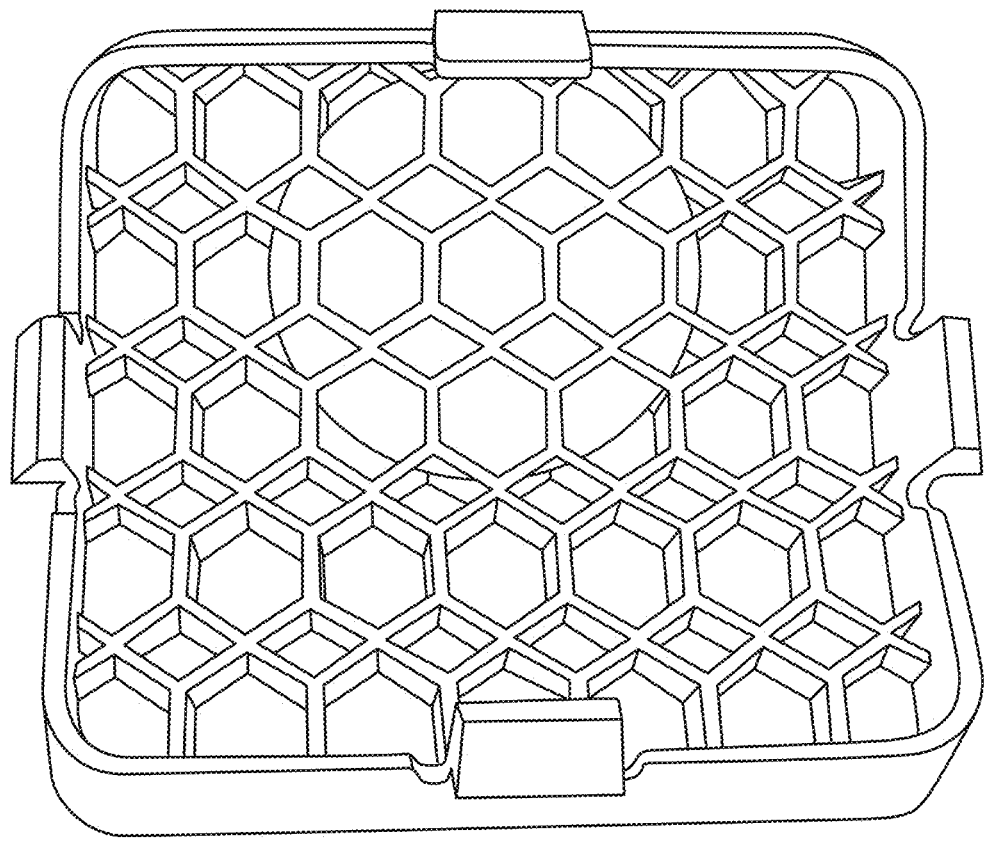
FIGS. 28A and 28B show an example of an additively-manufactured component comprising a two-dimensional (2D) lattice structure.
Figure 28B:
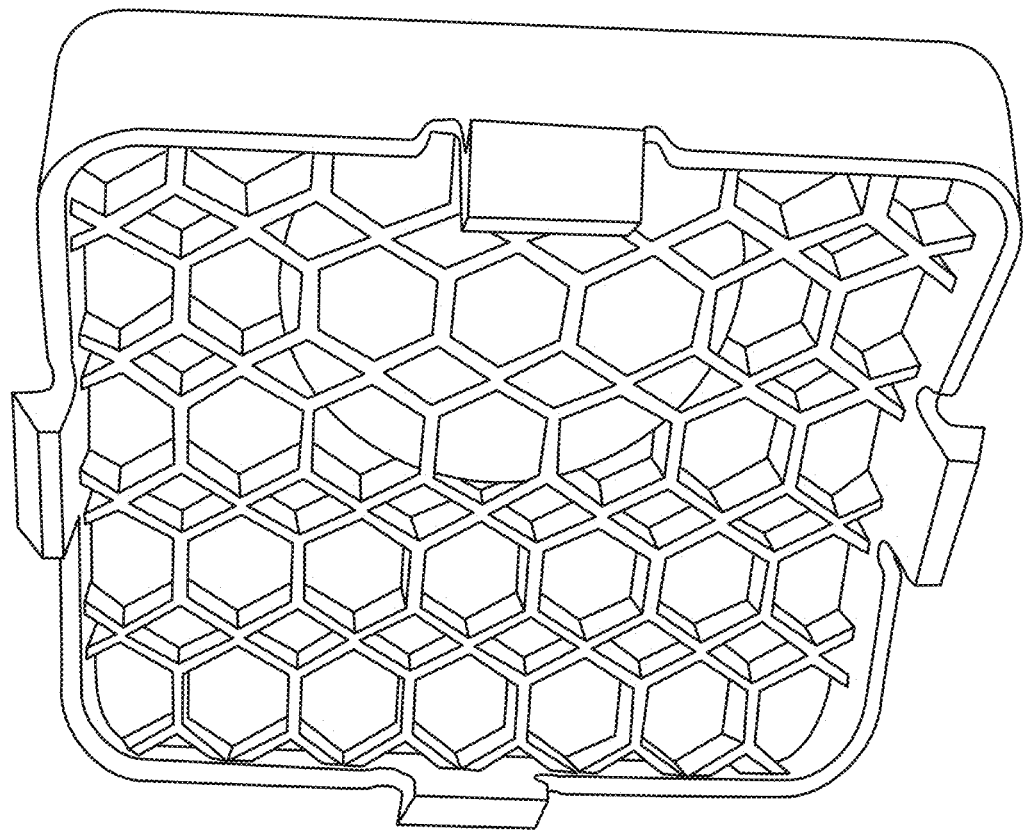

FIG. 27 shows a side view of an example of the AM component $12_1$ constituting the front pad $36_1$ of the inner lining 15 of the helmet 10. The AM component $12_1$ includes the lattice 140 and the solid skin 152 which forms the outer surface 38 of the front pad $36_1$.

It is noted that the lattice 140 shown in FIGS. 23 and 26, which has a 3D structure, is merely one example of an additively-manufactured lattice that may be used in some embodiments. Other 2D and 3D lattice structures, which may be based on unit cells such as those shown by way of non-limiting example in FIGS. 24A-24E, may be used in other embodiments.

FIGS. 28 to 34 show non-limiting examples of AM components incorporating lattices that may be used in embodiments. FIGS. 28A and 28B show an example of an AM component comprising a 2D lattice structure. In this example of implementation, the lattice has a generally honeycomb pattern and the component includes fastening means for fastening the AM component to another component.

Figure 29:
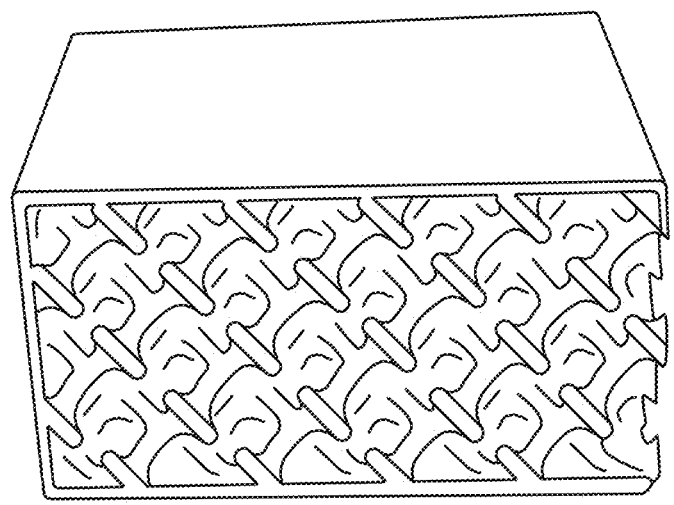
FIG. 29 shows an example of an additively-manufactured component comprising a three-dimensional (3D) lattice structure.

FIG. 29 shows an example of an AM component comprising a 3D lattice structure similar to that of the lattice 140 shown in FIGS. 21 and 25.

Figure 30A:
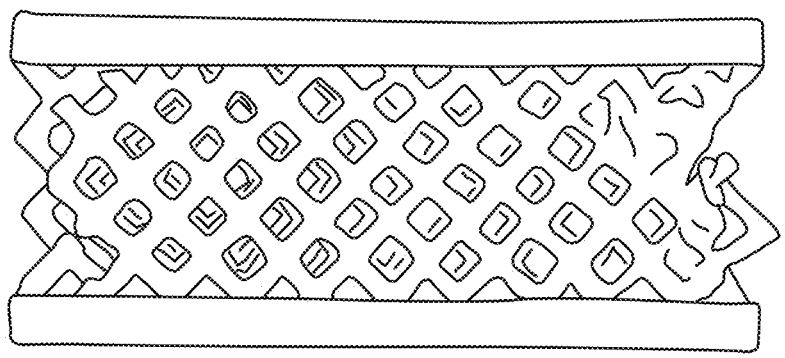
FIGS. 30A, 30B and 30C show another example of an additively-manufactured component comprising a 3D lattice structure.
Figure 30B:
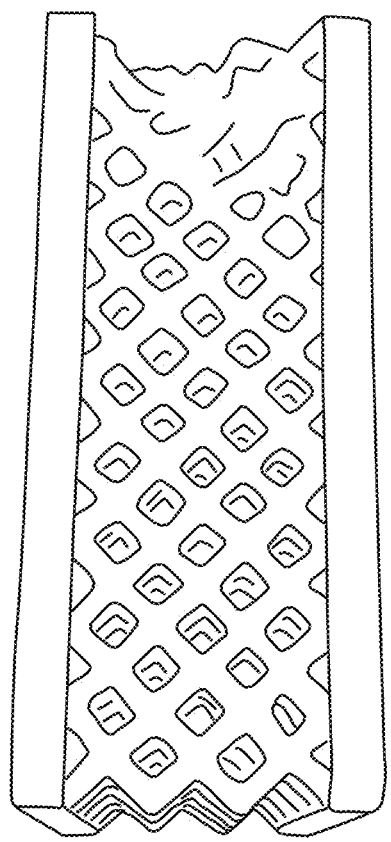
Figure 30C:
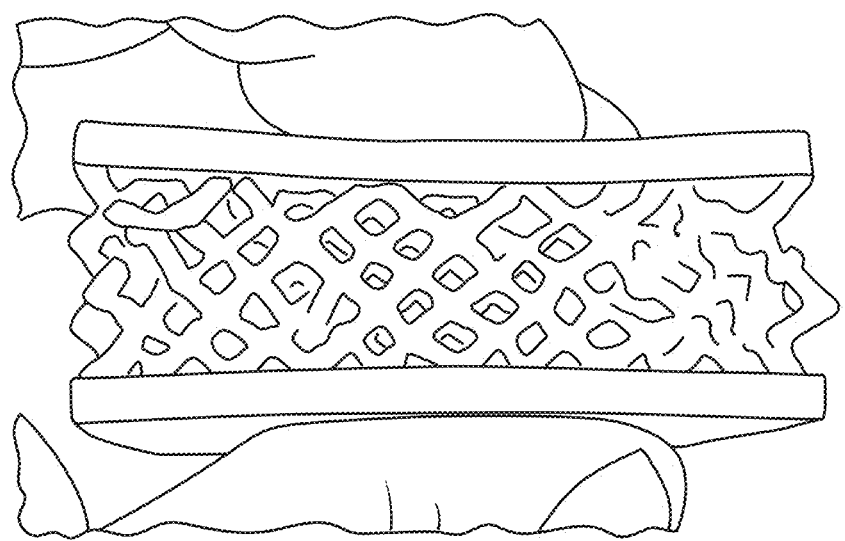

FIGS. 30A, 30B and 30C show another example of an AM component comprising a 3D lattice structure. In this example of implementation, the lattice has a solid non-lattice outer surface on two of its opposite sides and the AM component is configured so that it is easily compressible by forces applied through its opposing solid sides.

Figure 31A:
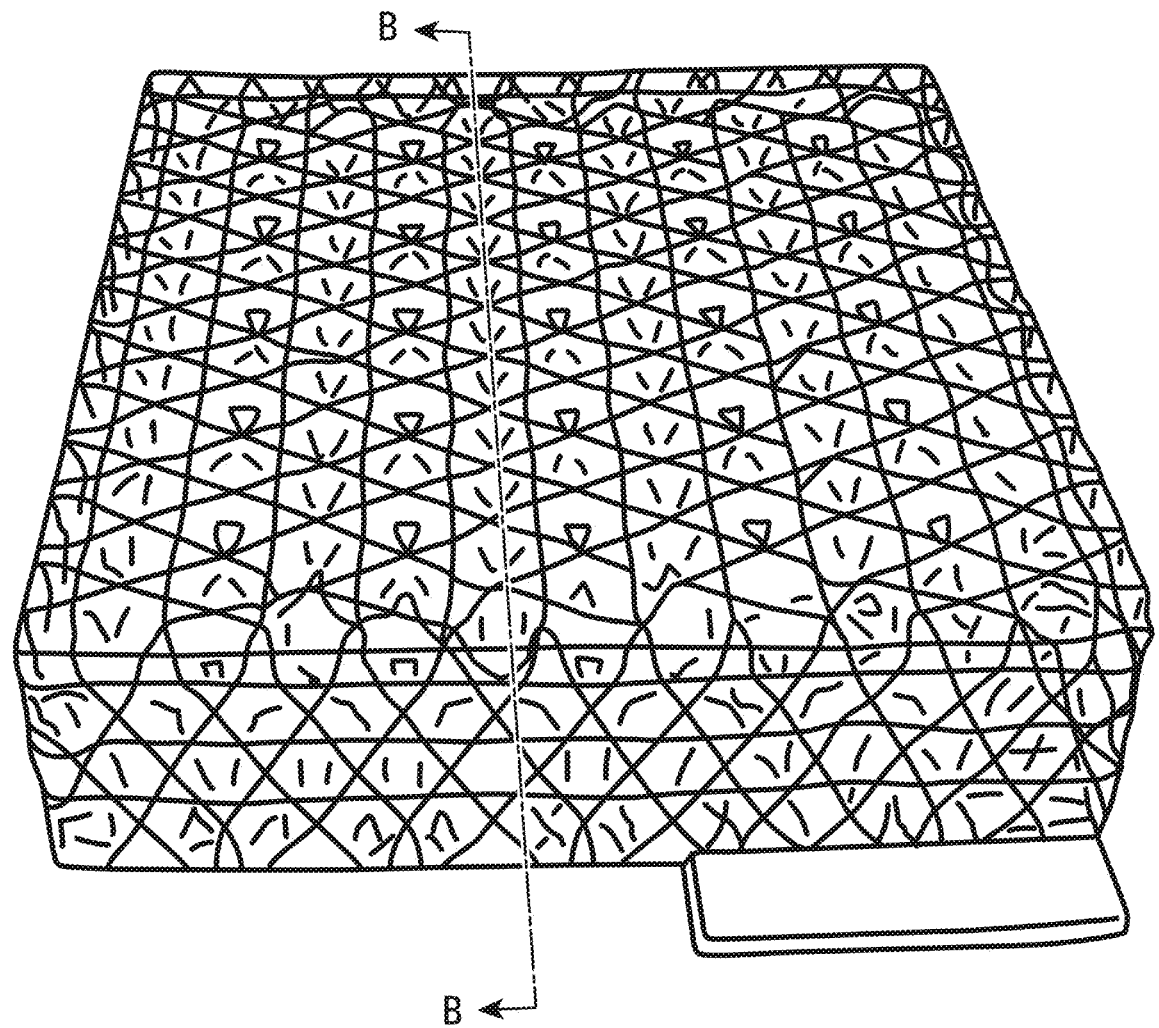
FIG. 31 shows yet another example of an additively-manufactured component comprising a 3D lattice structure.
Figure 31B:
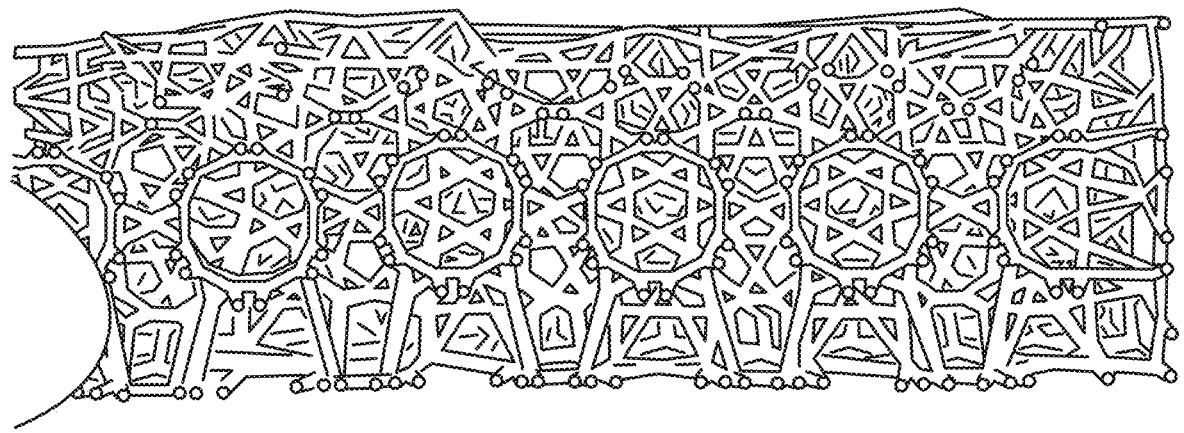

FIGS. 31A and 31B show another example of an AM component comprising a 3D lattice structure. FIG. 31B shows a profile of the cross-section of the AM component along the line B-B shown in FIG. 31A. In this example of implementation, the 3D lattice is formed by the vertices and edges of a quarter cubic honeycomb. In this example implementation, the 3D lattice contains four sets of parallel planes of points and lines, each plane being a two dimensional kagome or trihexagonal lattice, and therefore this lattice structure may be referred to as a hyper-kagome lattice.

Figure 32:
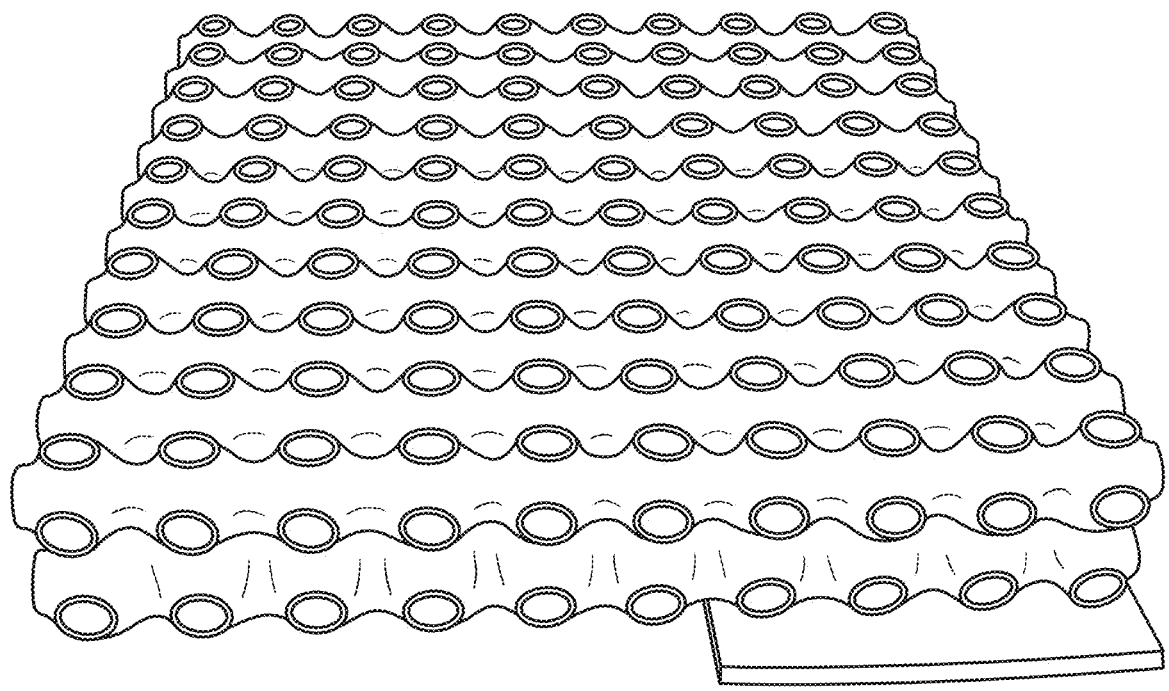
FIG. 32 shows still another example of an additively-manufactured component comprising a 3D lattice structure.

FIG. 32 shows yet another example of an AM component comprising a 3D lattice structure. In this example of implementation, the 3D lattice forms a periodic minimal surface based on the Schwarz P (Primitive) unit cell example shown in FIG. 24E, which results in a structure with a high surface-to-volume ratio and high porosity.

Figure 33:
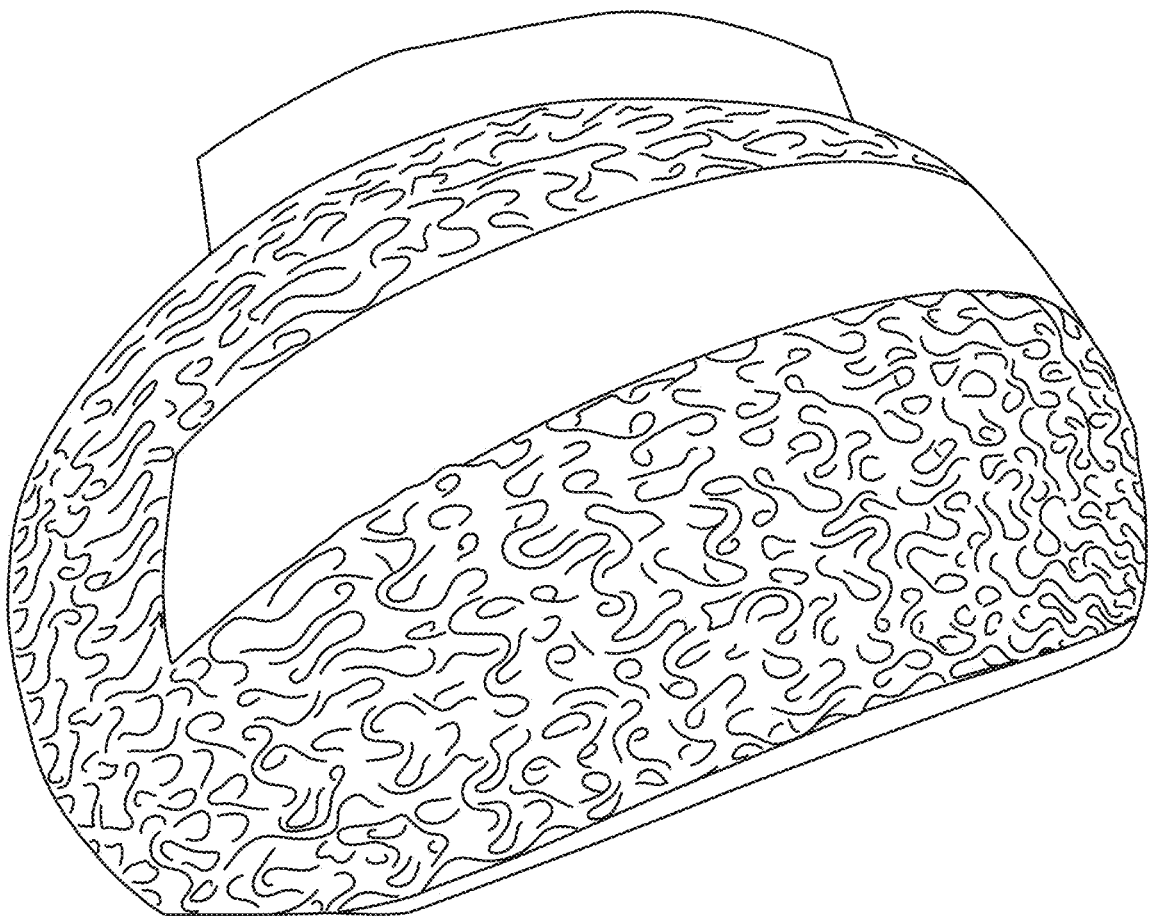
FIG. 33 shows an example of an additively-manufactured component constituting a shoulder cap member of shoulder padding for a hockey or lacrosse player.

FIG. 33 shows an example of an AM component constituting a shoulder cap member of shoulder pads for a hockey or lacrosse player. In this example of implementation, the AM component constituting the shoulder cap member comprises a 3D lattice structure that forms a triply periodic minimal surface based on a gyroid structure. Gyroid structures generally have exceptional strength properties at low densities, which means that structures such as shoulder caps, that have conventionally been made by molding, can potentially be made lighter while retaining a suitable level of structural integrity and resilience by utilizing additively-manufactured gyroid surface structures. In the example shoulder pad shown in FIG. 33, an exterior facing portion of the shoulder pad has been formed as a closed surface to act as a bonding surface between the shoulder pad and a shell member (not shown). In some cases, a portion of an AM component that faces a wearer (e.g., an interior facing portion of the shoulder pad shown in FIG. 33) may also or instead include such a closed surface for the purpose of providing better comfort to the wearer, such as in the case of the interior facing surface of the occipital pad discussed below with reference to FIGS. 34A-34C.

Figure 34A:
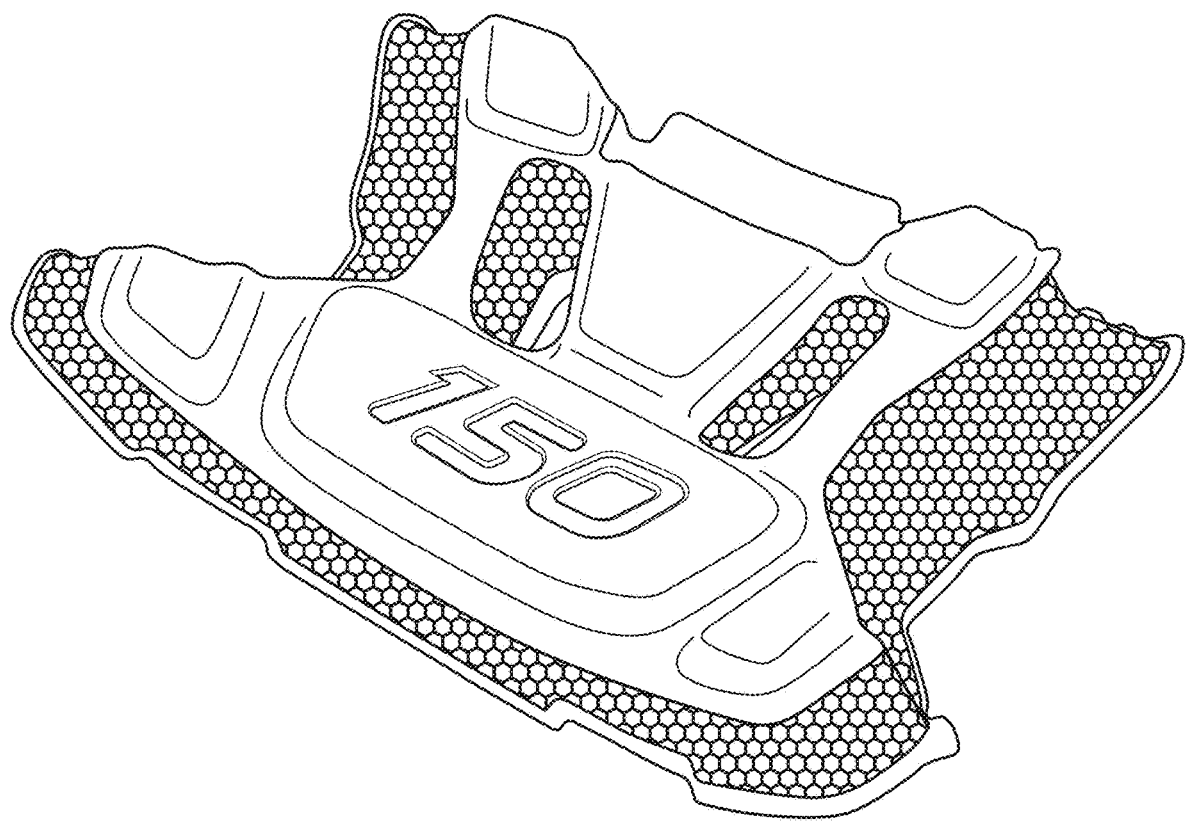
FIGS. 34A, 34B and 34C show an example of an additively-manufactured component constituting an occipital pad member of the inner lining of a hockey helmet.
Figure 34B:
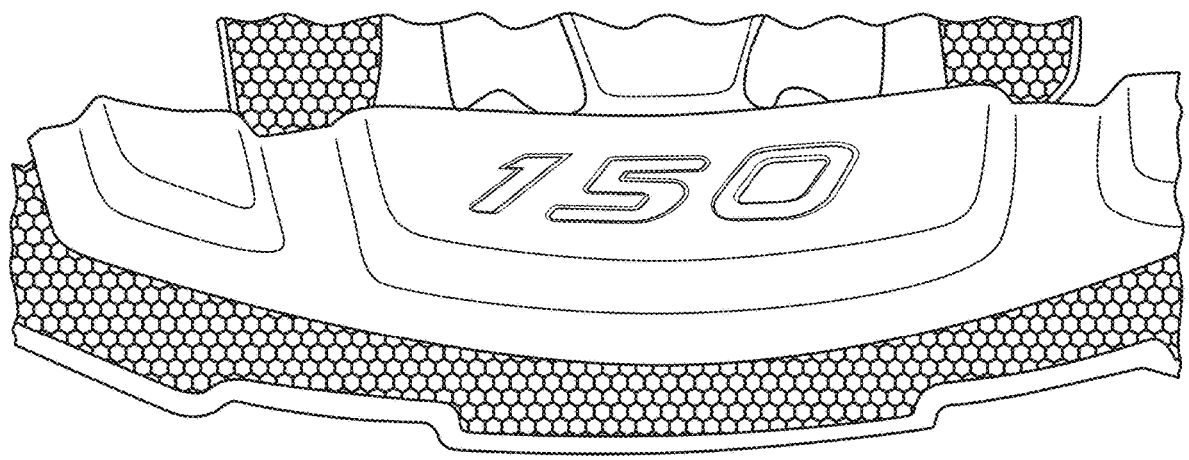
Figure 34C:
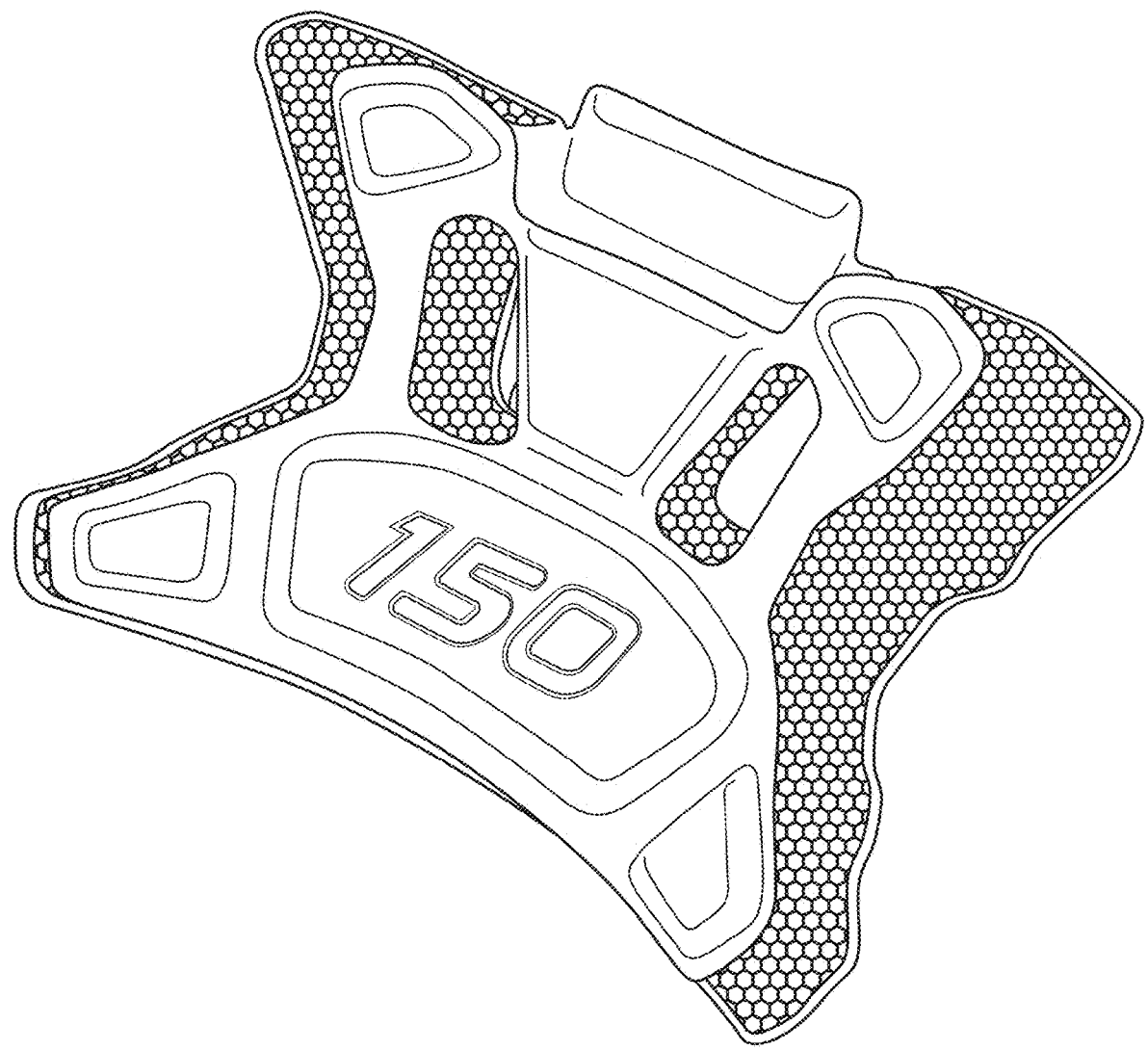

FIGS. 34A, 34B and 34C show an example of an AM component constituting an occipital pad member of the inner lining of a hockey helmet. In this example of implementation, the AM component constituting the occipital pad member is configured with generally opposing solid outer surfaces. For example, if such an occipital pad member were used in the helmet 10, one of the solid opposing outer surfaces of the pad member would faces a user's head and the opposite solid outer surface would faces the inner surface 17 of the outer shell 11 of the helmet 10. As shown in this example of implementation, the outer surface of the pad that would face the user's head when the helmet is worn may be formed with one or more decorative structures or indicia. In this case, the numeral "150" has been formed in the outer surface of the occipital pad and would be visible to the wearer each time a helmet incorporating the occipital pad is donned. Such decorative indicia may also or instead be incorporated in any of the other AM components $12_X$ of the helmet 10 and may be customized for a particular model and/or user.

In some embodiments, the lattice 140 may include distinct zones $80_1$-$80_Z$ that are structurally different from one another and may be useful to manage different types of impacts, enhance comfort and/or fit, etc. FIGS. 35A, 35B, 35C and 35D show non-limiting examples of AM components that each includes a lattice 140 comprising a plurality of distinct zones $80_1$-$80_Z$ that are structurally different from one another.

As an example, the lattice 140 of the AM component $12_X$ comprised by the pad $36_X$ may include distinct zones that differ in stiffness.

As another example, in some embodiments, the distinct zones $80_1$-$80_Z$ of the lattice 140 may also or instead differ in resilience.

In a further example, in some embodiments, the distinct zones $80_1$-$80_Z$ of the lattice 140 may also or instead be configured to protect against different types of impacts. For example, a first one of the distinct zones $80_1$ of the lattice 140 is configured to protect more against rotational impact components than linear impact components; and a second one of the distinct zones $80_2$ of the lattice 140 is configured to protect more against linear impact components than rotational impact components.

In some embodiments, a first one of the distinct zones $80_1$ of the lattice 140 is configured to protect more against lower-energy impacts than higher-energy impacts; and a second one of the distinct zones $80_2$ of the lattice 140 is configured to protect more against higher-energy impacts than lower-energy impacts.

In a further example, in some embodiments, a first one of the distinct zones $80_1$ of the lattice 140 is less stiff in shear than a second one of the distinct zones $80_2$ of the lattice 140. In such embodiments, the second one of the distinct zones $80_2$ of the lattice 140 may be less stiff in compression than the first one of the distinct zones $80_1$ of the lattice 140. In some embodiments, a stress-strain curve for an AM component having two or more distinct zones that differ in stiffness and/or compression has multiple "flex" zones in the loading portion of the stess-strain curve. An example of such a stress-strain curve is shown in FIG. 22B. As shown in FIG. 22B, the flex zones are regions of the loading curve where a value of slope of the loading curve reaches zero and may temporarily turn negative before once again resuming a positive value.

Figure 35A:
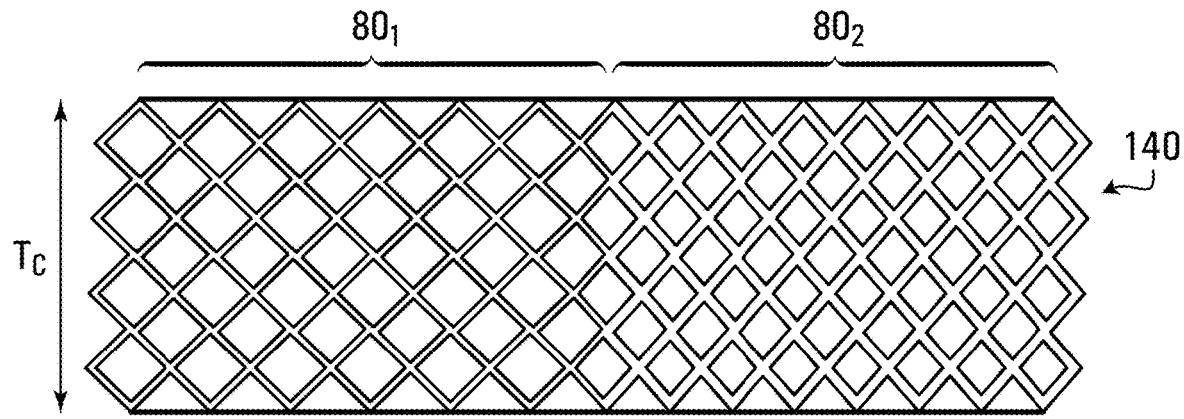
FIGS. 35A, 35B, 35C and 35D show examples of additively-manufactured components comprising a plurality of distinct zones structurally different from one another.
Figure 35B:
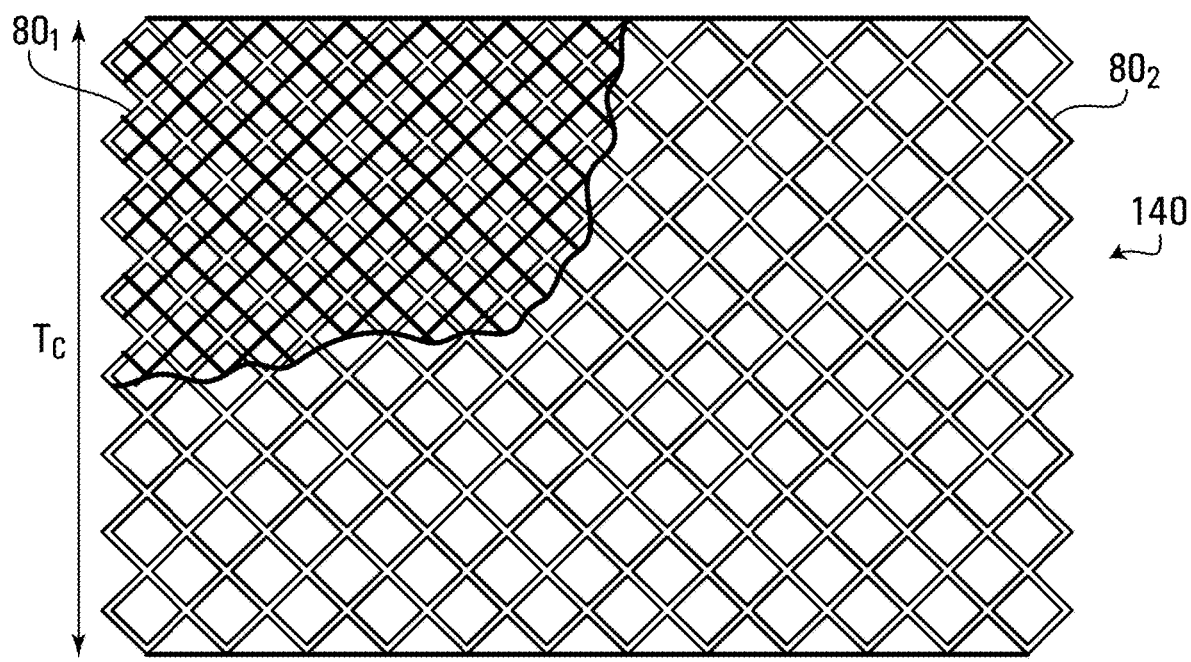
Figure 36:
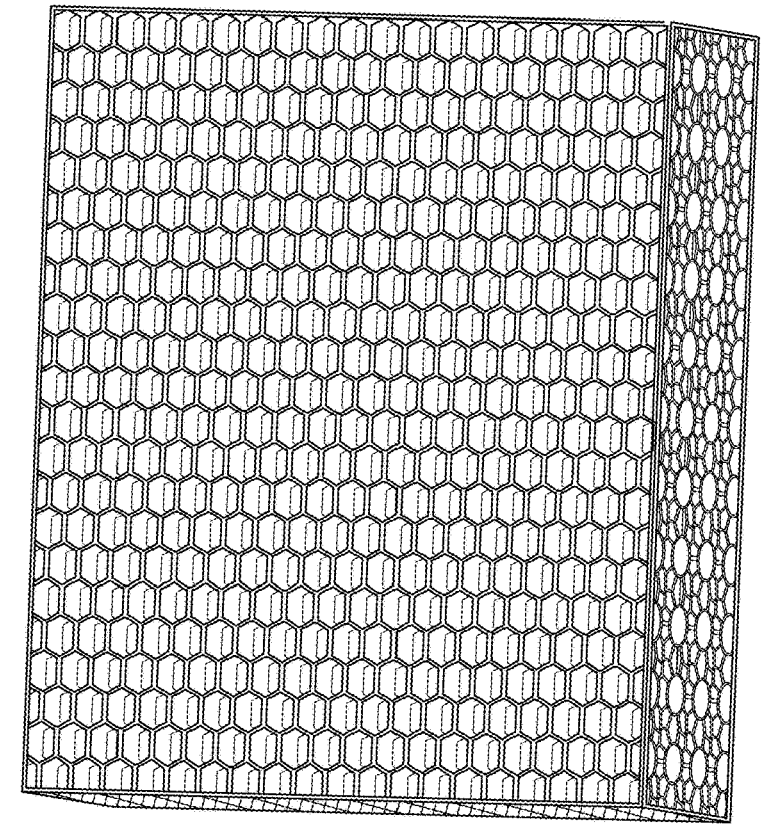
FIG. 36 shows examples of additively-manufactured components comprising lattice structures utilizing the same unit cell but different voxel sizes.
Figure 36:
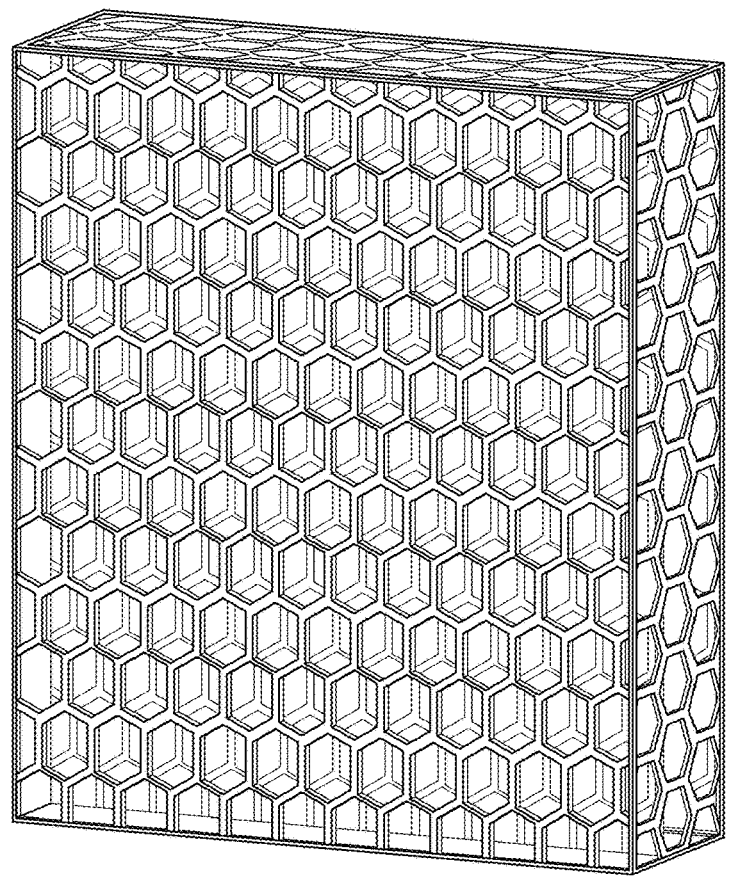

In some embodiments, such as the one shown in FIG. 35B, a density of the lattice 140 in a first one of the distinct zones $80_1$ of the lattice 140 is greater than the density of the lattice in a second one of the distinct zones $80_2$ of the lattice 140. Different densities of a lattice can be achieved in a number of ways. For example, FIG. 36 shows examples of lattices with different densities by virtue of using the same unit cell but different voxel sizes.

Figure 37A:
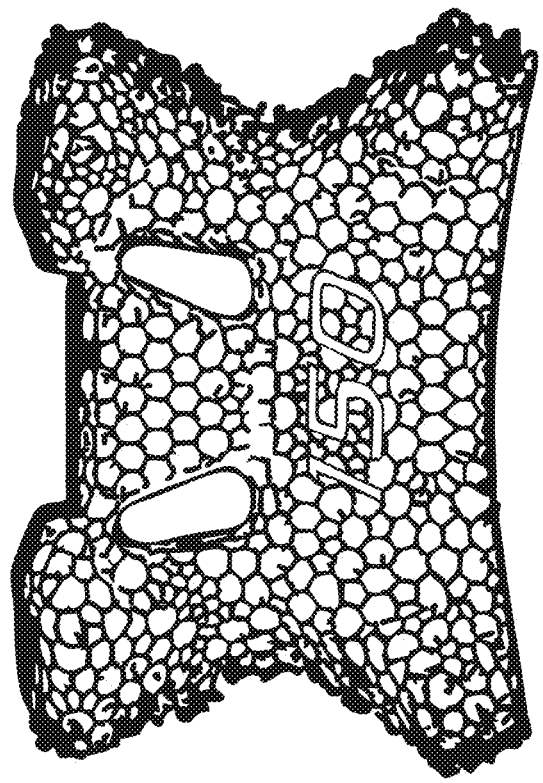
FIGS. 37A and 37B show another example of an additively-manufactured component constituting an occipital pad member of the inner lining of a hockey helmet.
Figure 37B:
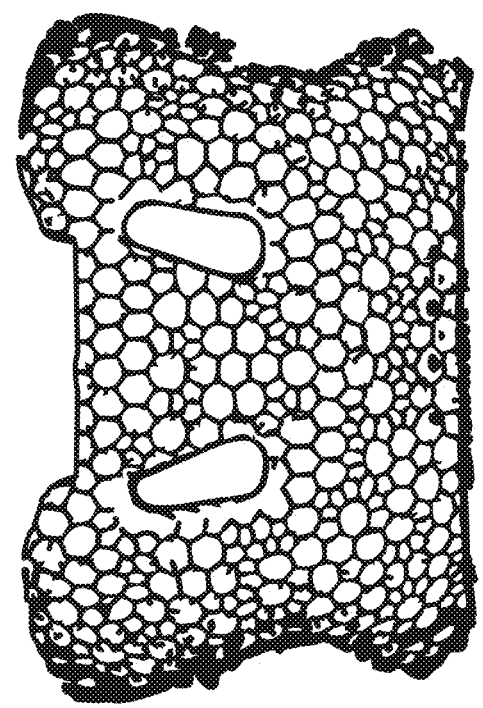

FIGS. 37A and 37B show front and back views, respectively, of another example of an AM component constituting an occipital pad member of the inner lining of a hockey helmet. In this example of implementation, the AM component constituting the occipital pad member is configured with a lattice structure that has a varying density by virtue of using varying voxel sizes in different regions of the lattice structure. As in the previous example implementation of an occipital pad shown in FIGS. 34A-C, in the example implementation shown in FIG. 37A the inner facing portion of the pad that would face the user's head when the helmet is worn is formed with a decorative indicia (i.e., the number "150").

In some embodiments, a spacing of elongate members $141_1$-$141_E$ of the lattice 140 in a first one of the distinct zones $80_1$ of the lattice 140 is less than the spacing of elongate members $141_1$-$141_E$ of the lattice 140 in a second one of the distinct zones $80_2$ of the lattice 140.

Figure 38:
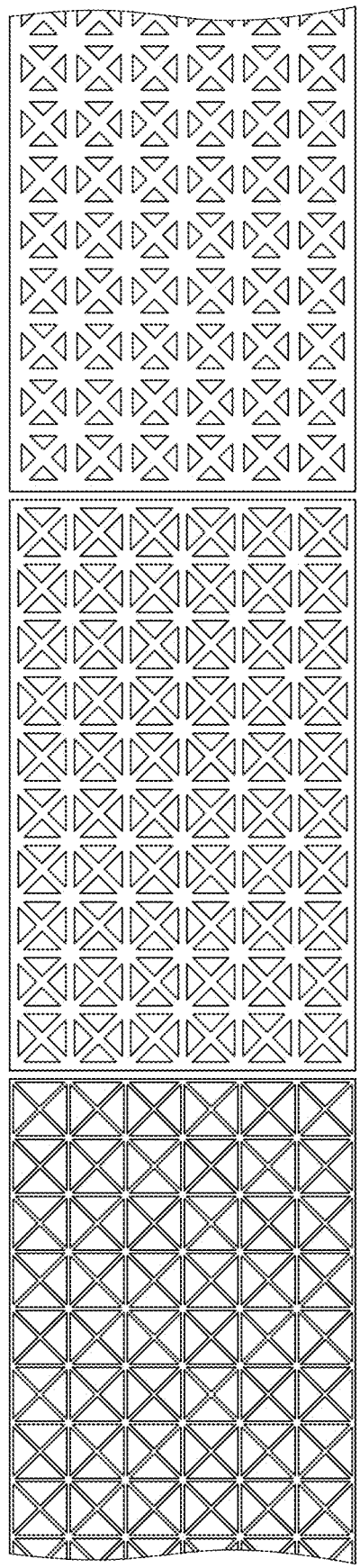
FIG. 38 shows examples of additively-manufactured components comprising lattice structures utilizing the same unit cell but different elongated member sizes.

In some embodiments, elongate members $141_1$-$141_E$ of the lattice 140 in a first one of the distinct zones $80_1$ of the lattice 140 are cross-sectionally larger than elongate members $141_1$-$141_E$ of the lattice 140 in a second one of the distinct zones of the lattice. For example, FIG. 38 shows examples of additively-manufactured components comprising lattice structures utilizing the same unit cell but different elongated member sizes.

In some embodiments, an orientation of elongate members $141_1$-$141_E$ of the lattice 140 in a first one of the distinct zones $80_1$ of the lattice 140 is different from the orientation of elongate members $141_1$-$141_E$ of the lattice 140 in a second one of the distinct zones $80_2$ of the lattice 140.

In some embodiments, a material composition of the lattice 140 in a first one of the distinct zones $80_1$ of the lattice 140 is different from the material composition of the lattice 140 in a second one of the distinct zones $80_2$ of the lattice 140.

Figure 35C:
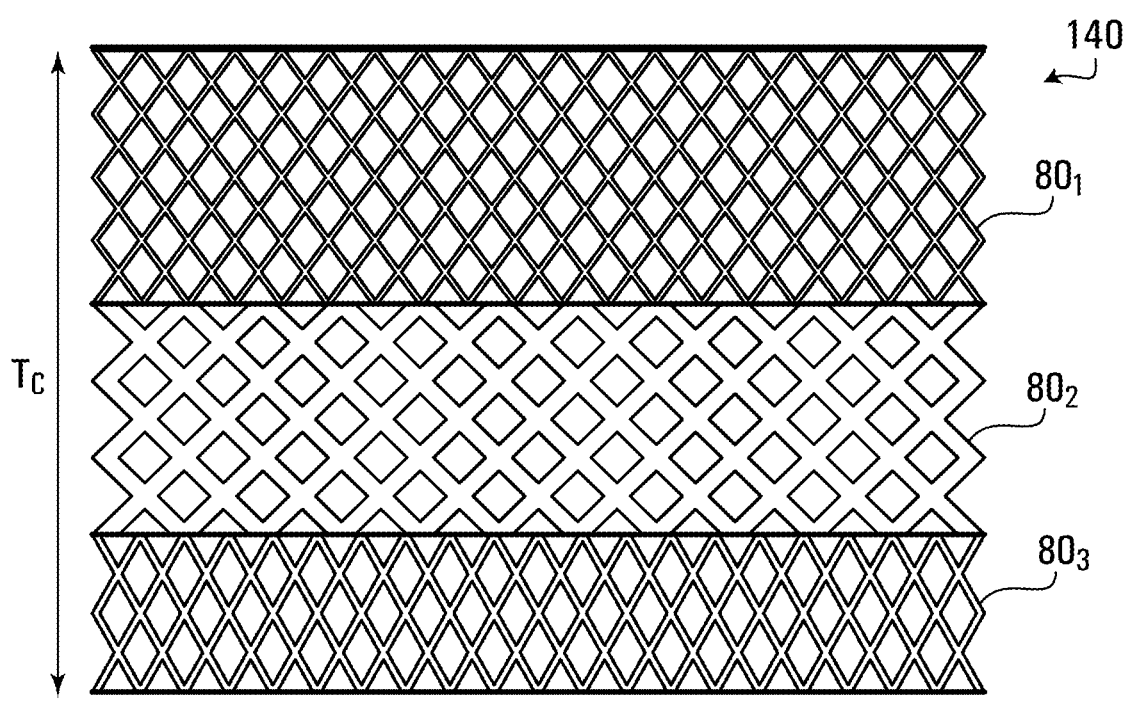
Figure 35D:
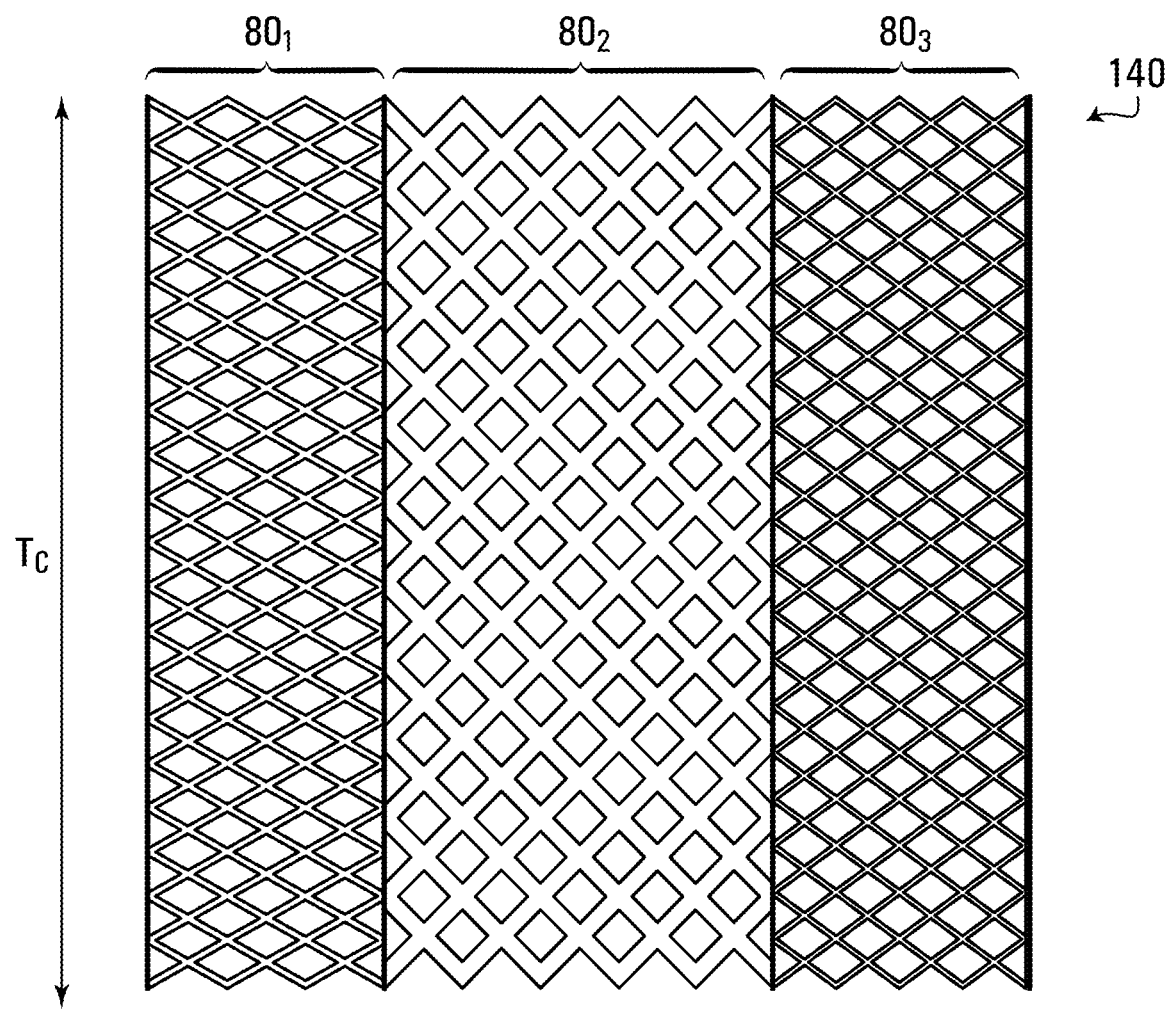

In some embodiment, such as those shown in FIGS. 35C and 35D, the distinct zones $80_1$-$80_Z$ of the lattice 140 include at least three distinct zones $80_1$, $80_2$, $80_3$.

In some embodiment, such as the one shown in FIG. 35C, the distinct zones $80_1$-$80_Z$ of the lattice 140 are layers of the lattice 140 that are layered on one another.

In some embodiments, the distinct zones $80_1$-$80_Z$ of the lattice 140 may facilitate adjustment of the fit of the helmet. For example, in some embodiments, the AM component $12_X$ comprised by the pad $36_X$ may facilitate adjustment of the helmet 10 when operating the adjustment mechanism 40. For example, in some embodiments, the AM component $12_X$ comprised by the pad $36_X$ may span adjacent ones of the shell members 22, 24 of the outer shell 11 and comprise an adjustment area $60_X$ between a portion $61_X$ of the AM component $12_X$ fastened to the shell member 22 and a portion $62_X$ of the AM component $12_X$ fastened to the shell member 24, such that these portions $61_X$, $62_X$ of the AM component $12_X$ are movable relative to one another when the shell members 22, 24 are moved relative to one another. The adjustment area $60_X$ of the AM component $12_X$ may be less stiff than the portions $61_X$, $62_X$ of the AM component $12_X$ so that the adjustment area 60 flexes more than the portions 61, 62 to facilitate their relative movement during adjustment.

Figure 39A:
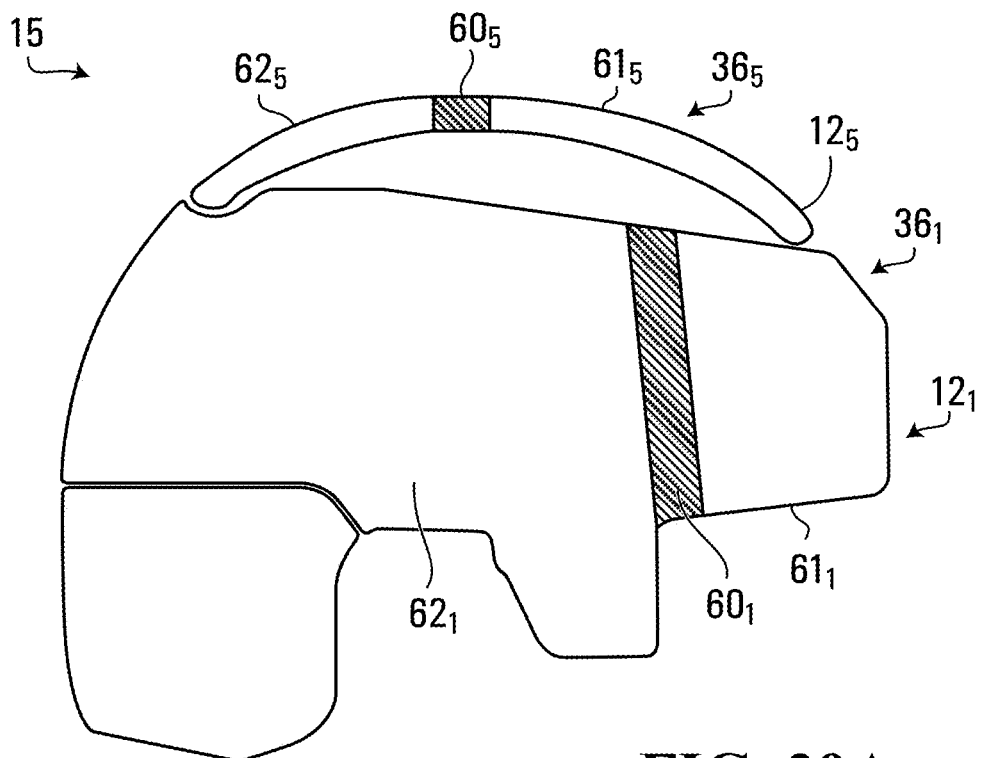
FIGS. 39A and 39B show an example of pads of a helmet in an open position and a closed position, respectively.
Figure 39B:
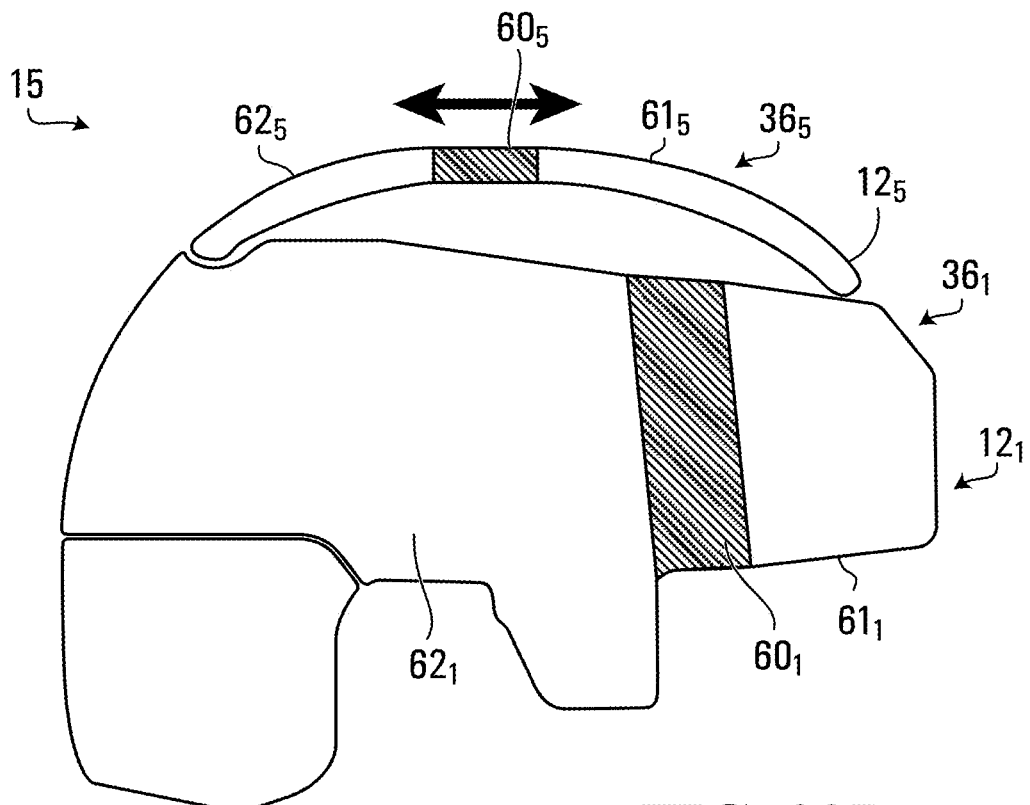

An example of such an embodiment is shown in FIGS. 39A and 39B, which show an example of the AM components $12_1$ and $12_5$ comprised by the pad $36_1$ and $36_5$ of the inner lining 15 of a helmet 10 in an open position and a closed position, respectively. For example, the AM component $12_1$ comprised by the pad $36_1$ spans the shell members 22, 24 of the outer shell 11 and comprises an adjustment area $60_1$ between a portion $61_1$ of the AM component $12_1$ fastened to the front shell member 22 and a portion $62_1$ of the AM component $12_1$ fastened to the rear shell member 24, such that the portions $61_1$, $62_1$ of the AM component $12_1$ are movable relative to one another when the shell members 22, 24 are moved relative to one another. The adjustment area $60_1$ of the AM component $12_1$ is configured so that it is less stiff than the portions $61_1$, $62_1$ of the AM component $12_1$ so that the adjustment area $60_1$ flexes more than the portions $61_1$, $62_1$ to facilitate their relative movement during adjustment of the shell members 22, 24. The adjustment areas of the AM components may have different structural components than the other areas of the AM components in order to provide the desired stiffness/flexibility, such as different material(s), a lesser density, lesser cross sectional size of elongate members, different unit cell(s) and/or different voxel size(s), as described above.

In some embodiments, a sensor may be associated with one or more of the AM components $12_1$-$12_A$ of the helmet 10. For example, the sensor may be sensitive to compression of the inner lining 15 and/or outer shell 11 of the helmet 10. In some embodiments, the AM component comprises the sensor, e.g., the sensor may be additively manufactured together with the AM component.

In some embodiments, the helmet comprises an actuator, and the sensor is responsive to an event to cause the actuator to alter the AM component. For example, the AM component may comprise material that is deformable by applying an electric current/voltage, and the actuator may be an electronic actuator configured to apply such an electric current/voltage to the AM component responsive to control signaling from the sensor. In some embodiments, the additively-manufactured component comprises piezoelectric material implementing the sensor.

In some embodiments, one or more of the AM components $12_1$-$12_A$ of the helmet 10 may be configured to receive a non-additively-manufactured component. For example, one or more of the AM components $12_1$-$12_A$ may be formed with a void that is accessible from an outer surface of the AM component and is configured to receive a non-AM component. For example, the AM component may comprise a lattice, such as the lattice 140 described above, and the non-AM component may be received within the lattice. In some embodiments, the non-AM component may be configured as an insert that is removably mountable to the lattice. In some embodiments, the non-AM component may comprise foam, for example. In other embodiments, the non-AM component may comprise fiber-reinforced polymeric material. In some embodiments, the non-AM component, when received in the AM component, serves to alter the shape and/or a functional property of the AM component, such as stiffness, rigidity, compressibility, etc.

In some embodiments, the non-AM component may comprise expandable material. For example, the AM component may be sacrificed when the non-AM component is expanded. In such embodiments, the AM component may function as a frame to contain and/or shape the expandable component, and is sacrificed when the non-AM component is expanded. In other embodiments, the AM component may be integrated with the expandable material of the expandable non-AM component so as to provide structural support to the non-AM component once it is expanded. For example, referring again to FIGS. 18 to 20, the inner padding 15 of the helmet may include post-molded expandable components 212 constituting the pads $36_1$ to $36_X$. Integrating an AM component into a post-molded expandable component has many potential benefits, such as potentially improving resistance to breakage, and may also allow a wider range of grades of expandable material to be used. For example, the integration of an AM component may allow lighter and/or more expandable materials to be used.

Figure 40:
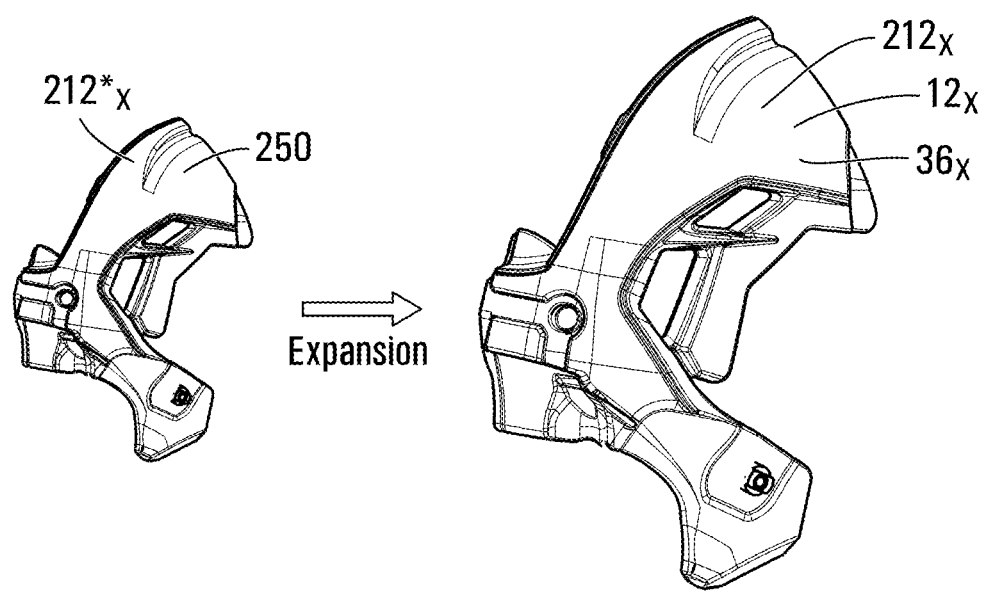
FIG. 40 shows an example of a precursor of a post-molded expandable component being expanded to form the post-molded expandable component.

FIG. 40 shows an example of a precursor $212_X{}^*$ of a post-molded expandable component $212_X$ being expanded to form the post-molded expandable component $212_X$ constituting a pad $36_X$. In this example, the pad $36_X$ corresponds to the right pad $36_4$ that was shown previously in FIGS. 18 to 20. In this example of implementation, the post-molded expandable component $212_X$ of the helmet 10 constituting the pad $36_X$ comprises an expandable material 250 that is molded into a precursor $212_X$* which can then be expanded by a stimulus (e.g., heat or another stimulus) to an expanded shape that is a scaled-up version of an initial shape of the precursor $212_X$*. Thus, in this example, a three-dimensional configuration of the initial shape of the precursor $212_X$* is such that, once the expandable material 250 is expanded, a three-dimensional configuration of the expanded shape of the post-molded expandable component $212_X$ imparts a three-dimensional configuration of the pad $36_X$ (e.g., including curved and/or angular parts of the pad $36_X$).

The post-molded expandable component $212_X$ of the helmet 10 constituting the pad $36_X$ is "expandable" in that it is capable of expanding and/or has been expanded by a substantial degree in response to a stimulus after being molded. That is, an expansion ratio of the post-molded expandable component $212_X$ of the helmet 10 constituting the pad $36_X$, which refers to a ratio of a volume of the post-molded expandable component $212_X$ of the helmet 10 after the expandable material 250 has been expanded subsequently to having been molded into the precursor $212_X$* over a volume of the precursor $212_X$* into which the expandable material 250 is initially molded, may be significantly high. For example, in some embodiments, the expansion ratio of the post-molded expandable component $212_X$ of the helmet 10 constituting the pad $36_X$ may be at least 2, in some cases at least 3, in some cases at least 5, in some cases at least 10, in some cases at least 20, in some cases at least 30, in some cases at least 40 and in some cases even more (e.g., 45).

Figure 41:
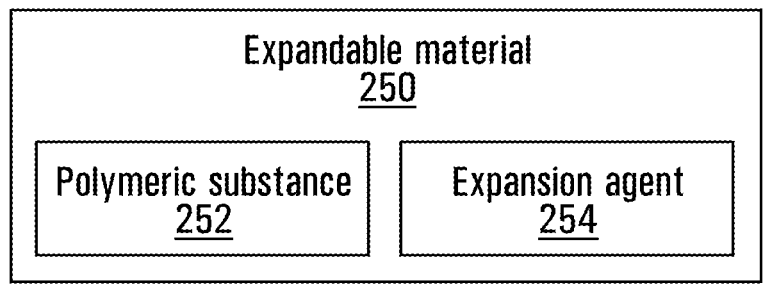
FIG. 41 is a block diagram representing an example of an expandable material of the post-molded expandable component.

In such embodiments, the expandable material 250 can be any material capable of expanding after being molded. For example, the expandable material 250 may include a mixture of a polymeric substance 252 and an expansion agent 254 that allows the expandable material 250 to expand. FIG. 41 is a block diagram representing an example of an expandable material of the post-molded expandable component. Once expanded into its final shape, the pad $36_X$ may have desirable properties, such as being more shock-absorbent than it if had been made entirely of the expansion agent 254 and/or being lighter than if it had been made entirely of the polymeric substance 252.

The polymeric substance 252 constitutes a substantial part of the expandable material 250 and substantially contributes to structural integrity of the pad $36_X$. For instance, in some embodiments, the polymeric substance 252 may constitute at least 40%, in some cases at least 50%, in some cases at least 60%, in some cases at least 70%, in some cases at least 80%, and in some cases at least 90% of the expandable material 250 by weight. In this example of implementation, the polymeric substance 252 may constitute between 50% and 90% of the expandable material 250 by weight.

In this embodiment, the polymeric substance 252 may be an elastomeric substance. For instance, the polymeric substance 252 may be a thermoplastic elastomer (TPE) or a thermoset elastomer (TSE).

More particularly, in this embodiment, the polymeric substance 252 comprises polyurethane. The polyurethane 252 may be composed of any suitable constituents such as isocyanates and polyols and possibly additives. For instance, in some embodiments, the polyurethane 252 may have a hardness in a scale of Shore 00, Shore A, Shore C or Shore D, or equivalent. For example, in some embodiments, the hardness of the polyurethane 252 may be between Shore 5A and 95A or between Shore D 40D to 93D. Any other suitable polyurethane may be used in other embodiments.

The polymeric substance 252 may comprise any other suitable polymer in other embodiments. For example, in some embodiments, the polymeric substance 252 may comprise silicon, rubber, ethylene-vinyl acetate (EVA) etc.

The expansion agent 254 is combined with the polyurethane 252 to enable expansion of the expandable material 250 to its final shape after it has been molded. A quantity of the expansion agent 254 allows the expandable material 250 to expand by a substantial degree after being molded. For instance, in some embodiments, the expansion agent 254 may constitute at least 10%, in some cases at least 20%, in some cases at least 30%, in some cases at least 40%, in some cases at least 50%, and in some cases at least 60%, of the expandable material 250 by weight and in some cases even more. In this example of implementation, the expansion agent 254 may constitute between 15% and 50% of the expandable material 250 by weight. Controlling the quantity of the expansion agent 254 may allow control of the expansion ratio of the post-molded expandable component $212_X$.

Figure 42:
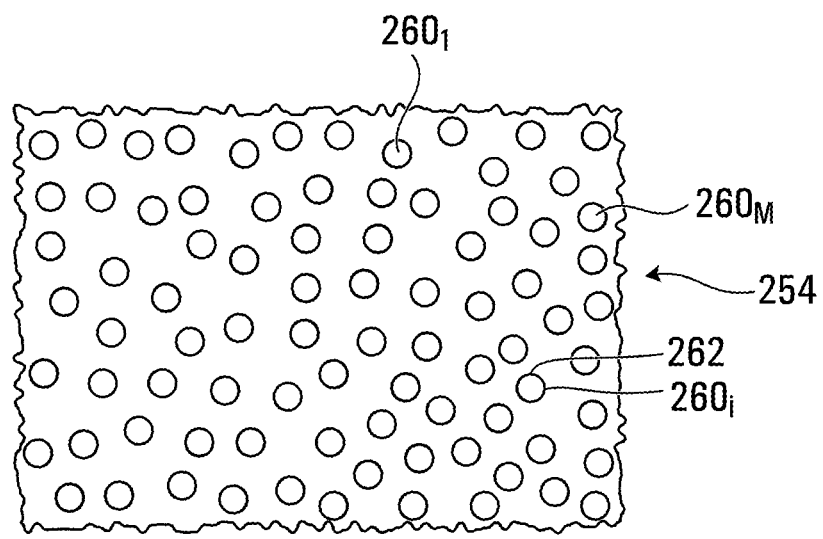
FIG. 42 shows an example of an expansion agent of the expandable material of the post-molded expandable component.

In this embodiment, as shown in FIG. 42, the expansion agent 254 comprises an amount of expandable microspheres $260_1$-$260_M$. Each expandable microsphere $260_i$ comprises a polymeric shell 262 expandable by a fluid encapsulated in an interior of the polymeric shell 262. In this example of implementation, the polymeric shell 262 of the expandable microsphere $260_i$ is a thermoplastic shell. The fluid encapsulated in the polymeric shell 262 is a liquid or gas (in this case a gas) able to expand the expandable microsphere $260_i$ when heated during manufacturing of the pad $36_X$. In some embodiments, the expandable microspheres $260_1$-$260_M$ may be Expancel™ microspheres commercialized by Akzo Nobel. In other embodiments, the expandable microspheres $260_1$-$260_M$ may be Dualite microspheres commercialized by Henkel; Advancell microspheres commercialized by Sekisui; Matsumoto Microsphere microspheres commercialized by Matsumoto Yushi Seiyaku Co; or KUREHA Microsphere microspheres commercialized by Kureha. Various other types of expandable microspheres may be used in other embodiments.

In this example of implementation, the expandable microspheres $260_1$-$260_M$ include dry unexpanded (DU) microspheres when combined with the polymeric substance 252 to create the expandable material 250 before the expandable material 250 is molded and subsequently expanded. For instance, the dry unexpanded (DU) microspheres may be provided as a powder mixed with one or more liquid constituents of the polymeric substance 252.

The expandable microspheres $260_1$-$260_M$ may be provided in various other forms in other embodiments. For example, in some embodiments, the expandable microspheres $260_1$-$260_M$ may include dry expanded, wet and/or partially-expanded microspheres. For instance, wet unexpanded microspheres may be used to get better bonding with the polymeric substance 252. Partially-expanded microspheres may be used to employ less of the polymeric substance 252, mix with the polymeric substance 252 in semi-solid form, or reduce energy to be subsequently provided for expansion.

In some embodiments, the expandable microspheres $260_1$-$260_M$ may constitute at least 10%, in some cases at least 20%, in some cases at least 30%, in some cases at least 40%, in some cases at least 50%, and in some cases at least 60% of the expandable material 250 by weight and in some cases even more. In this example of implementation, the expandable microspheres $260_1$-$260_M$ may constitute between 15% and 50% of the expandable material 250 by weight.

The post-molded expandable component $212_X$ of the helmet 10 constituting the pad $36_X$ may have various desirable qualities.

For instance, in some embodiments, the pad $36_X$ may be less dense and thus lighter than if it was entirely made of the polyurethane 252, yet be more shock-absorbent and/or have other better mechanical properties than if it was entirely made of the expandable microspheres $260_1$-$260_M$.

For example, in some embodiments, a density of the expandable material 250 of the pad $36_X$ may be less than a density of the polyurethane 252 (alone). For instance, the density of the expandable material 250 of the pad $36_X$ may be no more than 70%, in some cases no more than 60%, in some cases no more than 50%, in some cases no more than 40%, in some cases no more than 30%, in some cases no more than 20%, in some cases no more than 10%, and in some cases no more than 5% of the density of the polyurethane 252 and in some cases even less. For example, in some embodiments, the density of the expandable material 250 of the pad $36_X$ may be between 2 to 75 times less than the density of the polyurethane 252, i.e., the density of the expandable material 250 of the pad $36_X$ may be about 1% to 50% of the density of the polyurethane 252).

The density of the expandable material 250 of the pad $36_X$ may have any suitable value. For instance, in some embodiments, the density of the expandable material 250 of the pad $36_X$ may be no more than 0.7 g/cm$^3$, in some cases no more than 0.4 g/cm$^3$, in some cases no more than 0.1 g/cm$^3$, in some cases no more than 0.080 g/cm$^3$, in some cases no more than 0.050 g/cm$^3$, in some cases no more than 0.030 g/cm$^3$, and/or may be at least 0.010 g/cm$^3$. In some examples of implementation, the density of the expandable material 250 may be between 0.015 g/cm$^3$ and 0.080 g/cm$^3$, in some cases between 0.030 g/cm$^3$ and 0.070 g/cm$^3$, and in some cases between 0.040 g/cm$^3$ and 0.060 g/cm$^3$.

As another example, in some embodiments, a stiffness of the expandable material 250 of the pad $36_X$ may be different from (i.e., greater or less than) a stiffness of the expandable microspheres $260_1$-$260_M$ (alone). For instance, a modulus of elasticity (i.e., Young's modulus) of the expandable material 250 of the pad $36_X$ may be greater or less than a modulus of elasticity of the expandable microspheres $260_1$-$260_M$ (alone). For instance, a difference between the modulus of elasticity of the expandable material 250 of the pad $36_X$ and the modulus of elasticity of the expandable microspheres $260_1$-$260_M$ may be at least 20%, in some cases at least 30%, in some cases at least 50%, and in some cases even more, measured based on a smaller one of the modulus of elasticity of the expandable material 250 of the pad $36_X$ and the modulus of elasticity of the expandable microspheres $260_1$-$260_M$. In some cases, the modulus of elasticity may be evaluated according to ASTM D-638 or ASTM D-412.

As another example, in some embodiments, a resilience of the expandable material 250 of the pad $36_X$ may be less than a resilience of the expandable microspheres $260_1$-$260_M$ (alone). For instance, in some embodiments, the resilience of the expandable material 250 of the pad $36_X$ may be no more than 70%, in some cases no more than 60%, in some cases no more than 50%, in some cases no more than 40%, in some cases no more than 30%, in some cases no more than 20%, and in some cases no more than 10% of the resilience of the expandable microspheres $260_1$-$260_M$ according to ASTM D2632-01 which measures resilience by vertical rebound. In some examples of implementation, the resilience of the expandable material 250 of the pad $36_X$ may be between 20% and 60% of the resilience of the expandable microspheres $260_1$-$260_M$. Alternatively, in other embodiments, the resilience of the expandable material 250 of the pad $36_X$ may be greater than the resilience of the expandable microspheres $260_1$-$260_M$.

The resilience of the expandable material 250 of the pad $36_X$ may have any suitable value. For instance, in some embodiments, the resilience of the expandable material 250 of the pad $36_X$ may be no more than 40%, in some cases no more than 30%, in some cases no more than 20%, in some cases no more than 10% and in some cases even less (e.g., 5%), according to ASTM D2632-01, thereby making the pad $36_X$ more shock-absorbent. In other embodiments, the resilience of the expandable material 50 of the pad $36_X$ may be at least 60%, in some cases at least 70%, in some cases at least 80% and in some cases even more, according to ASTM D2632-01, thereby making the expandable material 250 provide more rebound.

As another example, in some embodiments, a tensile strength of the expandable material 250 of the pad $36_X$ may be greater than a tensile strength of the expandable microspheres $260_1$-$260_M$ (alone). For instance, in some embodiments, the tensile strength of the expandable material 250 of the pad $36_X$ may be at least 120%, in some cases at least 150%, in some cases at least 200%, in some cases at least 300%, in some cases at least 400%, and in some cases at least 500% of the tensile strength of the expandable microspheres $260_1$-$260_M$ according to ASTM D-638 or ASTM D-412, and in some cases even more.

The tensile strength of the expandable material 250 of the pad $36_X$ may have any suitable value. For instance, in some embodiments, the tensile strength of the expandable material 250 of the pad $36_X$ may be at least 0.9 MPa, in some cases at least 1 MPa, in some cases at least 1.2 MPa, in some cases at least 1.5 MPa and in some cases even more (e.g. 2 MPa or more).

As another example, in some embodiments, an elongation at break of the expandable material 250 of the pad $36_X$ may be greater than an elongation at break of the expandable microspheres $260_1$-$260_M$ (alone). For instance, in some embodiments, the elongation at break of the expandable material 250 of the pad $36_X$ may be at least 120%, in some cases at least 150%, in some cases at least 200%, in some cases at least 300%, in some cases at least 400%, and in some cases at least 500% of the elongation at break of the expandable microspheres $260_1$-$260_M$ according to ASTM D-638 or ASTM D-412, and in some cases even more.

The elongation at break of the expandable material 250 of the pad $36_X$ may have any suitable value. For instance, in some embodiments, the elongation at break of the expandable material 250 of the pad $36_X$ may be at least 20%, in some cases at least 30%, in some cases at least 50%, in some cases at least 75%, in some cases at least 100%, and in some cases even more (e.g. 150% or more).

With additional reference to FIG. 40, in this example of implementation the post-molded expandable component $212_X$ constituting the pad $36_X$ includes an additively manufactured component $12_X$. For example, the precursor $212_X$* of the post-molded expandable component $212_X$ may be molded around the additively manufactured component $12_X$. In some embodiments, the additively manufactured component $12_X$ may include a lattice with an open structure. In such embodiments, the expandable material 250 may extend at least partially into/through the additively manufactured component $12_X$.

Figure 43:
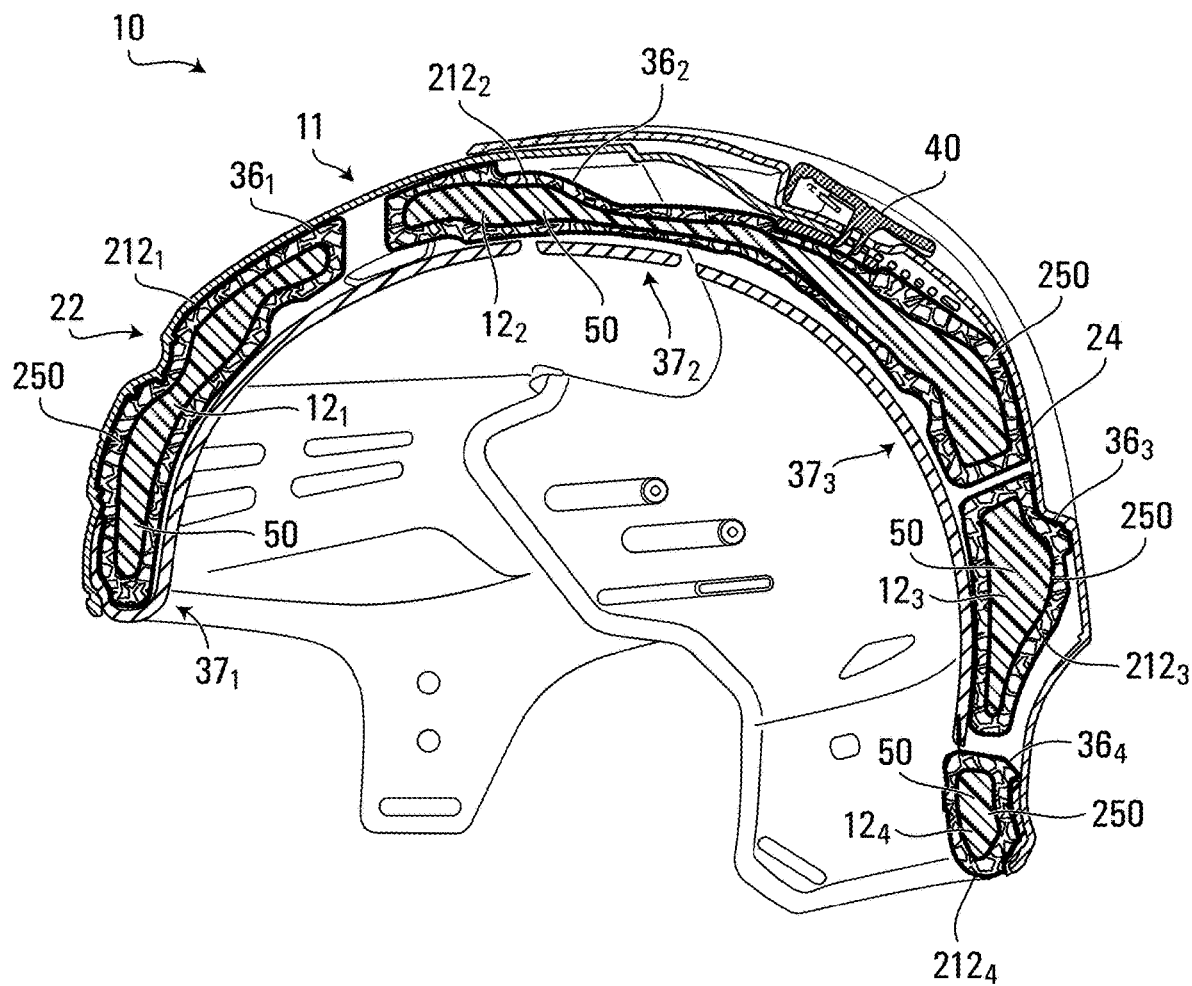
FIG. 43 shows a cross-sectional view of a sport helmet with inner padding that includes additively-manufactured components integrated into post-molded expandable components.

FIG. 43 shows a cross-sectional view of a sport helmet 10 with inner padding 15 that includes additively manufactured components $12_1$-$12_4$ integrated into post-molded expandable components $212_1$-$212_4$ constituting pads $36_1$-$36_4$. In this example of implementation, the additively manufactured component $12_1$-$12_4$ are made from additively manufactured material 50 and act as a reinforcing structure or armature for the post-molded expandable components $212_1$-$212_4$.

In some embodiments, an AM component may comprise expandable material. For example, rather than being molded and then expanded through a post-molded expansion process like the one discussed above with reference to FIGS. 40 to 43, an expandable component may instead be additively manufactured by additively-manufacturing a precursor and then expanding the precursor into a post-additively-manufactured (post-AM) expandable component through a post-AM expansion process.

For example, referring again to FIGS. 18 to 20, the inner padding 15 of the helmet 10 may include post-AM expandable components 512 constituting the pads $36_1$ to $36_X$. Utilizing post-AM expandable components has many potential benefits, such as potentially reducing the time required for the additive-manufacturing, because the physical size of the precursor is potentially many times smaller than that of the fully expanded component. For example, the additional time required to expand a post-AM precursor into a post-AM expandable component may be more than offset by a reduction in time required to additively-manufacture the physically smaller precursor. Furthermore, and the use of post-AM expandable components may also allow components to be made lighter/less dense for a given volume while still satisfying other desirable performance characteristics, such as impact absorption, resiliency, structural integrity, etc.

Figure 44:
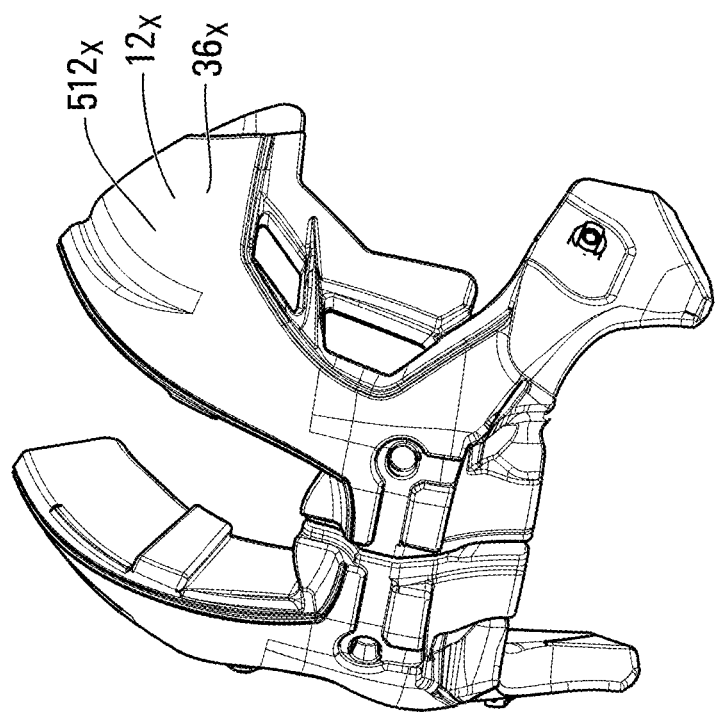
FIG. 44 shows an example of a precursor of a post-additively manufactured expandable component being expanded to form the post-additively manufactured expandable component.
Figure 44:
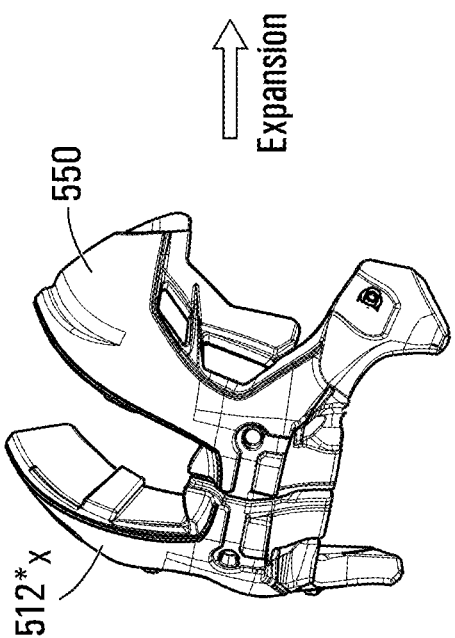

FIG. 44 shows an example of a precursor $512_X^*$ of a post-AM expandable component $512_X$ being expanded to form the post-AM expandable component $512_X$ constituting a pad $36_X$. In this example, the pad $36_X$ corresponds to the left and right pads $36_3$ and $36_4$ that were shown previously in FIGS. 18 to 20. In this example of implementation, the post-AM expandable component $512_X$ of the helmet 10 constituting the pad $36_X$ comprises an expandable material 550 that is additively-manufactured into a precursor $512_X^*$ which can then be expanded by a stimulus (e.g., heat or another stimulus) to an expanded shape that is a scaled-up version of an initial shape of the precursor $512_X^*$. Thus, in this example, a three-dimensional configuration of the initial shape of the precursor $512_X^*$ is such that, once the expandable material 550 is expanded, a three-dimensional configuration of the expanded shape of the post-AM expandable component $512_X$ imparts a three-dimensional configuration of the pad $36_X$ (e.g., including curved and/or angular parts of the pad $36_X$).

The post-AM expandable component $512_X$ of the helmet 10 constituting the pad $36_X$ is "expandable" in that it is capable of expanding and/or has been expanded by a substantial degree in response to a stimulus after being additively-manufactured. That is, an expansion ratio of the post-AM expandable component $512_X$ of the helmet 10 constituting the pad $36_X$, which refers to a ratio of a volume of the post-AM expandable component $512_X$ of the helmet 10 after the expandable material 550 has been expanded subsequently to having been additively-manufactured into the precursor $512_X^*$ over a volume of the precursor $512_X^*$ into which the expandable material 550 is initially additively-manufactured, may be significantly high. For example, in some embodiments, the expansion ratio of the post-AM expandable component $512_X$ of the helmet 10 constituting the pad $36_X$ may be at least 2, in some cases at least 3, in some cases at least 5, in some cases at least 10, in some cases at least 20, in some cases at least 30, in some cases at least 40 and in some cases even more (e.g., 45).

In such embodiments, the expandable material 550 can be any material capable of expanding after being additively-manufactured. For example, the expandable material 550 may include a mixture of a polymeric substance and an expansion agent that allows the expandable material 550 to expand after an additive manufacturing step has been done to form the expandable material 550 into a precursor component. Once expanded into its final shape, the pad $36_X$ may have desirable properties, such as being more shock-absorbent than it if had been made entirely of the expansion agent and/or being lighter than if it had been made entirely of the polymeric substance.

In some embodiments, a polymeric substance may constitute a substantial part of the expandable material 550 and may substantially contribute to structural integrity of the pad $36_X$. For instance, in some embodiments, a polymeric substance may constitute at least 40%, in some cases at least 50%, in some cases at least 60%, in some cases at least 70%, in some cases at least 80%, and in some cases at least 90% of the expandable material 550 by weight.

In some embodiments, the expandable material 550 may comprise a polymeric substance that is elastomeric. For instance, the expandable material 550 may comprise a polymeric substance such as a thermoplastic elastomer (TPE) or a thermoset elastomer (TSE). In some embodiments, the polymeric substance may comprise polyurethane. The polyurethane may be composed of any suitable constituents such as isocyanates and polyols and possibly additives. For instance, in some embodiments, the polyurethane may have a hardness in a scale of Shore 00, Shore A, Shore C or Shore D, or equivalent. For example, in some embodiments, the hardness of the polyurethane may be between Shore 5A and 95A or between Shore D 40D to 93D. Any other suitable polyurethane may be used in other embodiments.

In other embodiments, the expandable material 550 may comprises any other suitable polymer in other embodiments. For example, in some embodiments, the expandable material 550 may include a polymeric substance such as silicon, rubber, etc.

In some embodiments an expansion agent may be combined with a polymeric substance, such as polyurethane, to enable expansion of the expandable material 550 to its final shape after the precursor $512_X^*$ has been additively-manufactured.

A quantity of the expansion agent allows the expandable material 550 to expand by a substantial degree after being additively-manufactured to form the precursor $512_X^*$. For instance, in some embodiments, the expansion agent may constitute at least 10%, in some cases at least 20%, in some cases at least 30%, in some cases at least 40%, in some cases at least 50%, and in some cases at least 60%, of the expandable material 550 by weight and in some cases even more. Controlling the quantity of the expansion agent may allow control of the expansion ratio of the post-AM expandable component $512_X$.

The post-AM expandable component $512_X$ of the helmet 10 constituting the pad $36_X$ may have various desirable qualities similar to the post-molded expandable component $212_X$ described earlier.

In some embodiments, the combining of the polymeric substance and the expansion agent occurs during the additive-manufacturing process, and there is an intermediary polymerizing step to polymerize the polymeric substance and the expansion agent before the further step of expansion of the precursor $512_X^*$ into the post-AM expandable component $512_X$. For example, the intermediate polymerizing step might involve applying heat, light or some other form of energy to the preliminary formed combination of the polymeric substance and the expansion agent in order to promote polymerization without causing expansion.

The additive manufacturing technology utilized in such embodiments could include any one or more of the additive manufacturing technologies discussed earlier. For instance, in one example of implementation, a vat photopolymerization AM technology, such as SLA, DLP or CDLP may be used to light-cure a mixture of a polymeric substance and an expansion agent. For example, in such embodiments, a planetary mixer or any other suitable mixer may be used to first mix the polymeric substance (e.g., polyurethane or acrylic) with the expansion agent (e.g., expandable microspheres, such as unexpanded Expancel, Dualite microspheres, Advancell microspheres, etc.), and then a SLA, DLP or CDLP type 3D printer may be used to light-cure the polymeric substance/expansion agent mixture to consolidate the material into a preliminary form. In such embodiments, final polymerization of the polymeric substance/expansion agent mixture may be done using a heat and/or light source that does not reach the expansion temperature of the expansion agent so that the temperature of the expandable material during the additive-manufacturing is lower than the expansion temperature of the expansion agent. For instance, in some embodiments where the expansion temperature of the expansion agent may be 70° C. or more, the additive-manufacturing process may be carried out such that the temperature of the expandable material 550 being additively-manufactured into the precursor $512_X^*$ is less than 70° C. (e.g., 40° C.). Once the polymerization step has been completed, the expansion phase may be activated by using a heat source to raise the temperature of the expandable material 550 above the expansion temperature of the expansion agent.

Figure 45:
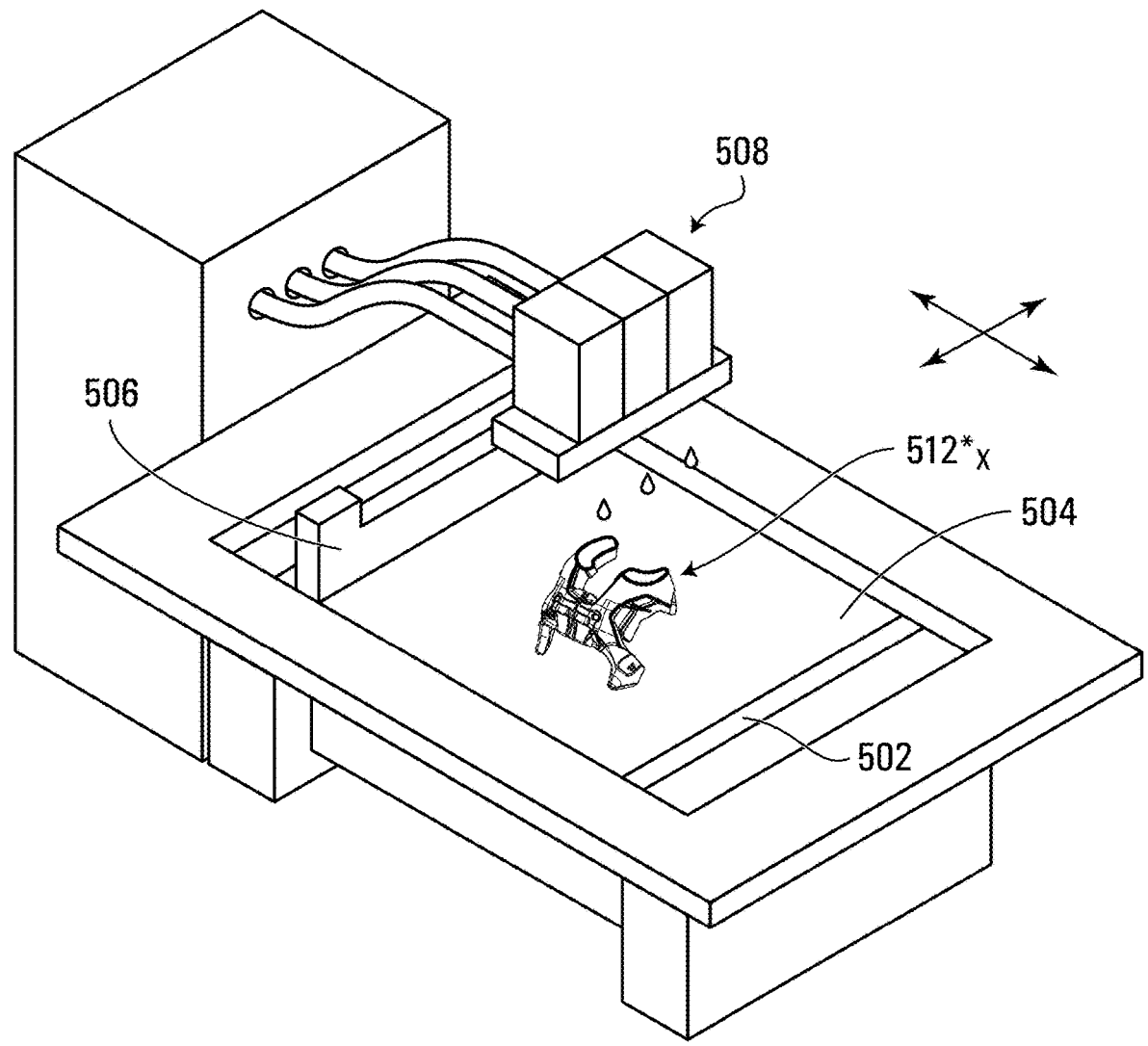
FIG. 45 shows a schematic of an example of a binder jetting system for forming a precursor of a post-additively-manufactured expandable component.

Other AM technologies may be used to additively-manufacture expandable components in other embodiments. For example, FIG. 45 shows an example of a binder jetting 3D printer system 500 being used to additively manufacture a precursor $512_X^*$ of a post-AM expandable component $512_X$ in accordance with another embodiment of the present disclosure. In binder jetting, a binder is selectively deposited onto a bed of powder to selectively bond areas together to form solid parts layer-by-layer. The binder jetting 3D printer system 500 includes a build platform 502, a recoating blade 506 and a binder nozzle carriage 508. In operation, the recoating blade 506 first spreads a bed or layer of powder expansion agent 504 (e.g., unexpanded Expancel, Dualite microspheres, Advancell microspheres, etc.) over the build platform 502. Then, the binder jetting nozzle carriage 508, which includes jetting nozzles similar to the nozzles used in desktop inkjet 2D printers, is moved over the powder bed 504 and the nozzles are controlled to selectively deposit droplets of a binding agent (e.g., a polymeric substance such as polyurethane) that bonds the powder particles of the expansion agent together. When a layer is complete, the build platform 502 moves downwards and the recoating blade 506 spreads a new layer of powder expansion agent 504 to re-coat the powder bed. This process then repeats until the preliminary form of the precursor $512_X^*$ is complete. After printing, the preliminary form of the precursor $512_X^*$ may be removed from the powder bed and unbound, excess powder expansion agent may be removed via pressurized air. Similar to the previous vat photopolymerization example, the final polymerization or curing of the preliminary form of the precursor $512_X^*$ may be done using a heat source that does not reach the expansion temperature of the expansion agent. For instance, in some embodiments where the expansion temperature of the expansion agent may be 70° C. or more, the preliminary form of the precursor $512_X^*$ may be cured in an oven at 50-60° C. after being removed from the powder bed. Once the polymerization step has been completed and the precursor $512_X^*$ has been cured, the expansion phase may be activated by raising the temperature of the expandable material 550 above the expansion temperature of the expansion agent.

Referring again to the example embodiment of a sport helmet 10 shown in FIG. 43, it is noted that, in addition to the inner padding 15, in this embodiment the helmet 10 also includes comfort pads $37_1$-$37_4$. In some embodiments, the comfort pads $37_1$-$37_4$ may also or instead include additively manufactured components. For example, in some embodiments, the additively manufactured components $12_X$ of the helmet 10 may instead constitute the comfort pads $37_X$.

Figure 46:
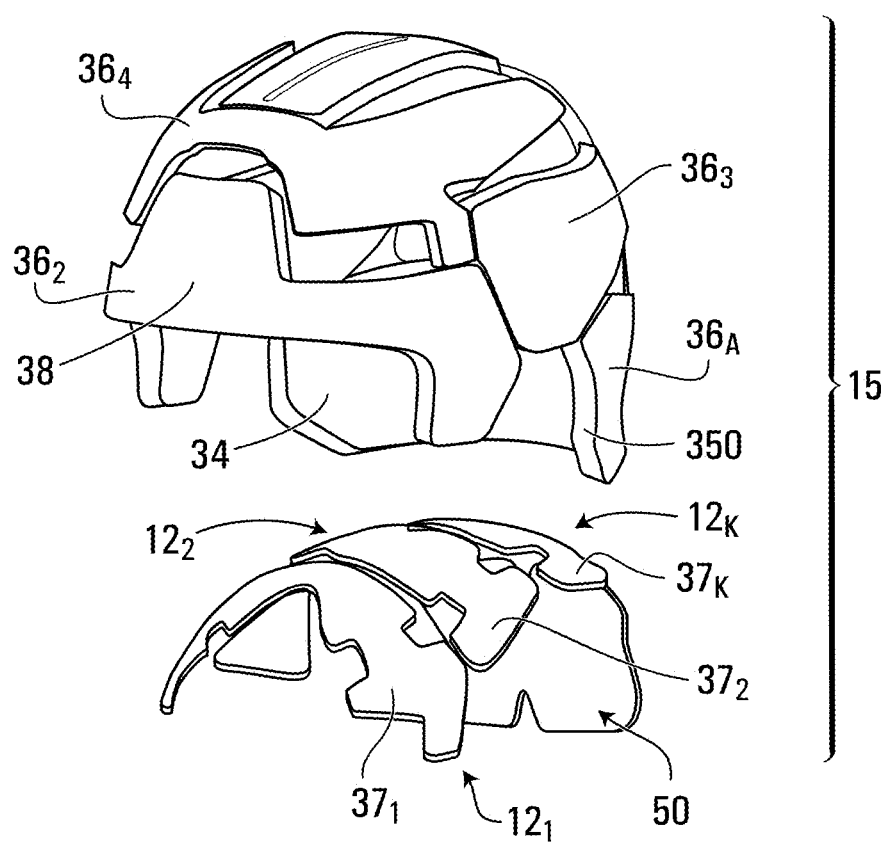
FIG. 46 shows an exploded view of an example of inner padding for a sport helmet in which the comfort pads include additively manufactured components.

FIG. 46 shows an exploded view of an example of inner padding 15 for a sport helmet in which the comfort pads $37_X$ include additively manufactured components $12_X$. In particular, in this example of implementation, the inner padding 15 includes absorption pads $36_1$-$36_4$, and additively manufactured components $12_1$-$12_K$ constituting comfort pads $37_1$-$37_K$. In this example of implementation, the comfort pads $37_1$-$37_K$ are made from an additively manufactured material 50, which, in some embodiments, could be an expandable material 550 as described above. In contrast, the absorption pads $36_1$-$36_4$ may be made from a more conventional non-additively manufactured material 350, such as EPP or Expancel.

In some embodiments, the comfort pads $37_1$-$37_K$ are configured for low energy levels that reach a targeted 35 shore OO durometer or less. Since additively manufactured material 50 can be a solid material rather than a material with an open cell structure, such as many conventional memory foams, implementing the comfort pads $37_1$-$37_K$ with additively manufactured components $12_1$-$12_K$ may address the water absorption problem that often occurs when materials with open cell structures are used for comfort padding parts in order to provide a desired level of comfort. For example, in some embodiments a relatively low hardness and feel to provide a desired level of comfort could be achieved by using a relatively small mesh lattice structure with relatively thin elongate members.

Figure 47:
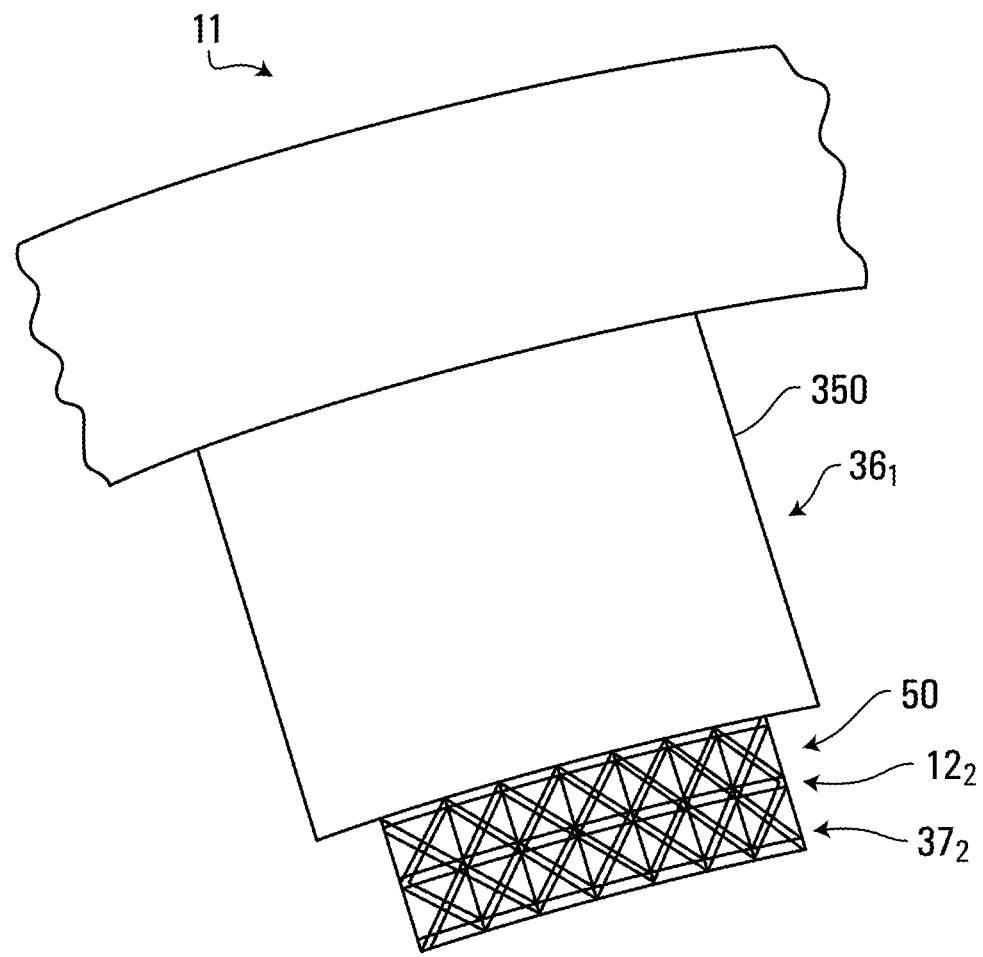
FIG. 47 shows a cross-sectional view of a portion of the inner padding of FIG. 46.

FIG. 47 shows a cross-sectional view of a portion of the inner padding of FIG. 46 showing that the additively manufactured component $12_2$ constituting the comfort pad $37_2$ lies between the wearer's head and the absorption pad $36_1$ when the helmet 10 is worn. In some embodiments the comfort pads $37_1$-$37_K$ may be affixed to the absorption pads $36_1$-$36_4$. In other embodiments the comfort pads may be otherwise affixed to the helmet, but may be moveable relative to the absorption pads. In some embodiments, the comfort pads may also or instead be moveable relative to one another, e.g., during adjustment of the fit of the helmet and/or as a result of deflection of the helmet due to an impact.

As noted above with reference to the example hockey helmet 10 shown in FIGS. 10-20, in some embodiments the shock-absorbing materials used in the liner 15 may include liquid crystal elastomer (LCE) components in order to enhance their impact absorbing performance, e.g., to provide better impact energy dissipation. A mesogen is a compound that displays liquid crystal properties. Mesogens can be described as disordered solids or ordered liquids because they arise from a unique state of matter that exhibits both solid-like and liquid-like properties called the liquid crystalline state. This liquid crystalline state is called the mesophase and occurs between the crystalline solid state and the isotropic liquid state at distinct temperature ranges. LCEs are materials that are made up of slightly crosslinked liquid crystalline polymer networks. LCE materials combine the entropy elasticity of an elastomer with the self-organization of a liquid crystalline phase. In LCEs, the mesogens can either be part of the polymer chain (main-chain liquid crystalline elastomers) or they are attached via an alkyl spacer (side-chain liquid crystalline elastomers).

Figure 48A:
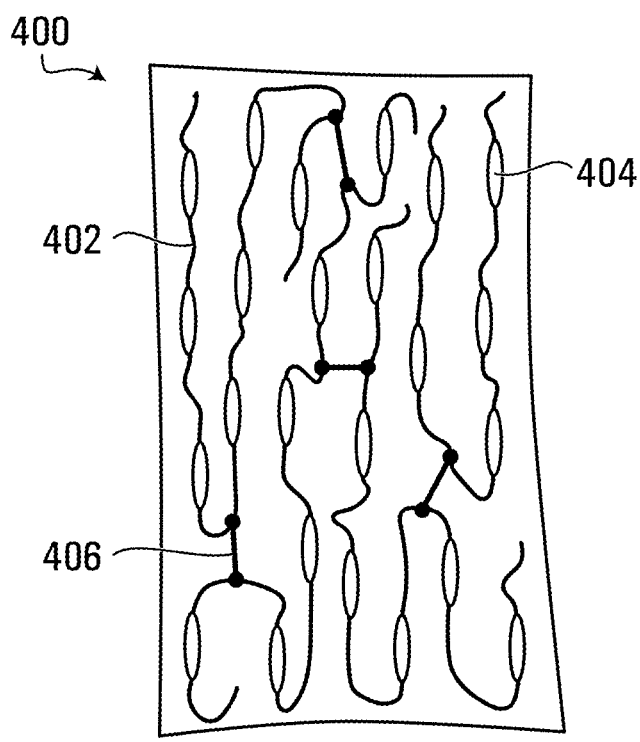
FIGS. 48A and 48B show examples of a liquid crystal elastomer material in compressed and uncompressed states.
Figure 48B:
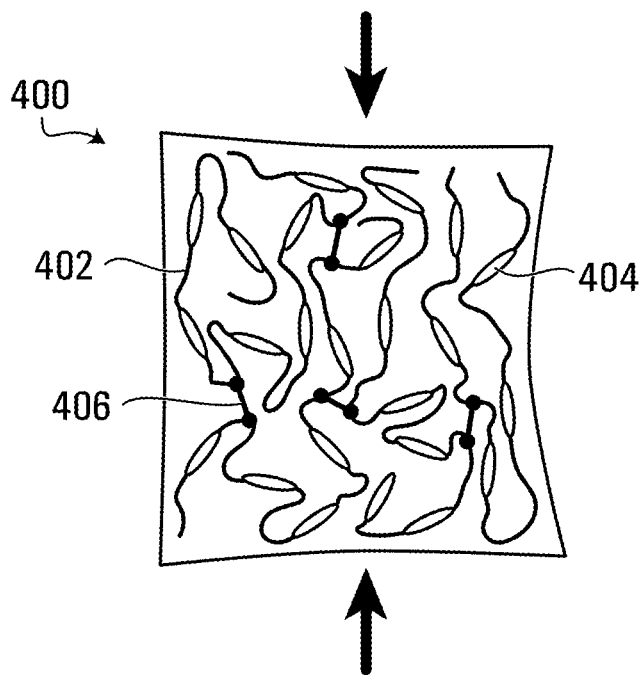
Figure 49:
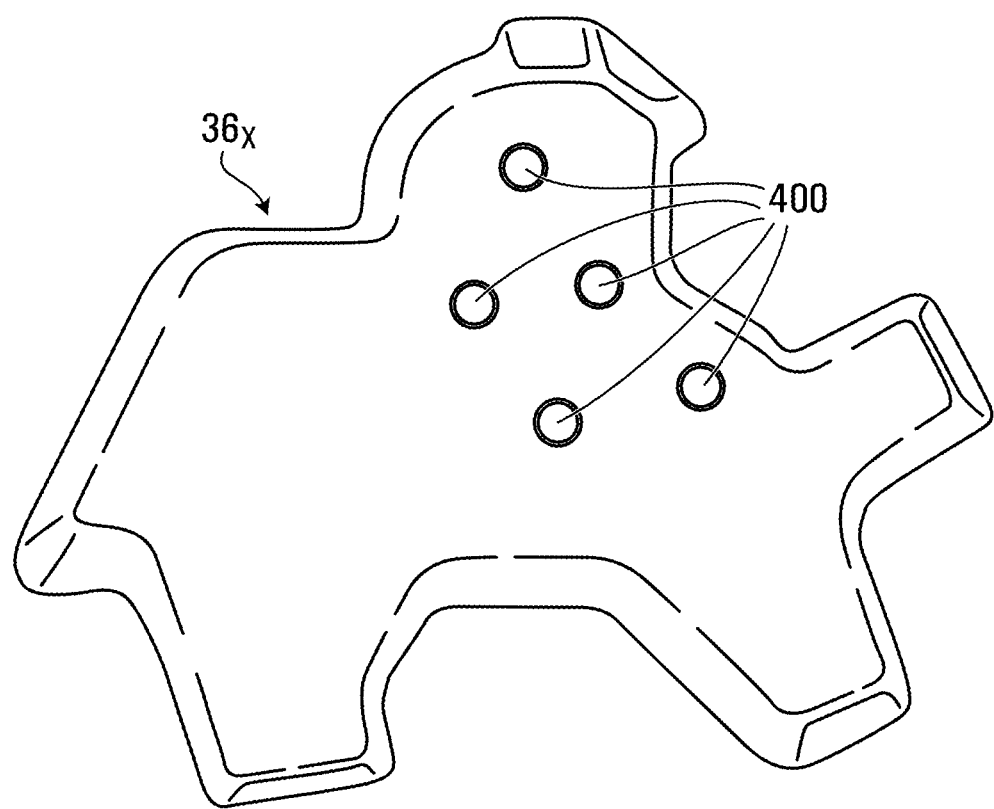
FIG. 49 shows an example of inner padding for a sport helmet that includes liquid crystal elastomer components.

FIG. 48A shows an example of a main-chain LCE material 400 in which the mesogens 404 are part of polymer chains 402 that are slightly crosslinked at crosslinks 406. As shown in FIG. 48A, when the LCE material 400 is uncompressed the mesogenic groups 404 are generally aligned. When a compressive force is applied to the LCE material 400, as shown in FIG. 48B, the mesogenic groups 404 are displaced out of alignment. The displacement of the mesogenic groups 404 serves to elastically dissipate the energy of the applied force and afterward return to substantially the same state as shown in FIG. 48A. In this way, many LCE materials provide better impact absorbing performance relative to conventional shock-absorbing materials such as polymeric foam In some embodiments, one or more of the pads $36_X$ of the liner 15 for a helmet 10 may have a hybrid structure that includes a combination of shock-absorbing materials, such as non-AM LCE materials/components, AM LCE materials/components (e.g., 3D printed LCE components) and/or more conventional shock-absorbing materials/components (e.g., EPP foram, EPS foam, PORON XRD foam, etc.) that may be fabricated using non-AM and/or AM technologies. For example, FIG. 49 shows an example of a pad $36_X$ in which multiple column- or cylinder-shaped LCE components 400 are embedded in a polymeric foam structure constituting the remainder of the pad $36_X$. The column-shaped LCE components 400 are arranged such that the elongated dimension of each column extends in a direction that is generally radial to a wearer's head. Although the LCE components are cylindrical or column-shaped in this example, more generally LCE components or other shock-absorbing materials that are utilized in a hybrid structure may be any suitable shape, e.g., in some embodiments one or more of the shock-absorbing materials in a hybrid structure may be designed to provide optimized attenuation under impact (specific buckling, twisting, collapsing).

In this example shown in FIG. 49, the pad $36_X$ forms part of the side padding for a helmet and the LCE components 400 are located in a portion of the pad $36_X$ that would face the wearer's temple region when the helmet is worn in order to enhance lateral impact absorption. In other embodiments, LCE components may also or instead be incorporated into padding that faces other portions of the wearer's head, such as the front region, top region, back region and/or occipital region. In some embodiments, the LCE components used in different regions of the helmet may be configured with different shapes, sizes and/or materials in order to provide different impact-absorbing properties in different regions.

Figure 50:
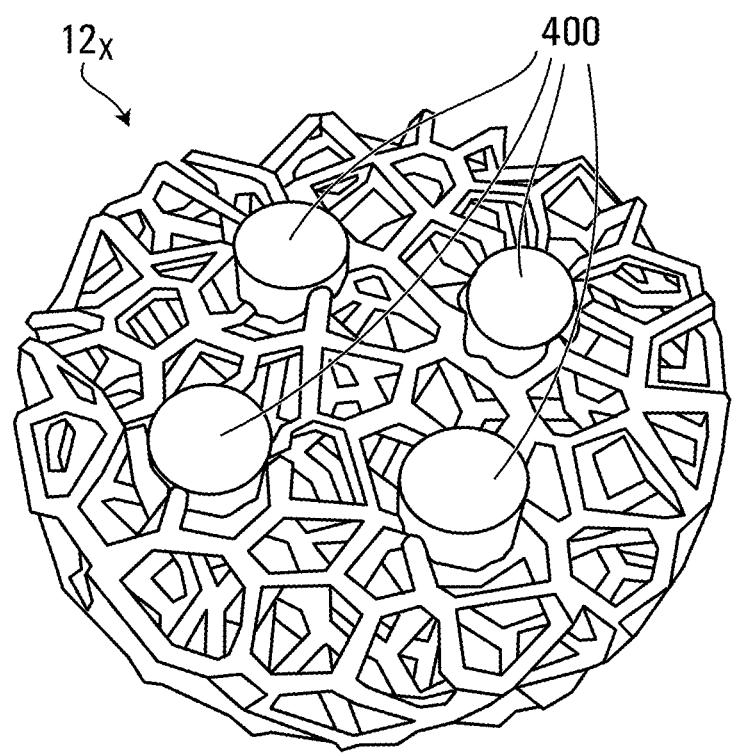
FIG. 50 shows an example of an additively manufactured component with a lattice structure in which liquid crystal elastomer components have been incorporated.

In some embodiments, the additively manufactured components $12_X$ constituting the pads $36_X$ and/or the comfort pads $37_X$ of the helmet 10 may have LCE components integrated into the pads. For example, FIG. 50 shows an example of an AM component $12_X$ that has a lattice structure into which a cluster of four column-shaped LCE components 400 have been embedded. The four LCE components 400 have been thinly outlined in FIG. 50 in order to allow them to be more easily identified in the image. In some embodiments, the lattice structure of the AM component $12_X$ may be formed from a shock-absorbing material that includes a polymeric foam and/or a polymeric structure comprising one or more polymeric materials, while the LCE components 400 may include any suitable LCE material. The column shape of the LCE components in this example is merely illustrative of one example shape that may be used in some embodiments. Differently shaped and/or sized LCE components may be used in other embodiments. In some embodiments, the spaces in the AM component $12_X$ for receiving and retaining the LCE components 400 may be formed in the AM component $12_X$ during the additive manufacturing process. In other embodiments, the spaces may be created after the additive manufacturing process, e.g., by drilling or cutting into the AM component $12_X$ to create the spaces.

One of the common problems that is encountered when designing helmet liner/padding parts is air channel integration. It is often desirable to provide a high level of ventilation, but conventional molding techniques that have traditionally been used to manufactured helmet liner/padding parts limit the types of structures that can practically be realized. The use of additively manufactured components with lattice structures to implement liner/padding parts may solve some of these problems, because a lattice can be implemented as an open structure that permits air flow. However, in some embodiments, a desired level of ventilation may be achieved by also or instead using non-lattice additively manufactured components that have air channels formed in and/or on them that could not be practically mouldable by traditional molding. For example, in some embodiments the additively manufactured components $12_X$ constituting the pads $36_X$ and/or the comfort pads $37_X$ of the helmet 10 may have air channels integrated in the core of the pads.

Figure 51:
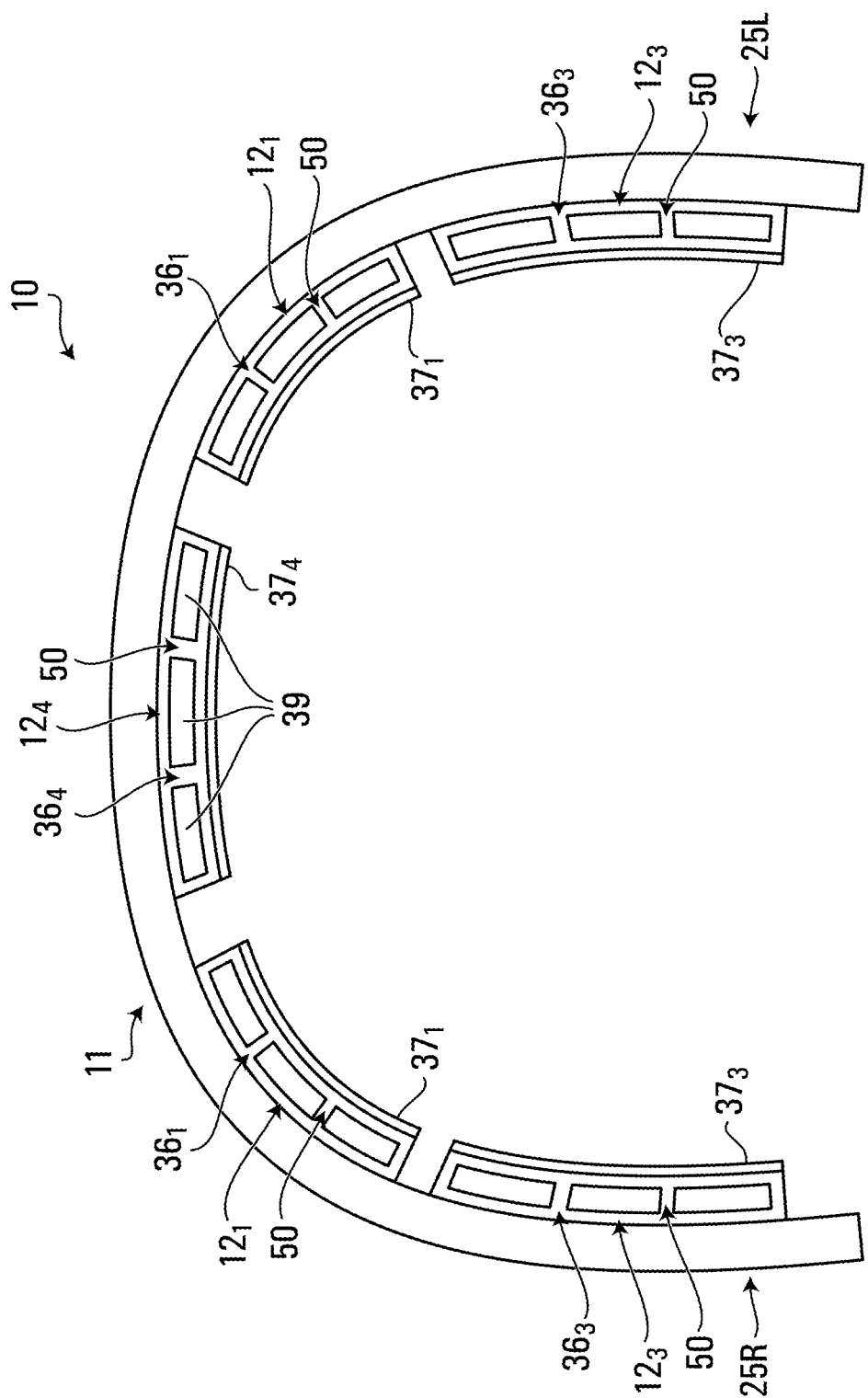
FIG. 51 shows a cross-sectional view of a sport helmet with inner padding that includes air channels integrally formed within additively manufactured components of the inner padding.

FIG. 51 shows a cross-sectional view of a sport helmet 10 with inner padding that includes air channels 39 integrally formed within additively manufactured components $12_1$, $12_3$, $12_4$ constituting the absorption pads $36_1$, $36_3$, $36_4$ of the inner padding. The outer shell 11 of the helmet 10 may include apertures (not shown in FIG. 51) that allow air in the air channels 39 to exit the helmet 10. Similarly, the absorption pads $36_1$, $36_3$, $36_4$ may include apertures (not shown in FIG. 51) that permit heated air from the interior of the helmet to pass into the air channels 39 in order eventually exit the helmet 10. For example, portions of the absorption pads $36_1$, $36_3$, $36_4$ nearest the wearer's head when the helmet is worn may have an open lattice structure to permit this air flow from the interior of the helmet into the air channels 39. In such embodiments, portions of the absorption pads $36_1$, $36_3$, $36_4$ furthest from the wearer's head when the helmet 10 is worn, i.e., the portions of the absorption pads $36_1$, $36_3$, $36_4$ proximal the outer shell 11 may be manufactured with a solid non-lattice structure. In other embodiments, the absorption pads $36_1$, $36_3$, $36_4$ may be wholly formed with a solid non-lattice structure. In other embodiments, the absorption pads $36_1$, $36_3$, $36_4$ may be wholly formed with a lattice structure. In such embodiments, the cross-sectional area of the air channels 39 may be greater than the cross-sectional area of spaces between elongate members of the lattice structure itself.

Figure 52:
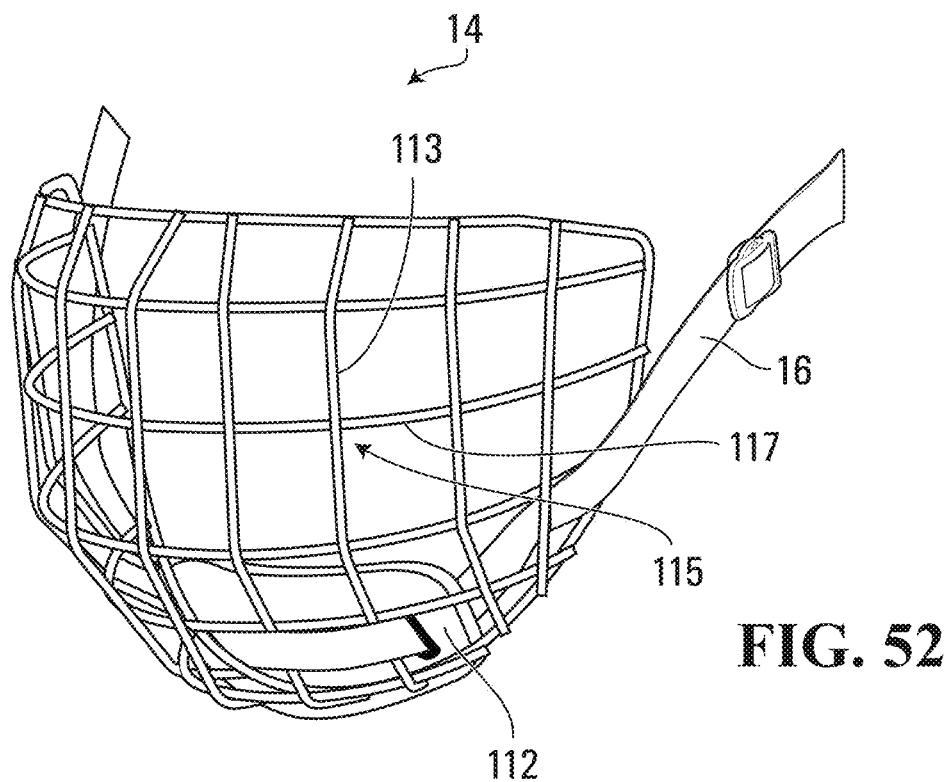
FIG. 52 shows an example of additively-manufactured components constituting a chin cup and a face mask of a helmet.

While in many of the embodiments described above the inner liner 15 of the helmet 10 comprises the AM components $12_1$-$12_4$, in other embodiments, another part of the helmet may comprise one or more AM components such as the AM components $12_1$-$12_4$. For instance, in some embodiments, as shown in FIG. 52, when the helmet 10 comprises a faceguard 14, the faceguard 14 and/or a chin cup 112 mounted to the chin strap 16 of the helmet 10 to engage a chin of the user may comprise an AM component constructed using principles described here in respect of the AM components $12_1$-$12_4$. A cage or visor faceguard 14 comprising an AM component may have several advantages relative to a conventional faceguard. For example, a conventional cage faceguard is typically manufactured by welding together a plurality of elongate metal members to form a cage. In the conventional cage faceguard, the elongate metal members are welded together where they overlap. These welds are a potential point of failure. In contrast, as shown in FIG. 52, in an additively-manufactured cage faceguard 14, the vertically oriented elongate members 113 may directly intersect the horizontally oriented elongate members 117 at points of intersection 115. In addition, the use of additive-manufacturing makes it feasible to customize the positioning and/or profile of the elongate members 113, 115 of the faceguard 14. For example, the positioning of the elongate members 113,115 may be customized based on the eye positions of an intended user (e.g., pupillary distance, location of eyes relative to the top and/or sides of the head, etc.). Furthermore, the profiles of the elongate members 113,115 of the faceguard may be tapered and/or shaped to minimize their impact on the user's field of vision. For example, portions of the elongate members 113,115 that may fall within the user's field of vision may have an ovoid cross-section, with a major axis of the ovoid oriented substantially parallel with the user's line of sight.

Figure 53A:
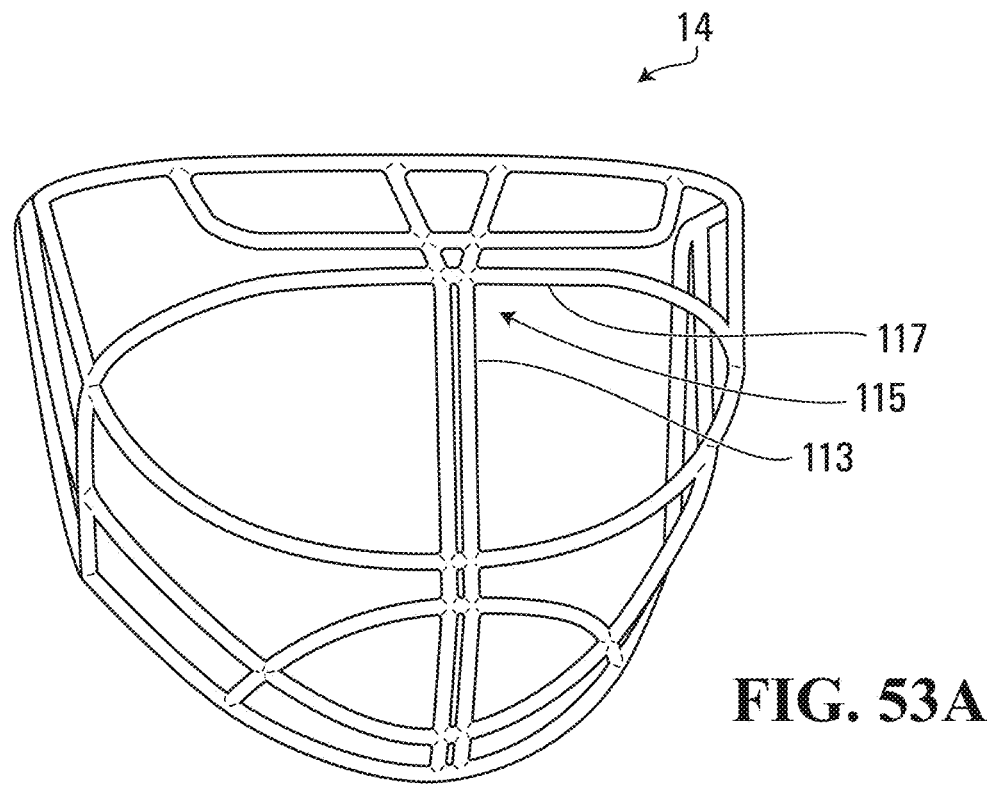
FIGS. 53A, 53B and 53C show an example of an additively-manufactured component constituting a face mask of a helmet for a hockey goalie.
Figure 53B:
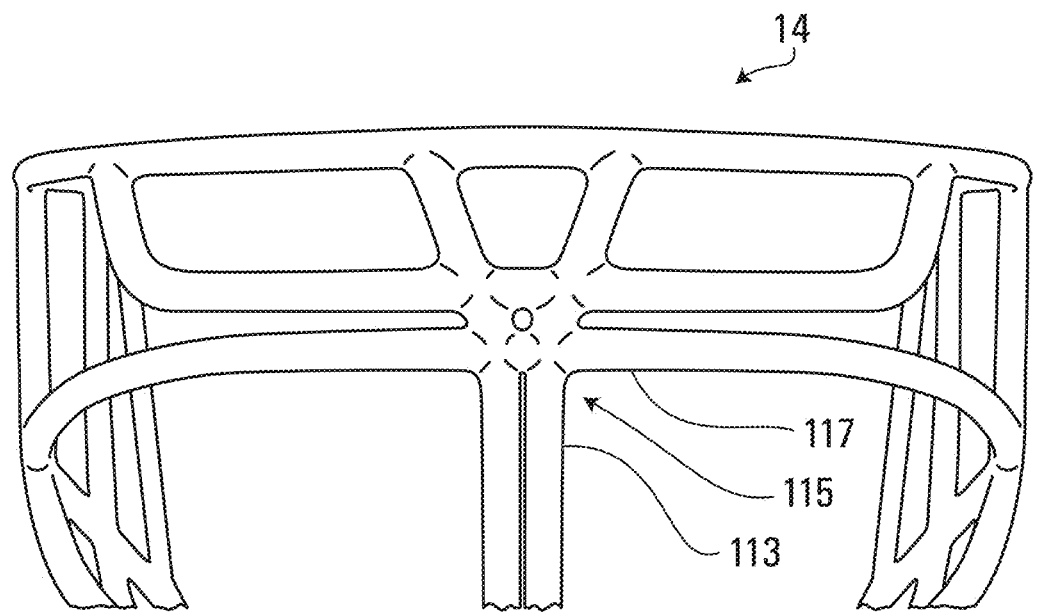
Figure 53C:
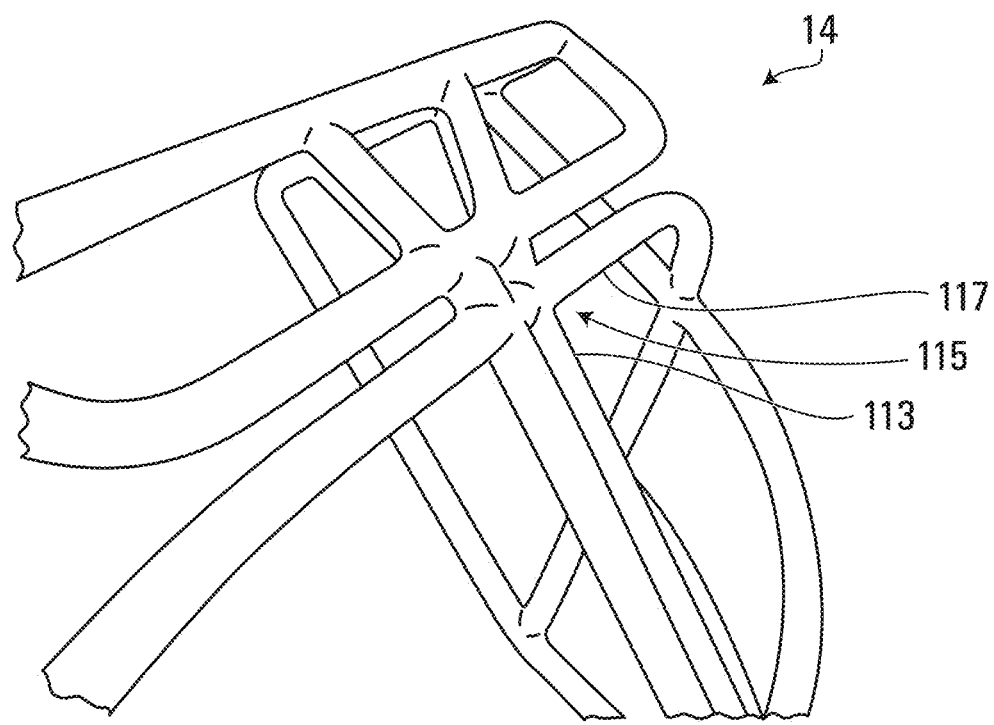

FIGS. 53A, 53B and 53C show another example of an additively-manufactured cage faceguard 14. In this example, the additively-manufactured cage faceguard 14 has been formed by 3D printing metal and is configured as a faceguard for a goalie mask. Similar to the faceguard 14 shown in FIG. 52, the example implementation of a faceguard 14 shown in FIGS. 53A-C includes elongate members 113 and 117 that merge into one another at points of intersection 115.

In some embodiments, at least part of the outer shell 11 may comprise an AM component that is similar to the AM components $12_1$-$12_4$. For instance, a given one of the front shell member 22 and the rear shell member 24 of the outer shell 11 may comprise an AM component.

Although in embodiments considered above the helmet 10 is a hockey helmet, in other embodiments, the helmet 10 may be any other helmet usable by a player playing another type of contact sport (e.g., a "full-contact" sport) in which there are significant impact forces on the player due to player-to-player and/or player-to-object contact or any other type of sports, including athletic activities other than contact sports.

Figure 54:
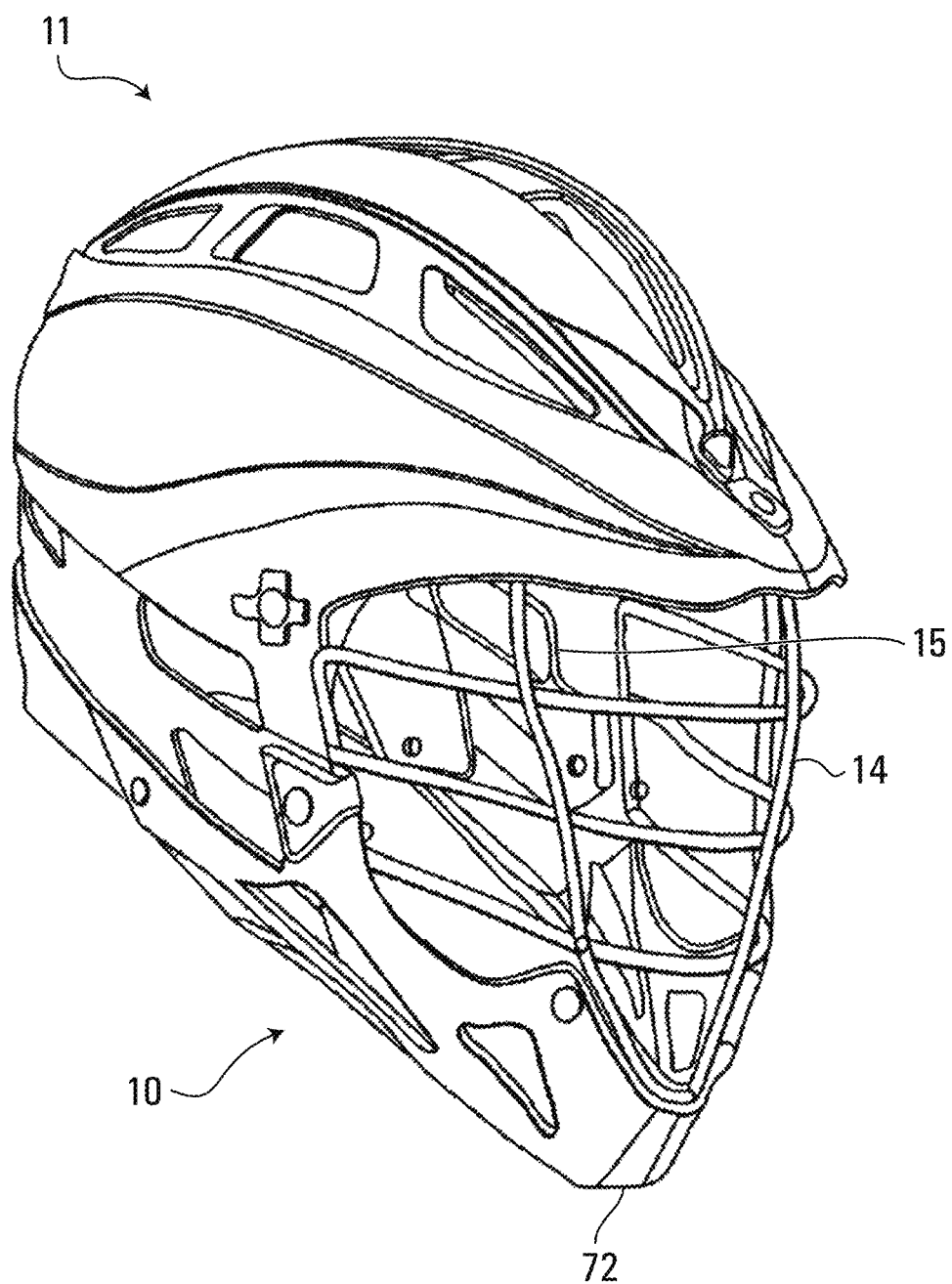
FIG. 54 shows an embodiment of a lacrosse helmet comprising additively-manufactured components.

For example, in other embodiments, as shown in FIG. 54, the helmet 10 may be a lacrosse helmet. The lacrosse helmet 10 comprises a chin piece 72 extending from the left lateral side portion 25L to the right lateral side portion 25R of the helmet 10 and configured to extend in front of a chin area of the user. The lacrosse helmet 10 also comprises the faceguard 14 which is connected to the shell 11 and the chin piece 72.

The lacrosse helmet 10 may be constructed according to principles discussed herein. For example, in some embodiments, the lacrosse helmet 10 may the additively-manufactured components $12_1$-$12_4$, as discussed above. For instance, in some embodiments, the additively-manufactured components $12_1$-$12_4$ may constitute at least part of the shell 11, at least part of the liner 15, at least part of the chin piece 72, and/or at least part of the faceguard 14, according to principles discussed herein.

In other embodiments, the helmet 10 may be a baseball/softball helmet or any other type of helmet.

While in many of the embodiments described above it is the inner liner 15 of a helmet 10 that comprises an AM component, in other embodiments, another part of the helmet 10 may comprise one or more AM components. For instance, referring again to FIG. 5, in some embodiments when the helmet 10 comprises a faceguard 14, a chin cup 112 mounted to the chin strap 16 of the helmet 10 to engage a chin of the user may comprise a post-AM expandable component constructed using principles described here in respect of the post-AM expandable component $512_X$ described herein. In some embodiments, at least part of the outer shell 11 may comprise a post-AM expandable component that is similar to the post-AM expandable component $512_X$. For instance, a given one of the front shell member 22 and the rear shell member 24 of the outer shell 11 may comprise a post-AM expandable component.

Moreover, although in many of the embodiments described above the article of protective athletic gear comprising an AM component is a helmet, in other embodiments, the article of protective athletic gear may be any other article of protective athletic gear comprising one or more AM components. For example, with reference again to FIG. 33, in some embodiments the example implementation of an additively manufactured shoulder pad shown in FIG. 33 may be constructed as a post-AM expandable component using principles described herein in respect of the post-AM expandable component $512_X$.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of describing, but should not be limiting. Various modifications and enhancements will become apparent to those of ordinary skill and are within a scope of this disclosure.

The invention claimed is:

1. A helmet comprising:
    an outer shell; and
    an impact absorbing inner liner, the impact absorbing inner liner comprising:
        a first padding component disposed within the outer shell, the first padding component being configured to compress when the helmet is impacted; and
        a plurality of second padding components disposed within the outer shell at selected locations around a wearer's head when the helmet is worn, the first padding component and the second padding components each defining a separate padding forming parts of the impact absorbing inner liner, each second padding component of the plurality of second padding components comprising:
an inner head facing surface, an outer shell facing surface and outer peripheral surfaces extending between the head facing surface and the outer shell facing surface, at least one of the outer peripheral surfaces comprising an open surface that provides multiple openings therethrough; and
an array of shock absorbers extending between the head facing surface and the outer shell facing surface of the second padding component and configured to deform when the helmet is impacted,
wherein:
each the second padding component has a plurality of channels extending therethrough in a direction that is generally radial to a wearer's head when the helmet is worn;
each channel in a specific one of the second padding components comprises an inner peripheral surface extending between a first respective opening in the head facing surface of the specific one of the second padding components to a second respective opening in the shell facing surface of the specific one of the second padding components;
the inner peripheral surface of each the channel comprises an open surface that provides multiple openings therethrough; and
each the channel has a cross-sectional area that is greater than a cross-sectional area of any one of the openings through the open surface of the inner peripheral surface of the channel.

2. The helmet of claim 1, wherein, at least one of the second padding components is configured such that the cross-sectional area of each of the channels extending through the second padding component is greater than a cross-sectional area of any one of the openings through the open surface of one or more of the outer peripheral surfaces of the second padding component.

3. The helmet of claim 1, wherein at least one of the second padding components is configured such that each shock absorber of the second padding component is an elongate member, the array of shock absorbers of the second padding component being arranged such that an elongated dimension of each shock absorber extends generally radially with respect to the wearer's head when the helmet is worn.

4. The helmet of claim 3, wherein each shock absorber of the at least one of the second padding components is configured to attenuate a radial impact on the helmet by buckling along the shock absorber's elongated dimension.

5. The helmet of claim 1, wherein the shock absorbers have a non-lattice structure.

6. The helmet of claim 1, wherein the plurality of second padding components comprises at least one second padding component disposed within the outer shell in a front region of the helmet and at least one second padding component disposed within the outer shell in a rear region of the helmet.

7. The helmet of claim 1, wherein the first padding component has a non-lattice structure.

8. The helmet of claim 1, wherein the first padding component comprises a three-dimensional (3D) lattice structure formed of a plurality of unit cells and a liner skin integrally formed with the 3D lattice structure, the liner skin defining part of a head facing surface of the first padding component, the liner skin adapted to contact a wearer's head when the helmet is worn, the liner skin comprising:
at least one solid skin along the head facing surface of the first padding component; and
at least one open lattice skin along the head facing surface of the first padding component to define at least one exposed region of the 3D lattice structure free of the solid skin.

9. The helmet of claim 8, wherein a majority of a surface area of the head facing surface of the first padding component is occupied by the at least one open-lattice skin.

10. The helmet of claim 8, wherein each open-lattice skin of the first padding component occupies a surface area of the head facing surface of the first padding component that exposes multiple unit cells of the three-dimensional lattice structure.

11. The helmet of claim 1, wherein the outer shell comprises a first shell member and a second shell member movable relative to one another to adjust the helmet to fit a wearer's head when the helmet is worn.

12. The helmet of claim 11, wherein the first padding component comprises a first liner portion disposed within the first shell member and a second liner portion disposed within the second shell member, wherein the first liner portion and the second liner portion each define a separate padding forming parts of the impact absorbing inner liner.

13. The helmet of claim 12, wherein the first shell member is a front shell member and the second shell member is a rear shell member, the first shell member and the second shell member being slidably engaged such that movement of the front shell member and the rear shell member relative to each other adjusts at least a longitudinal size of a head-receiving cavity defined by the outer shell.

14. The helmet of claim 13, further comprising an adjustment system operable to adjust the fit of the helmet on a wearer's head by moving the first and second shell members relative to one another.

* * * * *